(12) United States Patent
Gobara et al.

(10) Patent No.: US 8,473,591 B2
(45) Date of Patent: *Jun. 25, 2013

(54) INFORMATION PROCESSING SYSTEM, INFORMATION PROCESSOR, SERVER, INFORMATION PROCESSING METHOD AND PROGRAM

(75) Inventors: Kunio Gobara, Tokyo (JP); Hajime Maekawa, Osaka (JP)

(73) Assignee: Panasonic Corporation, Osaka (JP)

( * ) Notice: Subject to any disclaimer, the term of this patent is extended or adjusted under 35 U.S.C. 154(b) by 786 days.
This patent is subject to a terminal disclaimer.

(21) Appl. No.: 11/817,100

(22) PCT Filed: Sep. 14, 2005

(86) PCT No.: PCT/JP2005/016935
§ 371 (c)(1),
(2), (4) Date: Aug. 24, 2007

(87) PCT Pub. No.: WO2006/090501
PCT Pub. Date: Aug. 31, 2006

(65) Prior Publication Data
US 2009/0013069 A1 Jan. 8, 2009

(30) Foreign Application Priority Data
Feb. 25, 2005 (JP) .................................. 2005-050412

(51) Int. Cl.
*H06F 15/16* (2006.01)

(52) U.S. Cl.
USPC ........... 709/223; 709/224; 709/225; 709/226; 370/229; 370/232; 370/389

(58) Field of Classification Search
USPC .................... 709/223, 224, 225; 370/229, 230
See application file for complete search history.

(56) References Cited

U.S. PATENT DOCUMENTS

| | | | | |
|---|---|---|---|---|
| 5,884,326 | A * | 3/1999 | Weinger et al. | 707/201 |
| 6,956,867 | B1 * | 10/2005 | Suga | 370/465 |
| 7,085,234 | B2 * | 8/2006 | Kimball et al. | 370/235 |
| 7,860,926 | B2 * | 12/2010 | Gobara et al. | 709/203 |
| 7,979,586 | B2 * | 7/2011 | Gobara et al. | 709/250 |
| 2001/0028650 | A1 * | 10/2001 | Yoshizawa et al. | 370/389 |
| 2001/0042103 | A1 * | 11/2001 | Tomari et al. | 709/206 |
| 2003/0103450 | A1 * | 6/2003 | Chapman et al. | 370/229 |

(Continued)

FOREIGN PATENT DOCUMENTS

| | | |
|---|---|---|
| JP | 2002-354048 | 12/2002 |
| JP | 2004-158923 | 6/2004 |

(Continued)

OTHER PUBLICATIONS

"Optimal Packet Scheduling for Wireless Video Streaming with Error-Prone Feedback"—May 2006 Georgia Tech http://www.baslerweb.com/media/documents/AW00064902000_ControlPacket_Timing_With_Delays.pdf.*

(Continued)

*Primary Examiner* — Krista Zele
*Assistant Examiner* — Randy Scott
(74) *Attorney, Agent, or Firm* — Pearne & Gordon LLP

(57) ABSTRACT

An information processor (1) comprises: a history packet transmitter (11) for transmitting via a plurality of ports of a communication processor (2) a plurality of history packets; a request packet transmitter (12) for transmitting a request packet requesting transmission of a return packet; a packet transmission controller (13) for controlling transmission of a request packet; a return packet receiver (14) for receiving a return packet transmitted from a server (3); and a port keeping time detector (15) for detecting the port keeping time of the communication processor (2) based on reception of a return packet by the return packet receiver (14). The server (3) includes: a request packet receiver (31) for receiving the request packet; and a return packet transmitter (32) for transmitting the return packet to the history port of the communication processor (2) where a history packet passed when a request packet receiver (31) received a request packet. This configuration provides an information processing system for detecting the port keeping time of the communication processor.

29 Claims, 26 Drawing Sheets

U.S. PATENT DOCUMENTS

2003/0212816 A1* 11/2003 Bender et al. .................. 709/237
2005/0008234 A1* 1/2005 Martin .......................... 382/233

FOREIGN PATENT DOCUMENTS

| JP | 2004-166031 | 6/2004 |
|---|---|---|
| WO | 2004-030292 | 4/2004 |

OTHER PUBLICATIONS

"Timing Over Packet" Nokia Siemens Networks Apr. 2006 www.nokiasiemensnetworks.com.*
Search Report Dated Dec. 6, 2005.

* cited by examiner

FIG. 10
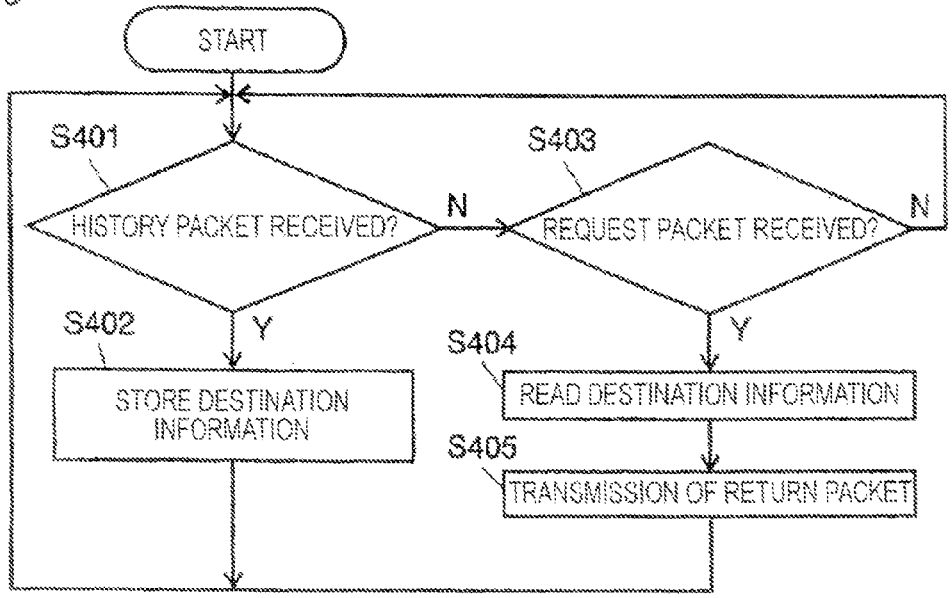
FIG. 11A
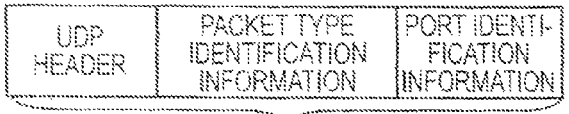
HISTORY PACKET
FIG. 11B
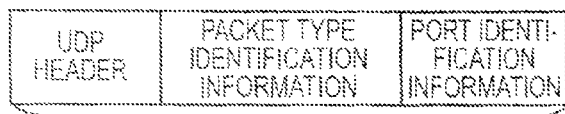
REQUEST PACKET
FIG. 11C
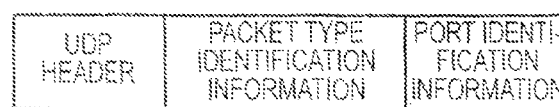
RETURN PACKET
FIG. 12
| PORT IDENTIFICATION INFORMATION | WAIT TIME |
|---|---|
| P001 | 30 SECONDS |
| P002 | 1 MINUTE |
| P003 | 1 MINUTE 30 SECONDS |

FIG. 13

| PORT IDENTIFICATION INFORMATION | DESTINATION INFORMATION ||
|---|---|---|
| | IP ADDRESS | PORT NUMBER |
| P001 | 202.224.135.10 | 12345 |
| P002 | 202.224.135.10 | 12346 |
| P003 | 202.224.135.10 | 12347 |
| P101 | 202.224.135.55 | 23456 |
| P102 | 202.224.135.55 | 23457 |
| ⋮ | ⋮ | ⋮ |

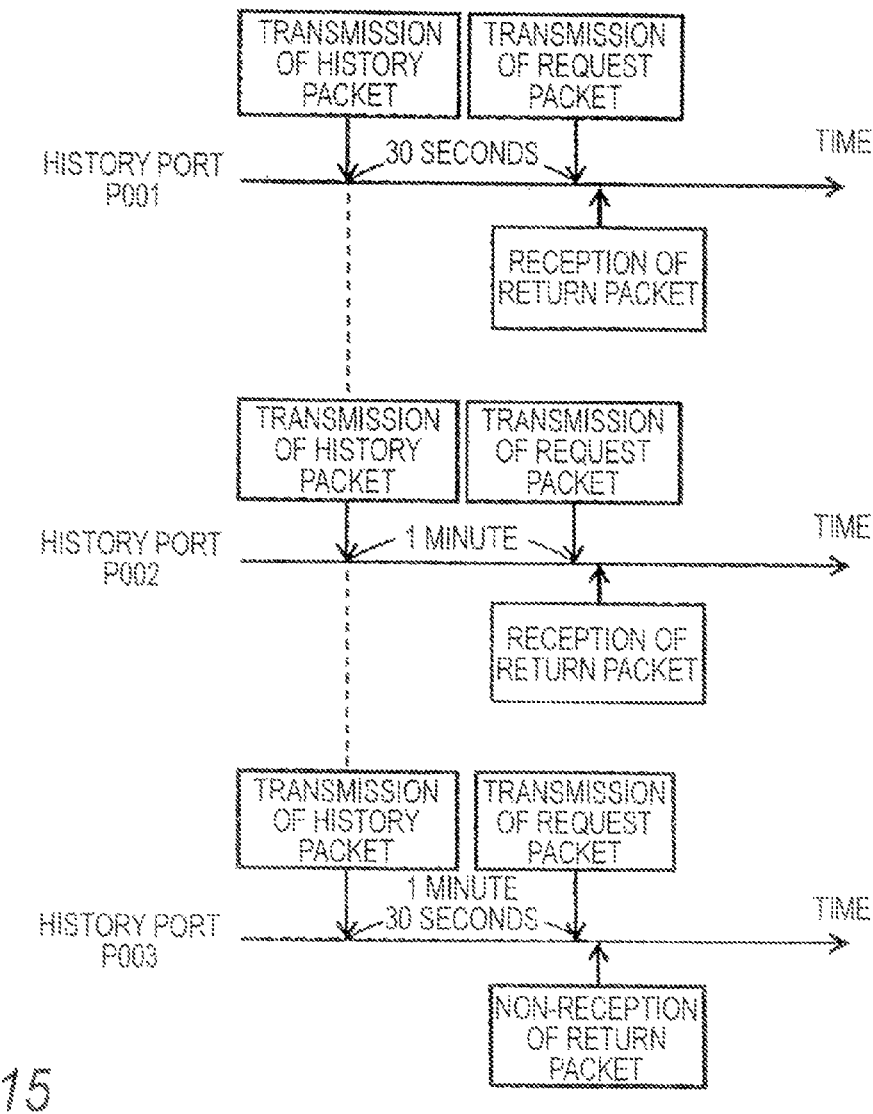

| PORT IDENTIFI-CATION INFORMATION | WAIT TIME | TIMER |
|---|---|---|
| P001 | 30 SECONDS | 15 SECONDS |
| P002 | 1 MINUTE | 15 SECONDS |
| P003 | 1 MINUTE 30 SECONDS | 15 SECONDS |

| PORT IDENTIFI-CATION INFORMATION | WAIT TIME | TIMER |
|---|---|---|
| P001 | 2 MINUTES | 5 SECONDS |
| P002 | 1 MINUTE | 36 SECONDS |
| P003 | 1 MINUTE 30 SECONDS | 36 SECONDS |

FIG. 18

| WAIT TIME | PRESET FLAG |
|---|---|
| 30 SECONDS | 0 |
| 1 MINUTE | 0 |
| 1 MINUTE 30 SECONDS | 0 |
| 2 MINUTES | 0 |
| 3 MINUTES | 1 |
| 4 MINUTES | 1 |
| 5 MINUTES | 1 |

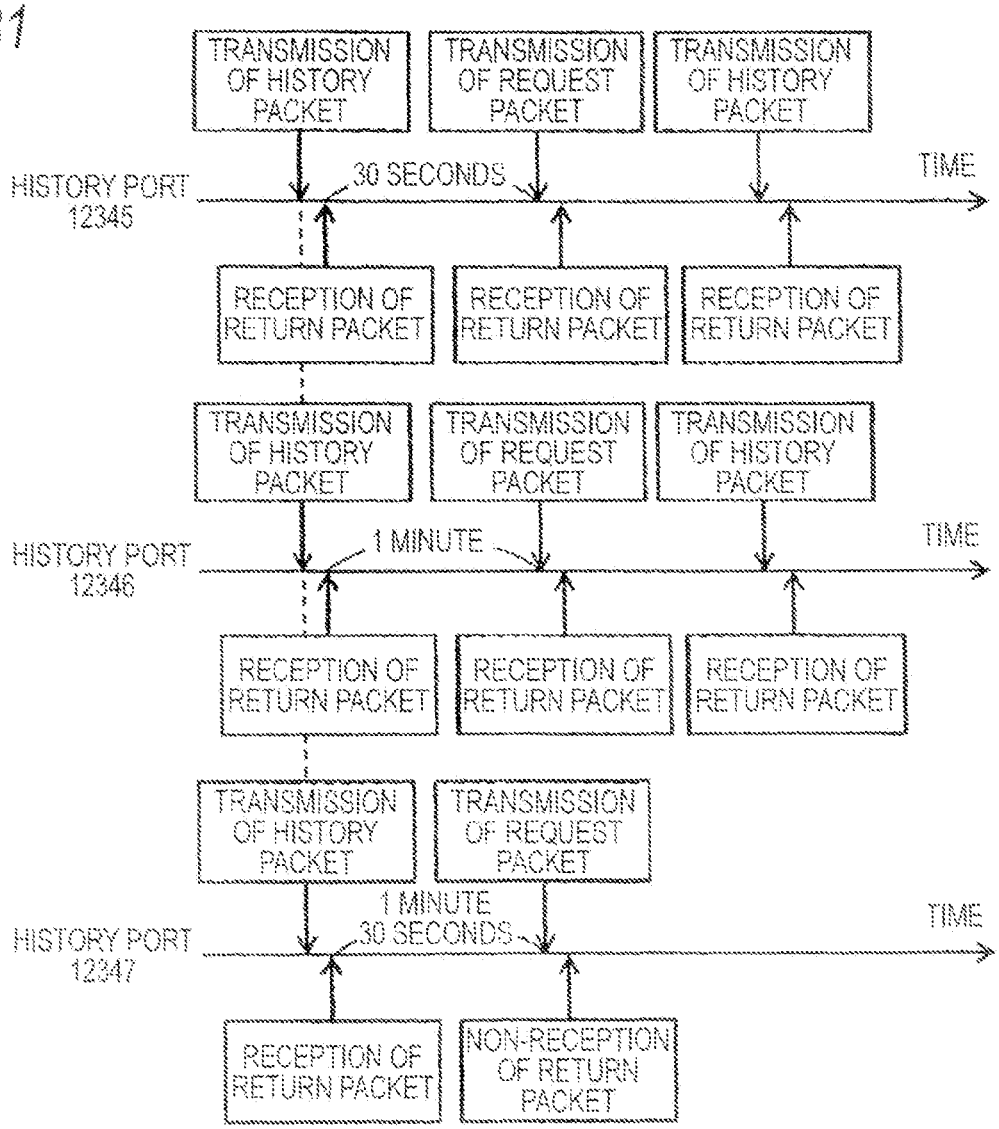

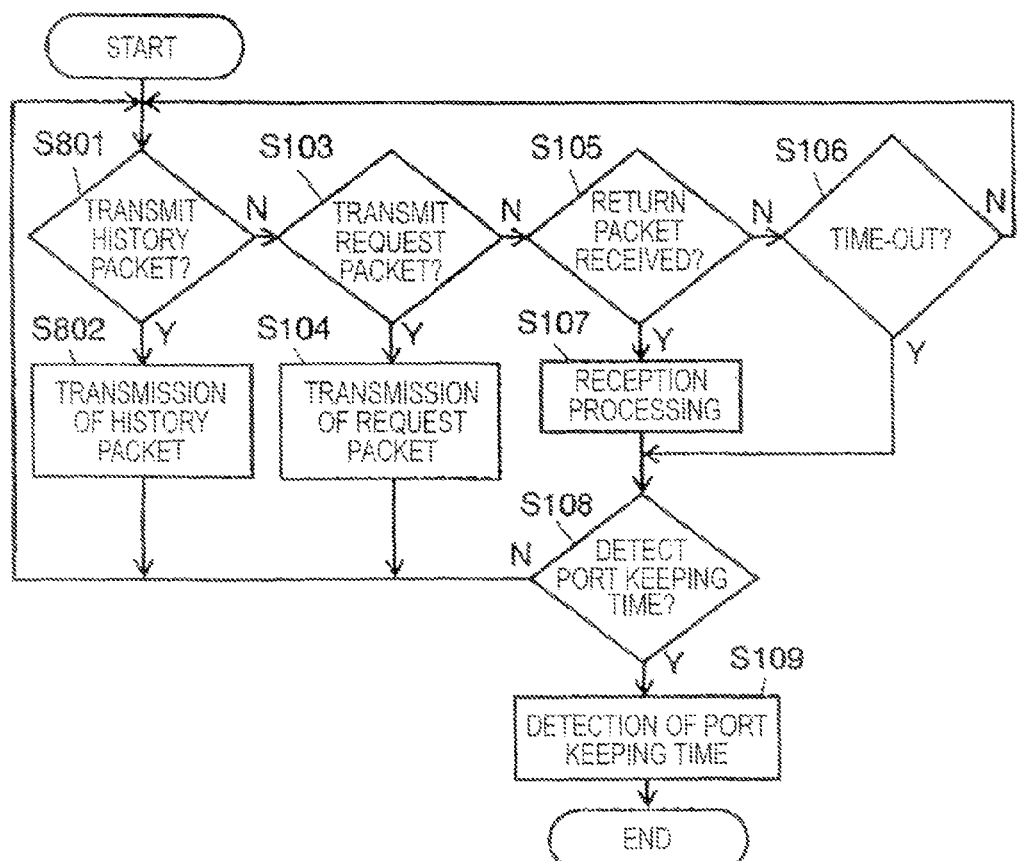

INFORMATION PROCESSING SYSTEM, INFORMATION PROCESSOR, SERVER, INFORMATION PROCESSING METHOD AND PROGRAM

TECHNICAL FIELD

The present invention relates to an information processing system or the like for detecting the port keeping time of a communication processor.

BACKGROUND ART

In an information processing system including an information processor, a communication processor and a server, for example a predetermined packet is periodically transmitted to a server from an information processor such as a PC (Personal Computer) for home use or a home appliance via a communication processor. Details of this technique are disclosed for example in the pamphlet (Page 1, FIG. 1 and the like) of the International Publication 2004/030292. The communication processor may be a router including the NAT (Network Address Translation) feature. The predetermined packet is periodically transmitted to maintain a port of a communication processor (to keep a packet from a WAN being transmitted to an information processor via a communication processor) in order to detect whether the IP address of the WAN (Wide Area Network) of the communication processor has changed or to make an access to the information processor from an external device such as a cell phone via a server.

In a communication processor including the NAT feature such as a router, the private IP address and the port number of a LAN (Local Area Network) is converted to the global IP address and the port number of a WAN when a packet is transmitted from the LAN to the WAN. In case a return packet is received from the WAN, reverse conversion is made and a resulting packet is passed to information processor. The communication processor has time for such address conversion set therein. To be more precise, when a predetermined time has elapsed since an address conversion was last performed between a WAN and a LAN, the address conversion on a packet received from the WAN is no longer performed (address conversion is performed anew on a packet received from the LAN). That is, the packet from the WAN is not received by the information processor. This means that an external device such as a cell phone cannot access the information processor via a server. The predetermined period is hereinafter called the port keeping time.

In the above information processing system, the communication processor must be always ready to perform address conversion on a packet received from a server (from a WAN) in order for the information processor to receive information from the server. Thus, even in case it is unnecessary to exchange information between an information processor and a server, packets must be periodically transmitted from information processor to the server via a communication processor so as to enable the communication processor to perform address conversion on a packet transmitted from the server. A demand accompanies this practice that the transmission period of a packet to be periodically transmitted by the information processor should be as long as possible. This is to reduce transmission of unnecessary packets and the processing load on the information processor caused by transmission of packets. In particular, it suffices to shorten the transmission period of packets to be periodically transmitted by the information processor by a small amount (for example one or two seconds) with respect to the port keeping time of the communication processor to which the information processor is connected.

It is not known what type of communication processor the information processor will be connected to. In general, the period corresponding to the shortest port keeping time among those of the variety of communication processors available from manufacturers is set to the information processor and packets are transmitted using this period. In this case, even with the information processor connected to the communication processor having a long port keeping time, packets are transmitted in a preset short period, which results in transmission of numerous unnecessary packets.

DISCLOSURE OF THE INVENTION

The invention has been accomplished in view of the above problems. An object of the invention is to provide an information processing system capable of detecting the port keeping time of a communication processor to which an information processor is connected.

In order to attain the object, the invention provides an information processing system comprising: an information processor; a server; and a communication processor for performing processing on communications between the information processor and the server; the information processor including: a history packet transmitter for transmitting via a plurality of ports of the communication processor a plurality of history packets as packets for leaving a transmission history in the communication processor; a request packet transmitter for transmitting to the server, via a port different from a plurality of history ports as the ports of a communication processor where the history packets have passed, a plurality of request packets as packets for requesting transmission of a return packet as a packet to be transmitted from the server; a packet transmission controller for controlling transmission of request packets by the request packet transmitter; a return packet receiver for receiving a return packet transmitted from the server via the history port; and a port keeping time detector for detecting the port keeping time of the communication processor based on reception of a return packet by the return packet receiver; the server including: a request packet receiver for receiving the request packet; and a return packet transmitter for transmitting the return packet to a history port corresponding to the request packet received by the request packet receiver among the plurality of history ports upon reception of request packets by the request packet receiver.

With this configuration, it is possible to detect the port keeping time of a communication processor based on reception of a return packet by the return packet receiver transmitted in response to a request packet. It is thus possible to periodically transmit a packet by using the detected port keeping time. As a result, it is possible to avoid transmitting an unnecessary packet. Through processing related to detection of a port keeping time using a plurality of history ports, it is possible to detect a port keeping time earlier than when a single history port is used.

BRIEF DESCRIPTION OF THE DRAWINGS

FIG. 10 is a flowchart showing the operation of a server according to Embodiment 1.

FIG. 11A shows an example of packet structure according to Embodiment 1.

FIG. 11B shows an example of packet structure according to Embodiment 1.

FIG. 11C shows an example of packet structure according to Embodiment 1.

FIG. 12 shows an example of correspondence between a wait time and port identification information according to Embodiment 1.

FIG. 13 shows an example of destination information according to Embodiment 1.

FIG. 14 explains transmission/reception of packets according to Embodiment 1.

FIG. 15 shows an example of wait time setting information according to Embodiment 1.

FIG. 18 shows an example of wait time setting information according to Embodiment 1.

FIG. 30 explains an example of correspondence between port identification information, a wait time and a timer value according to Embodiment 2.

FIG. 31 explains transmission/reception of packets according to Embodiment 2.

FIG. 32 is a flowchart showing another example of operation of the information processor according to Embodiment 1 of the invention.

FIG. 33 shows a table illustrating an example of transmission timings of a history packet and a request packet according to Embodiment 1.

Figure 1:
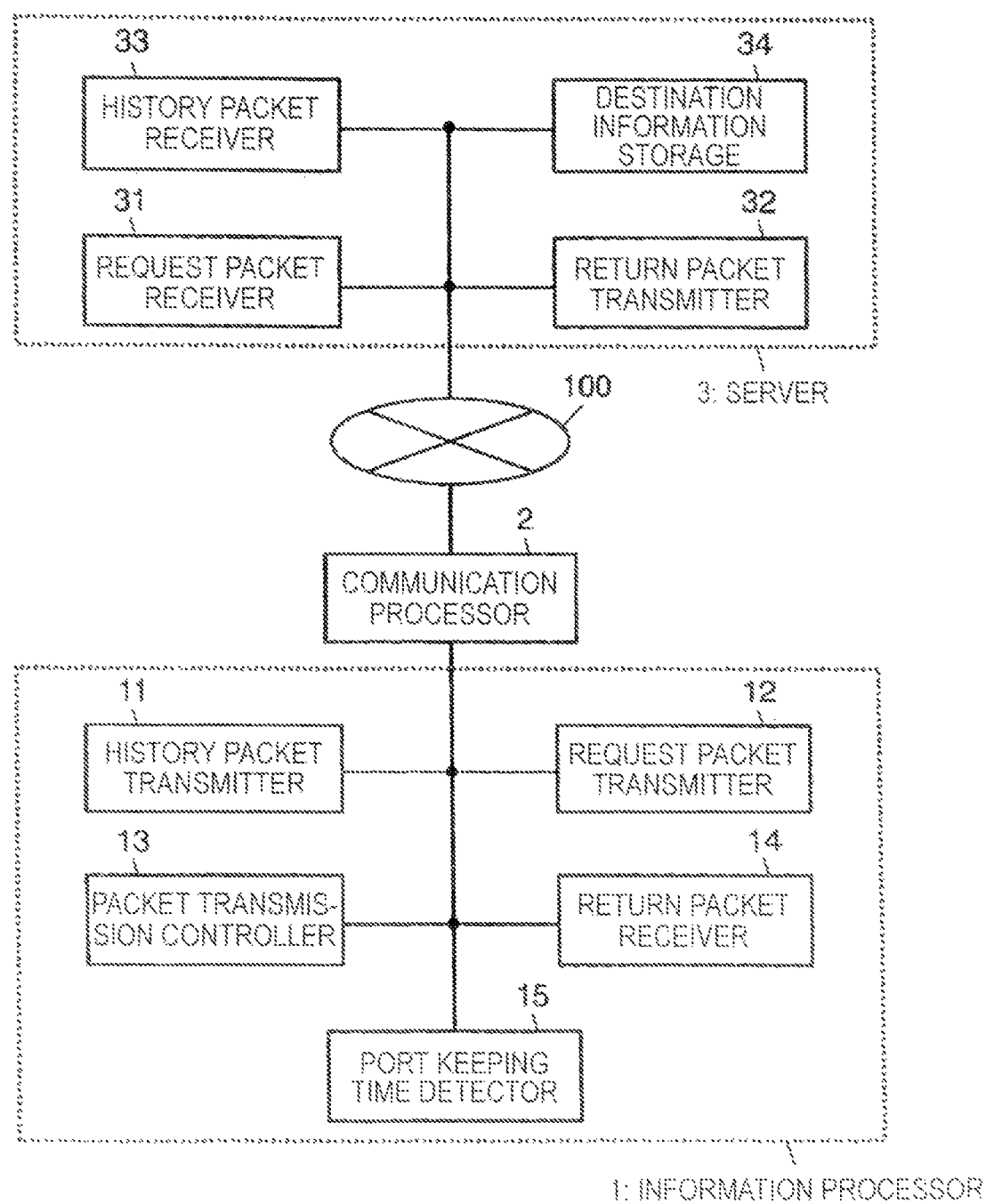
FIG. 1 is a block diagram showing the configuration of an information processing system according to Embodiment 1 of the invention.

DESCRIPTION OF THE REFERENCE NUMERALS AND SIGNS 1, 4: Information processor
2: Communication processor
3, 5: Server
11: History packet transmitter
12: Request packet transmitter
13: Packet transmission controller
14, 42: Return packet receiver
15: Port keeping time detector
31, 41: Request packet receiver
32, 51: Return packet transmitter
33: History packet receiver
34: Destination information storage part

BEST MODE FOR CARRYING OUT THE INVENTION

Embodiments of the invention will be detailed below using embodiments of the invention. In the following embodiments, components having a same sign are identical or correspond to each other so that repetitive description may be omitted.

(Embodiment 1)

An information processing system according to Embodiment 1 of the invention will be described referring to drawings.

FIG. 1 is a block diagram showing the configuration of an information processing system according to this embodiment. In FIG. 1, the information processing system according to this embodiment comprises an information processor 1, a communication processor 2 and a server 3. While a single information processor 1 is connected to a communication processor 2 in FIG. 1, two or more information processors may be connected to the communication processor 2. The information processor 1 may be a computer, an electronic oven, a telephone set, a printer, a facsimile, a refrigerator, a washing machine, an air-conditioner, a television, a video recorder, or a set-top box. The communication processor 2 and the server 3 are interconnected via a wired or wireless communication circuit 100. The communication circuit 100 is for example the Internet, an intranet, or a public switched telephone network The information processor 1 includes a history packet transmitter 11, a request packet transmitter 12, a packet transmission controller 13, a return packet receiver 14 and a port keeping time detector 15.

The history packet transmitter 11 transmits a plurality of history packets to the server 3. The history packets are transmitted via a plurality of ports of the communication processor 2. The history packet refers to a packet used to leave a transmission history in the communication processor 2. The history packet is transmitted in order to determine the reference time of measuring the port keeping time of the communication processor 2 or to determine the destination of a return packet described later. The history packet is for example a UDP packet. The payload of the history packet includes or does not include some information. The port of the communication processor 2 to connect to the communication circuit 100 where a history packet passed is hereinafter referred to as a history port. The history packet transmitter 11 may transmit a plurality of history packets simultaneously or with separate timings. The history packet transmitter 11 may include a transmitting device for packet transmission such as a modem or a network card. In case the history packet transmitter 11 does not include a transmitting device, a transmitting device (not shown) should be arranged between the history packet transmitter 11 and the communication processor 2. The history packet transmitter 11 may be implemented by hardware or software such as a driver for driving a transmitting device.

The request packet transmitter 12 transmits a plurality of request packets to the server 3. The request packet transmitter 12 transmits the request packets via a port of the communication processor 2 separate from a plurality of history ports. The request packet is a packet that requests transmission of a return packet. The return packet is a packet that is transmitted from the server 3 to the history ports of the communication processor 2. The request packet is for example a UDP packet. The payload of the request packet includes or does not include some information. The request packet may include a notice that the packet is a request packet instead of an instruction or a command to transmit a return packet so as to allow the server 3 to determine that it is a request packet. The request packet transmitter 12 may include a transmitting device for packet transmission such as a modem or a network card. In case the request packet transmitter 12 does not include a transmitting device, a transmitting device (not shown) should be arranged between the request packet transmitter 12 and the communication processor 2. The request packet transmitter 12 may be implemented by hardware or software such as a driver for driving a transmitting device.

The packet transmission controller 13 controls transmission of a request packet by the request packet transmitter 12. Control of transmission of a request packet includes control of the transmit timing of a request packet by the request packet transmitter 12. Details of this processing will be described later.

The return packet receiver 14 receives a return packet transmitted from the server 3. The return packet is transmitted via the history port of the communication processor 2. As described later, the return packet receiver 14 does not receive all return packets transmitted from the server 3. This is because a return packet that has reached the communication processor 2 after the port keeping time of a history port that has elapsed among the return packets transmitted from the server 3 is not transmitted from the communication processor 2 to the information processor 1. The return packet receiver 14 may include a receiving device for reception such as a modem or a network card. In case the history packet transmitter 11 does not include a receiving device, a receiving device (not shown) should be arranged between the return packet receiver 14 and the communication processor 2. The return packet receiver 14 may be implemented by hardware or software such as a driver for driving a receiving device.

The port keeping time detector 15 detects the port keeping time of the communication processor 2 based on reception of a return packet by the return packet receiver 14. "Based on reception of a return packet" means "based on whether a return packet is received or by using the point in time a return packet is received." Specific operation of the port keeping time detector 15 will be described later. The port keeping time detector 15 may detect a port keeping time based on transmission of a history packet as well as reception of a return packet. The port keeping time detector 15 may detect the port keeping time of the communication processor 2 or a port keeping time shorter than the port keeping time of the communication processor 2. For example, in case the port keeping time of the communication processor 2 is "2 minutes", the port keeping time detector 15 may detect the port keeping time of the communication processor 2 as "2 minutes" or "1 minute". Detection of a port keeping time by the port keeping time detector 15 will be described later. In the following description, the "port keeping time" may refer to information indicating the port keeping time detected by the port keeping time detector 15.

In case two or more components of the history packet transmitter 11, request packet transmitter 12 and return packet receiver 14 each has a device related to communications, the devices may be the same means or separate means.

The communication processor 2 performs processing related to communications between the information processor 1 and the server 3. The communication processor 2 according to this embodiment has the NAT feature and is called a router or the like. The communication processor 2 according to this embodiment converts the address information of a sending party included in a packet transmitted from the information processor 1 (that is, address information of the information processor 1) to the address information of the communication processor 2 on the WAN side.

To be more specific, the communication processor 2 converts a source (sending party) address (Address A as a private IP address) and a source (sending party) port number (Port number B) included in a packet transmitted from the information processor 1 to the global IP address (Address X) and the port number (Port number Y) of the communication processor 2 on the WAN side. A packet transmitted from the server 3 to Address X and Port Number Y of the communication processor 2 on the WAN side has its destination Address X and Port Number Y converted to Address A and Port Number B of the information processor 1 before it is transmitted to the information processor 1. The global IP address is an address used by an information processor to communicate with an external device such as an external device connected to a WAN including the Internet. In general, the global IP address is an address used in a WAN environment. In case an electronic device communicates with a device connected to a LAN such as an intranet via a router having the NAT feature, the global IP address may be an address used on the LAN. The IP address may be a current so-called IPv4 address or an address of another version such as an IPv6 address.

In case a reception filter rule is set to the communication processor 2, packet reception takes place in accordance with the reception filter rule. Assuming that the address and port number of the destination of a packet as Address P and Port Number Q respectively, the reception filter rules include, in a case where a packet destined to Address P and Port Number Q as the destination address and port number is transmitted from the LAN side of the communication processor 2 to the WAN side, an Address Sensitive filter that receives only a packet from Address P, a Port Sensitive filter that receives only a packet from Port Number Q, and a No filter as an non-existent filter (that receives any packet from any address or any port number). The process of the communication processor 2 receiving a packet means a process where the communication processor 2 accepts a packet from the WAN at a port of the communication processor 2 assigned to a packet transmitted from the information processor 1 on the LAN side, performs address conversion on the packet, and transmits the resulting packet to the information processor 1 on the LAN side.

As described in the above related art example, the period when the address conversion in the communication processor 2 takes place has a predetermined restriction. That is, address conversion between Address A and Port Number B and Address X and Port Number Y is no longer made at a point in time the port keeping time of the communication processor 2 has elapsed since address conversion was last performed between both parties. Even in case a packet is transmitted to Address X and Port Number Y via the communication circuit 100 after the port keeping time has elapsed, address conversion does not take place in the communication processor 2 and thus the information processor 1 does not receive the packet.

The server 3 includes a request packet receiver 31, a return packet transmitter 32, a history packet receiver 33 and a destination information storage 34.

The request packet receiver 31 receives a request packet transmitted from the information processor 1. The request packet receiver 31 may include a receiving device for packet reception such as a modem or a network card. In case the request packet receiver 31 does not include a receiving device, a receiving device (not shown) should be arranged between the request packet receiver 31 and the communication circuit 100. The request packet receiver 31 may be implemented by hardware or software such as a driver for driving a receiving device.

When the request packet receiver 31 receives a request packet, the return packet transmitter 32 transmits a return packet to a history port of the communication processor 2. The return packet transmitter 32 transmits a return packet to a history port corresponding to the request packet received by the request packet receiver 31 among the plurality of history ports. The history port corresponding to the request packet refers to the history port of the destination of a return packet requested to be transmitted in response to the request packet. Correspondence between a request packet and a history port may be specified by the information included in the request packet or may be preset in the server 3, or otherwise indicated. More than one history port may correspond to a request packet. In such a case, the return packet transmitter 32 may transmit a return packet to an arbitrary history port among the plurality of history ports corresponding to a request packet, or may select a history port in accordance with a predetermined rule and transmit a return packet to the selected history port. The return packet transmitter 32 transmits a return packet based on the destination information stored by the destination information storage 34 described later. That is, the return packet transmitter 32 transmits a return packet to the address and port number indicated by the destination information. The return packet is for example a UDP packet. The payload of the request packet includes or does not include some information such as information for identifying a request packet received by the request packet receiver 31. The return packet transmitter 32 may include a transmitting device for packet transmission such as a modem or a network card.

In case the return packet transmitter 32 does not include a transmitting device, a transmitting device (not shown) should be arranged between the return packet transmitter 32 and the communication circuit 100. The return packet transmitter 32 may be implemented by hardware or software such as a driver for driving a transmitting device.

The history packet receiver 33 receives a history packet transmitted from the information processor 1. The history packet receiver 33 may include a receiving device for packet reception such as a modem or a network card. In case the history packet receiver 33 does not include a receiving device, a receiving device (not shown) should be arranged between the history packet receiver 33 and the communication circuit 100. The history packet receiver 33 may be implemented by hardware or software such as a driver for driving a receiving device.

The destination information storage 34 stores the destination information onto a predetermined storage medium based on a history packet received by the history packet receiver 33. The destination information refers to information concerning the destination of a return packet. To be more precise, the destination information storage 34 reads a source address and a source port number included in the header of the history packet received by the history packet receiver 33 and stores destination information including the source address and the source port number. The source address of the history packet is the address of the communication processor 2 on the side of the communication circuit 100 and the source port number of the history packet is the port of the communication processor 2 on the side of the communication circuit 100, that is, the port number indicating the position of the history port. In case predetermined identification information is included in a history packet, the destination information storage 34 may store destination information in association with the identification information. The predetermined storage medium onto which the destination information is stored may be a semiconductor memory, an optical disk or a magnetic disk that is included in the destination information storage 34 or provided outside the destination information storage 34.

In case two or more components of The request packet receiver 31, the return packet transmitter 32, and the history packet receiver 33 each has a device related to communications, the devices may be the same means or separate means.

Figure 2:
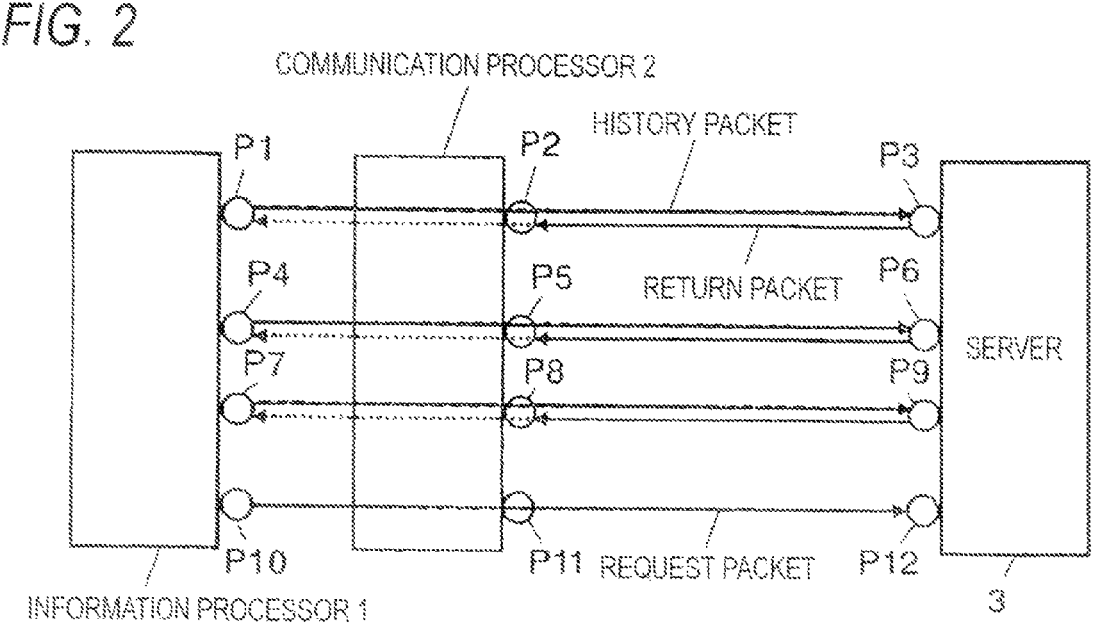
FIG. 2 explains transmission/reception of packets according to Embodiment 1.

The ports where a history packet, a request packet and a return packet pass will be described in detail. FIG. 2 explains the ports a history packet, a request packet and a return packet pass through. As shown in FIG. 2, history packets transmitted from the information processor 1 are transmitted from Ports P1, P4 and P7. These history packets pass through Ports P2, P5, P8 of the communication processor 2 on the side of the communication circuit 100 and are received at Ports P3, P6, P9 of the server 3. Ports P2, P5 and P8 are history ports.

Ports P2, P5, P8 of the communication processor 2 the history packets pass through are assigned anew by the communication processor 2 when first history packets passes through Ports P2, P5, P8. That is, it is important to transmit a history packet by using a port of the communication processor 2 not used by communications to another information processor or a server. For example, In case Port 2 is used for another purpose till then and other communications were made via Port P2 between transmission of a history packet to transmission or a return packet, it is impossible to detect a precise port keeping time. In order for Port P2 or the like to be assigned anew by the communication processor 2 when first history packets pass, a new port, that is, a port that has not been used in other communications may be used as Port P1 of the information processor 1 or the like. Ports P2, P5 and P8 must be different from each other. This is because a precise port keeping time cannot be detected unless the history ports are different from each other. In order for Ports P2, P5 and P8 to be different from each other, Ports P1, P4 and P7 should be different from each other, for example.

After that, a request packet is transmitted from Port P10 of the information processor 1. The request packet is transmitted to Port P12 of the server 3 via Port P11 of the communication processor 2 on the side of the communication circuit 100. Port P11 must be different from any one of Ports P2, P5 and P8. This is because a precise port keeping time cannot be detected in case a request packet is transmitted via Port P2 between transmissions of a history packet to transmission of a return packet. In order for Ports P2, P5 and P8 to be different from Port P11, Ports P1, P4 and P7 of the information processor 1 should be different from Port P10, for example. Or, depending on the type of the port assignment rule of the communication processor 2, Ports P3, P6, P9 should be only different from Port 12 even in case Ports P1, P4, P7 are same as Port P10. In case Ports P1, P4, P7 are different from Port P10, Ports P2, P5, P8 are different from Port P11 even in case Ports P3, P6, P9 are same as Port P12.

A return packet is transmitted from any one of Ports P3, P6 and P9 that has received a history packet. In case a port keeping time has not yet elapsed, the return packet is received by Port P1 of the information processor 1 or the like via Port 2 of the communication processor 2 or the like. In case a port keeping time has elapsed, a return packet is not transmitted from the communication processor 2 to the information processor 1. As understood from FIG. 2, in the information processing system according to this embodiment, a history packet and a return packet pass through Ports P2, P5 and P8 of the communication processor 2. In case a history packet is transmitted to Ports 1 to Port 3 after the port keeping time related to Port 2 has elapsed, a new port may be assigned to the communication processor 2 such as Port P13 different from Port P2, or Port P2 may be used again. This depends on the specifications of the communication processor 2. In any case, processing is almost the same with Port P2 changed to Port P13 or the like. It is thus assumed that Port P2 is assigned for a history packet transmitted from Port P1 of the information processor 1 after the port keeping time has elapsed for ease of explanation.

While in the above case a return packet is transmitted from Port 3 or the like that has received a history packet, a return packet need not be transmitted from Port 3 or the like depending on the receiving filter rule of the communication processor 2. While a request packet is transmitted from Port P10 of the information processor 1 as a single port thereof, a request packet may be transmitted from a plurality of ports. Or, a request packet may be received by a plurality of ports. For example, the port used by the information processor 1 to transmit a request packet or receive a request packet may differ from between packets corresponding to request packets. In case Ports P2, P5, P8 are different from each other, two or more ports of Ports P3, P6 and P9 of the server 3 may be the same.

While a history packet is transmitted to the server 3 in the above description, a history packet may be transmitted to another server instead of the server 3 depending on the type of the communication processor 2. In such a case, information concerning the position of a history port may be passed to the server 3 from a server that has received the history packet.

Next, detection of a port keeping time will be described focusing on a single history port. First, the "wait time" is defined. The wait time is a time from a point in time a return packet reached the history port of the communication processor 2 to a point in time a packet passed through the history port just before. As processing on the communication processor 2 assumed after a return packet has reached the history port of the communication processor 2, there is a case where the return packet undergoes address conversion on the communication processor 2 and is transmitted to the information processor 1 and a case where the port keeping time of the communication processor 2 has elapsed and the return packet does not undergo address conversion with the communication processor 2. Roughly speaking, the wait time has two patterns. Pattern 1 corresponds to a case where a history packet passes through a history port at the beginning of a wait time. Pattern 2 corresponds to a case where a return packet passes through a history port at the beginning of a wait time. The beginning of a wait time refers to the point in time at the beginning of a wait time.

Figure 3A:
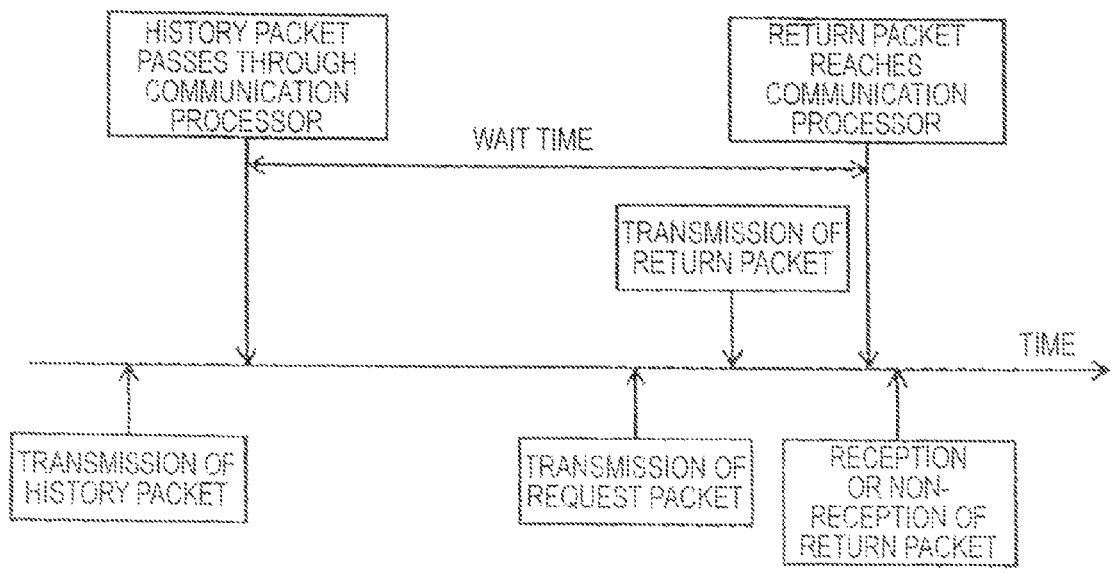
FIG. 3(A) explains a wait time according to Embodiment 1.

First, Pattern 1 will be described. FIG. 3A illustrates Pattern 1. When a history packet is transmitted from the information processor 1, the history packet passes through the history port of the communication processor 2. When a request packet is transmitted from the information processor 1 after a while, the request packet is received by the server 3, from which a return packet is transmitted to the history port of the communication processor 2. The return packet reaches the history port of the communication processor 2 and is transmitted to the information processor 1 in case the port keeping time has not yet elapsed. The return packet is not transmitted to the information processor 1 in case the port keeping time has elapsed. In this way, the period from when a history packet passes through the communication processor 2 to when a return packet reaches the communication processor 2 is called a wait time.

Figure 3B:
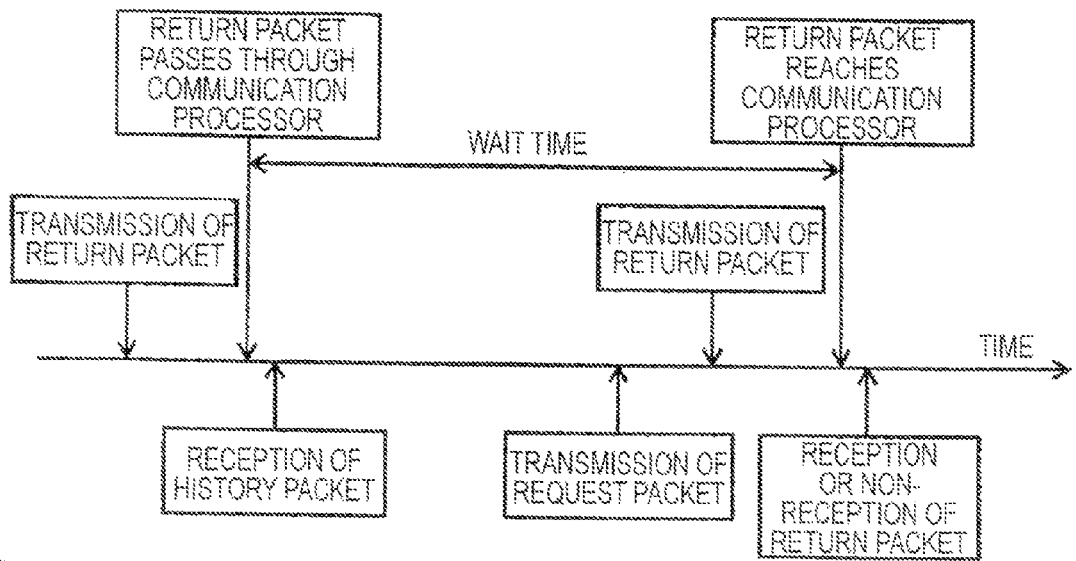
FIG. 3(B) explains a wait time according to Embodiment 1.

Next, Pattern 2 will be described. FIG. 3B illustrates Pattern 2. A return packet is transmitted from the server 3 in response to a request packet transmitted from the information processor 1. In case the port keeping time related to the history port has not yet elapsed, the return packet passes through the history port of the communication processor 2 and is received by the information processor 1. A request packet is transmitted from the information processor 1 after a while, and a return packet is transmitted from the server 3 in response to the request packet. This processing is the same as that in Pattern 1. In this case, the time from when the return packet passes through the communication processor 2 to when the next return packet reaches the communication processor 2 is a wait time. At the beginning of the wait time of Pattern 2, the return packet must reach the communication processor 2 as well as the return packet must be transmitted from the communication processor 2 to the information processor 1.

In case the information processor 1 has successfully received a return packet reaching the history port of the communication processor 2 at the end of a wait time, the port keeping time of the communication processor 2 is longer than the wait time. In case the information processor 1 has failed to receive a return packet reaching the history port of the communication processor 2 at the end of a wait time, the port keeping time of the communication processor 2 is shorter than the wait time. The end of a wait time refers to the end point in time of the wait time. In this way, by measuring a wait time and determining whether the information processor 1 has successfully received a return packet reaching the history port of the communication processor 2 at the end of a wait time, it is possible to measure the port keeping time of the communication processor 2. Thus, the port keeping time detector 15 detects a port keeping time based on a wait time during which the return packet receiver 14 has successfully received a return packet reaching the history port of the communication processor 2 at the end of a wait time among one or more wait times. For example, the port keeping time detector 15 may detect a port keeping time a based on a wait time during which the return packet receiver 14 has successfully received a return packet reaching the history port of the communication processor 2 at the end of a wait time and whichever is the longest wait time of one or more wait times. The expression "detect based on a wait time during which the return packet receiver 14 has successfully received a return packet reaching the history port of the communication processor 2 at the end of a wait time" means that the wait time may be detected as a port keeping time or a time different from the wait time may be detected as a port keeping time. In the case of the latter meaning, a wait time obtained by subtracting a predetermined time such as two or three seconds from the original wait time may be detected as a port keeping time. The port keeping time detector 15 may detect a port keeping time based on a wait time which is not the longest wait time of the wait times during which the return packet receiver 14 has successfully received a return packet reaching the history port of the communication processor 2 at the end of a wait time. For example, the port keeping time detector 15 may detect a port keeping time based on a wait time which is the second longest wait time of the wait times during which the return packet receiver 14 has successfully received a return packet reaching the history port of the communication processor 2 at the end of a wait time. As long as the port keeping time detector 15 detects a port keeping time based on any wait time among those wait times during which the return packet receiver 14 has successfully received a return packet reaching the history port of the communication processor 2 at the end of a wait time, any detection method may be used.

Next, the beginning of a wait time will be described. Packets that pass through a history port at the beginning of a wait time include a history packet and a return packet as shown in FIG. 3A. There may be three patterns in measuring a wait time. In the first pattern, a history packet exclusively passes through a history port at the beginning of a wait time (Pattern A). In the second pattern, in case the information processor 1 has successfully received a return packet, the return packet is assumed as a packet passing through a history port at the beginning of a wait time, and in case the information processor 1 has failed to receive a return packet, a new history packet is transmitted and the history packet is assumed as a packet passing through a history port at the beginning of a wait time (Pattern B). In the third pattern, a return packet exclusively passes through a history port at the beginning of a wait time (Pattern C). In the following description, the three patterns will be discussed. Note that any other pattern may be used and the invention is not limited to the three patterns.

The following description of each pattern will focus on a single history port.

[Pattern A]

Figure 4A:
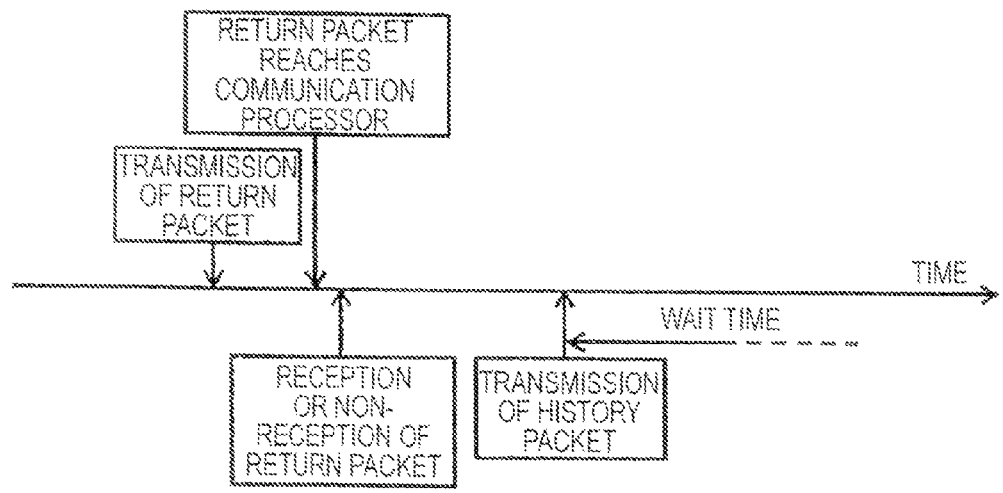
FIG. 4(A) explains the beginning of a wait time according to Embodiment 1.

FIG. 4A explains Pattern A. In Pattern A, as shown in FIG. 4A, the information processor 1 transmits a history packet at the beginning of a wait time irrespective of whether the information processor 1 has successfully received a return packet. Thus, a packet that passes through a history port at the beginning of a wait time is a history packet. A history packet is transmitted at the beginning of the first wait time as well. The packet transmission controller 13 controls transmission of a request packet as well as transmission of a history packet by the history packet transmitter 11 at the beginning of a wait time. In other words, the packet transmission controller 13 controls the history packet transmitter 11 so that a history packet will be transmitted at the beginning of a wait time.

In Pattern A, the port keeping time detector 15 detects the port keeping time of the communication processor 2 based on reception of a return packet by the return packet receiver 14 as well as transmission of a history packet by the history packet transmitter 11. Strictly speaking, as shown in FIG. 3A, the beginning of a wait time is a point in time a history packet passes through the communication processor 2 although it is difficult for the information processor 1 to know the point in time a history packet passes through the communication processor 2. Thus, as shown in FIG. 4A, in the port keeping time detector 15, a point in time a history packet passes through the communication processor 2 as the beginning of a wait time is a point in time the history packet is transmitted. While two or more request packets are transmitted in FIG. 4A, a single request packet may be transmitted by the information processor 1.

[Pattern B]

Figure 4B:
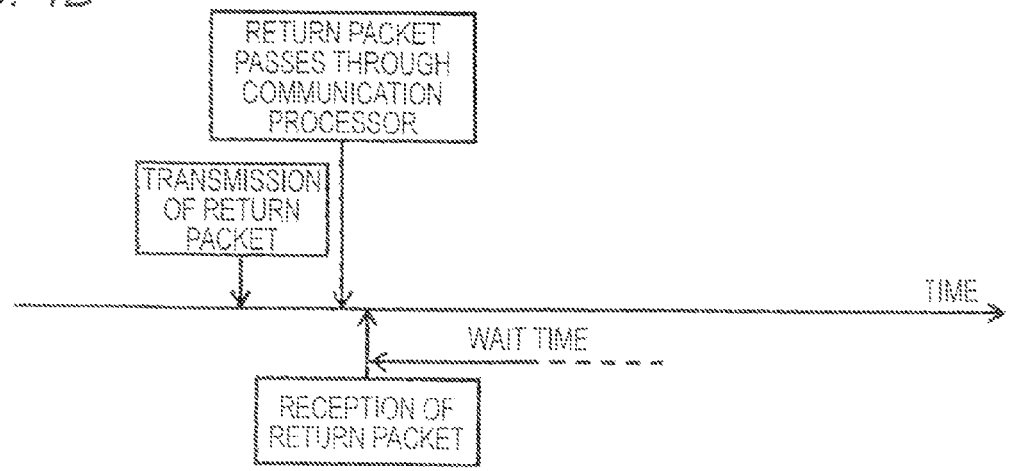
FIG. 4(B) explains the beginning of a wait time according to Embodiment 1.
Figure 4C:
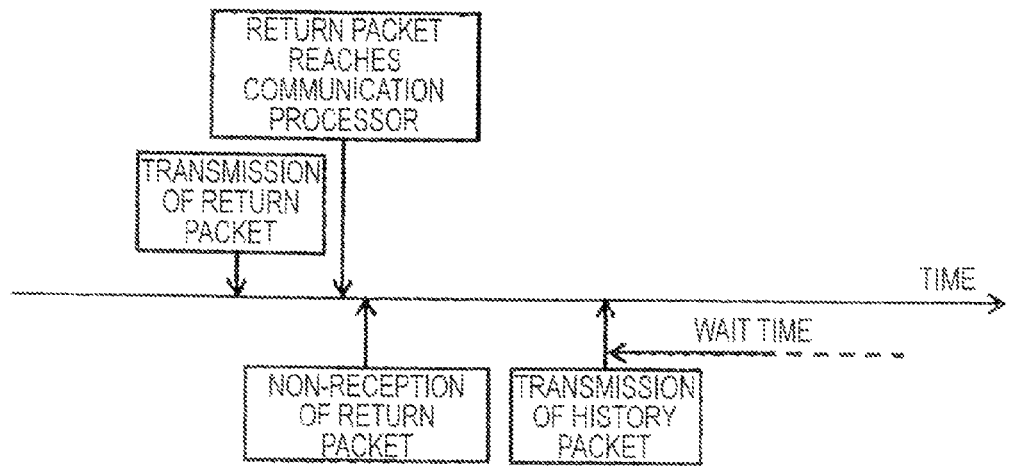
FIG. 4(C) explains the beginning of a wait time according to Embodiment 1.

FIGS. 4B and 4C explain Pattern B. In Pattern B, a packet that passes through a history port at the beginning of a wait time is a history packet or a return packet. In case the information processor 1 has successfully received a return packet, the information processor 1 does not transmit a history packet at the beginning of a wait time as shown in FIG. 4B and the return packet is a packet that passes through a history port at the beginning of a wait time. In case the information processor 1 has failed to receive a return packet, the information processor 1 transmits a history packet at the beginning of a wait time as shown in FIG. 4C and the history packet is a packet that passes through a history port at the beginning of a wait time. It is assumed that a history packet is transmitted at the beginning of a first wait time. The packet transmission controller 13 controls transmission of a request packet as well as controls the history packet transmitter 11 to engage the history packet transmitter 11 to transmit a history packet at the beginning of a next wait time in case the return packet receiver 14 has failed to receive a return packet corresponding to a request packet.

In Pattern B, the port keeping time detector 15 detects the port keeping time of the communication processor 2 based on reception of a return packet by the return packet receiver 14 as well as transmission of a history packet by the history packet transmitter 11. Strictly speaking, as shown in FIGS. 3A and 3B, the beginning of a wait time is a point in time a history packet or a return packet passes through the communication processor 2 although it is difficult for the information processor 1 to know the point in time a history packet or a return packet passes through the communication processor 2. Thus, as shown in FIGS. 4B and 4C, in the port keeping time detector 15, in case a packet passing through a history port at the beginning of a wait time is a history packet, a point in time a packet passes through a history port as the beginning of a wait time is a point in time a history packet is transmitted, and in case a packet passing through a history port at the beginning of a wait time is a return packet, a point in time a packet passes through a history port as the beginning of a wait time is a point in time a return packet is received.

[Pattern C]

Pattern C will be explained using FIG. 4B. In Pattern C, a packet that passes through a history port at the beginning of a wait time is a return packet as shown in FIG. 4B. The packet transmission controller 13 controls transmission of a request packet so that a wait time will increase each time a request packet is transmitted. This is because, in this pattern, a return packet must pass through a history port at the beginning of a wait time and in case the information processor 1 fails to receive a return packet, detection of a port keeping time terminates. Strictly speaking, as shown in FIG. 3B, the beginning of a wait time is a point in time a return packet passes through the communication processor 2 although it is difficult for the information processor 1 to know the point in time a return packet passes through the communication processor 2. Thus, as shown in FIG. 4B, in the port keeping time detector 15, a point in time a packet passes through a history port as the beginning of a wait time is a point in time a return packet is received.

Figure 5A:
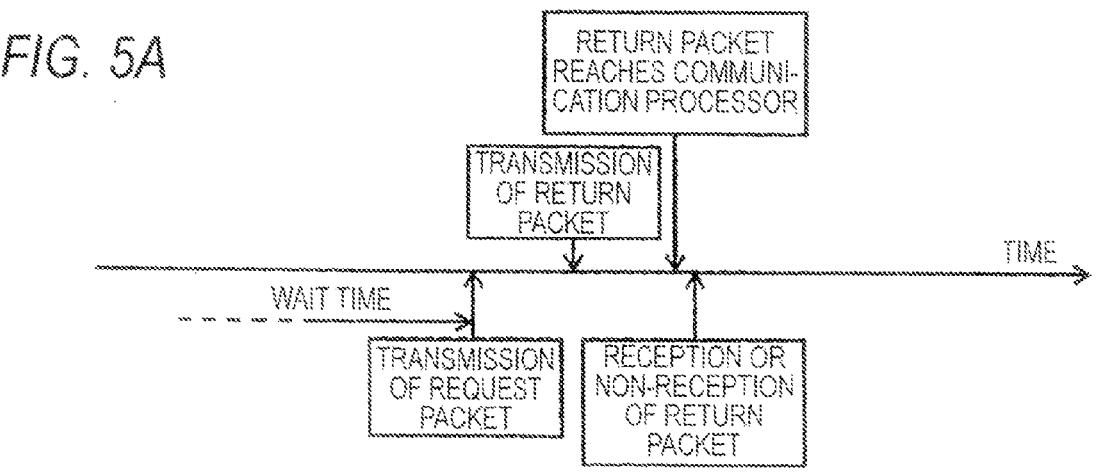
FIG. 5(A) explains the end of a wait time according to Embodiment 1.
Figure 5B:
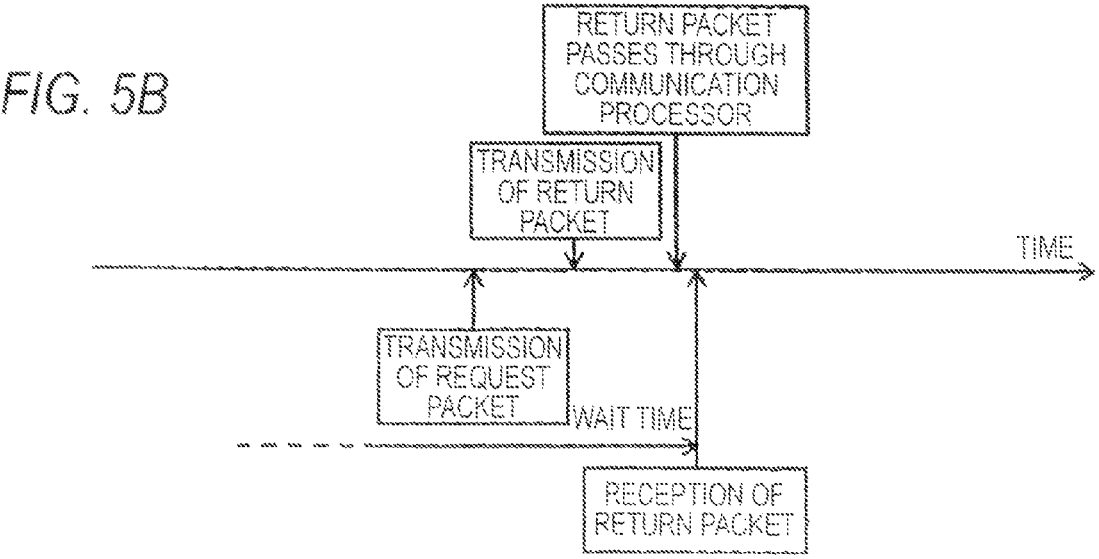
FIG. 5(B) explains the end of a wait time according to Embodiment 1.
Figure 5C:
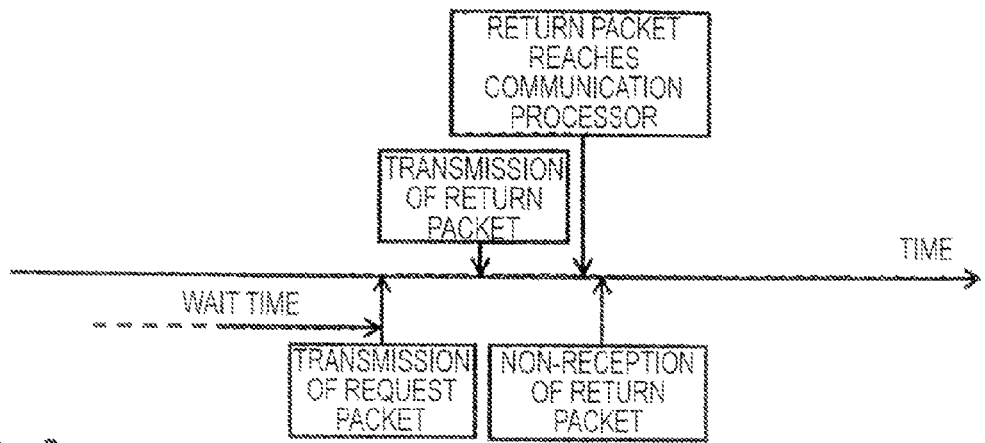
FIG. 5(C) explains the end of a wait time according to Embodiment 1.

Next, the end of a wait time will be described. Description that follows focuses on a single history port. The end of a wait time is a point in time a return packet reaches the history port of the communication processor 2, as shown in FIG. 3B. It is however difficult for the information processor 1 to know the point in time a return packet reaches the communication processor 2. Thus, in measuring a wait time, the port keeping time detector 15 may assume that a point in time a return packet reaches the history port of the communication processor 2 as the end of a wait time is a point in time a request packet requesting transmission of the return packet is transmitted as shown in FIG. 5A (This pattern is called Pattern D). In measuring a wait time, the port keeping time detector 15 may assume that a point in time a return packet reaches the history port of the communication processor 2 as the end of a wait time is a point in time the return packet is received by the information processor 1 as shown in FIG. 5B (this pattern is called Pattern E). In measuring a wait time, in case the information processor 1 has successfully received a return packet, the port keeping time detector 15 may assume that a point in time a return packet reaches the history port of the communication processor 2 as the end of a wait time is a point in time the return packet is received as shown in FIG. 5B, and in case the information processor 1 has failed to receive a return packet, the port keeping time detector 15 may assume that a point in time a return packet reaches the history port of the communication processor 2 as the end of a wait time is a point in time a request packet requesting transmission of the return packet is transmitted as shown in FIG. 5C (this pattern is called Pattern F). Note that any other pattern may be used and the invention is not limited to these three patterns. Port keeping time is detected based on a wait time during which a return packet transmitted at its end is received. Thus, the same port keeping time is detected in Pattern E and Pattern F.

Next, control of transmission of a request packet by the packet transmission controller 13 will be described. For example, the packet transmission controller 13 may control transmission of a request packet for each history port so that a wait time will increase each time a request packet is transmitted, or a wait time will decrease each time a request packet is transmitted. The packet transmission controller 13 may control transmission of a request packet for each history port so that a wait time will increase each time a request packet is transmitted until a return packet corresponding to a request packet is no longer received and so that a wait time will fall between a wait tile during which a return packet is not received and a wait time whichever is the longest during which a return packet is received in case a return packet corresponding to a request packet is no longer received. The wait time during which a return packet is not received refers to a wait time at the end of which a transmitted return packet is not received. The wait time during which a return packet is received refers to a wait time at the end of which a transmitted return packet is received. In case the packet transmission controller 13 controls transmission of a request packet for each history port so that a wait time will increase each time a request packet is transmitted, the port keeping time detector 15 may detect a port keeping time in case the return packet receiver 14 has failed to receive a return packet corresponding to a transmitted request packet, or may terminate transmission of a request packet when the information processor 1 has received a transmitted return packet at the end of a certain wait time and detect the certain wait time as a port keeping time. The packet transmission controller 13 may control transmission of a request packet so that the time from transmission of a first history packet to detection of a port keeping time will be minimized. This control will be detailed using a specific example. Control of transmission of a request packet by the packet transmission controller 13 may be made using another algorithm than the above. Any algorithm may be used as long as the port keeping time of the communication processor 2 may be appropriately detected.

While the beginning of a wait time used by the packet transmission controller 13 is the same as the beginning of a wait time used by the port keeping time detector 15, the end of a wait time used by the packet transmission controller 13 may be a point in time a request packet requesting transmission of a return packet is transmitted. That is, in the packet transmission controller 13, a point in time a return packet reaches the history port of the communication processor 2 as the end of a wait time may be a point in time a request packet requesting transmission of the return packet is transmitted. This is because it is not known whether the information processor 1 will receive a return packet transmitted in response to a request packet in a stage where the packet transmission controller 13 controls transmission of the request packet, and it is impossible to know the point in time the return packet is received. As described above, the wait time used by the packet transmission controller 13 may be different from the wait time used by the port keeping time detector 15.

Next, operation of the information processor 1 according to this embodiment will be described using a flowchart. In this embodiment, the flowchart used depends on the pattern of the beginning of a wait time. Thus, respective flowcharts for Patterns A to C will be described.

Figure 6:
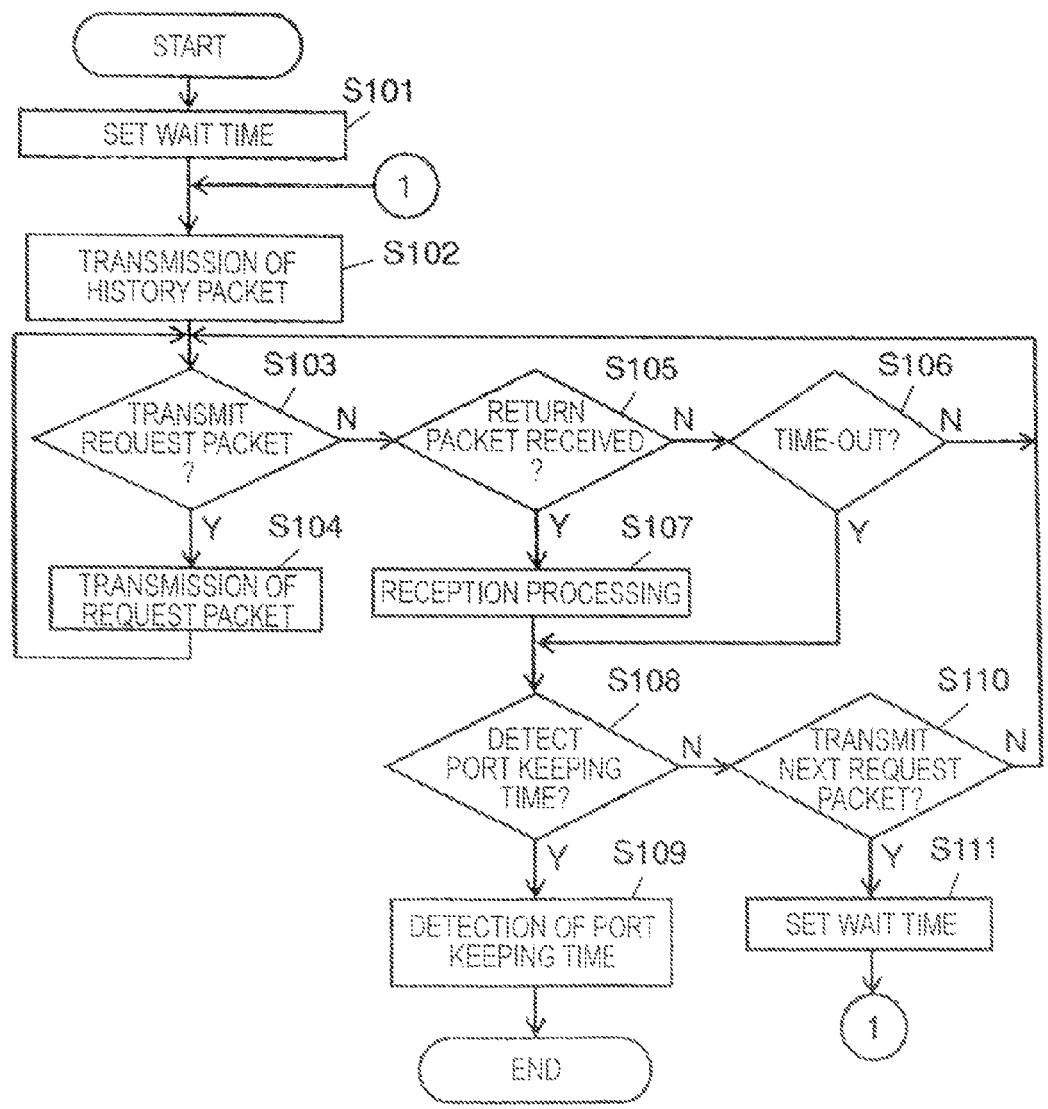
FIG. 6 is a flowchart showing the operation of an information processor according to Embodiment 1.

FIG. 6 is a flowchart showing the operation of the information processor 1 according to this embodiment in Pattern A.

(Step S101) The packet transmission controller 13 sets a wait time. In this example, the packet transmission controller 13 sets a plurality of wait times. Setting of wait times may be recording of wait times into a predetermined memory or setting a flag in association with predetermined wait times included in the information indicating a plurality of wait times that is previously stored on a predetermined recording medium. Any other method may be used.

(Step S102) The packet transmission controller 13 controls the history packet transmitter 11 to engage the history packet transmitter 11 to transmit a single or a plurality of history packets to the server 3. As a result, the single or the plurality of history packets are transmitted from the history packet transmitter 11 to the server 3 via the communication processor 2. For example, the history packet transmitter 11 transmits a history packet generated in the history packet transmitter 11. In case execution has proceeded from step S101 to step S102, a plurality of history packets are transmitted. In case execution has proceeded from step S111 to step S102, a single history packet is transmitted. In case a plurality of history packets are transmitted, those history packets are transmitted via different ports of the communication processor 2.

(Step S103) The packet transmission controller 13 determines whether timing is met for transmitting a request packet. In case timing is met for transmitting a request packet, execution proceeds to step S104. Otherwise, execution proceeds to step S105. Whether timing is met for transmitting a request packet is determined based on whether a wait time set in step S101 or step S1 has elapsed.

(Step S104) The packet transmission controller 13 controls the request packet transmitter 12 to engage the request packet transmitter 12 to transmit a request packet to the server 3. As a result, a request packet is transmitted from the request packet transmitter 12 to the server 3. For example, the request packet transmitter 12 transmits a request packet generated in the request packet transmitter 12. This request packet may include or not include information indicating which history port a return packet should be transmitted to.

(Step S105) The return packet receiver 14 determines whether it has received a return packet transmitted from the server 3 in response to the request packet transmitted in step S104. In case the return packet receiver 14 has received a return packet, execution proceeds to step S107. Otherwise, execution proceeds to step S106.

(Step S106) The return packet receiver 14 determines whether a time-out has occurred. The time-out refers to elapse of a predetermined period such as 10 seconds since the request packet transmitter 12 transmitted a request packet. In case a time-out has occurred, execution proceeds to step S108. Otherwise, execution returns to step S103.

(Step S107) The port keeping time detector 15 performs predetermined reception processing based on a received return packet. The predetermined reception processing may be storing as a wait time into a predetermined memory the period from a point in time a history packet was transmitted to a point in time a return packet was received.

(Step S108) The packet transmission controller 13 determined whether to detect a port keeping time. In case a port keeping time is detected, execution proceeds to step S109. Otherwise, execution proceeds to step s110.

(Step S109) The port keeping time detector 15 detects a port keeping time based on a wait time during which a return packet has been successfully received. This is the end of a series of processing to detect the port keeping time of the communication processor 2.

(Step S110) The packet transmission controller 13 determines whether to transmit a next history packet and a next request packet to a history port where the return packet received in step S105 has passed or a history port that has timed-out in step S106. In step S110, determination is made on a history port where the return packet received in step S105 has passed or a history port that has timed-out in step S106. For example, in case a next request packet is not transmitted to a history port where the return packet received in step S105 has passed even when a next request packet is transmitted to the other history ports in the determination in step S110, it is determined that a next request packet is not transmitted. In case a next request packet is transmitted, execution proceeds to step S111. Otherwise, execution returns to step S103. The case where a next request packet is not transmitted in step S110 may refer to a case where a wait time has elapsed for a history port but a wait time has not yet elapsed for another history port so that execution returns to step S103 in order to transmit a request packet to the other history port for which a wait time has not yet elapsed.

(Step S111) The packet transmission controller 13 sets a wait time related to a history packet to be transmitted anew. Then execution proceeds to step S102.

The processing sequence of step S108 and step S110 may be changed in the flowchart of FIG. 6. That is, the sequence is possible where it is determined whether to transmit a next request packet in step S110 and execution proceeds to step S111 in case a next request packet is transmitted and execution proceeds to step S108 otherwise. In case a port keeping time is detected in step S108, execution may proceed to step S109. Otherwise, execution may return to step S103. In this way, the processing sequence is somewhat arbitrary in the flowchart. This is the same for the flowcharts described later.

While a history packet in the first transmission and a history packet in the second transmission are transmitted under the control of the packet transmission controller 13 in the description of the flowchart of FIG. 6, a history packet in the first transmission may be transmitted based on the determination made by the history packet transmitter 11 rather than under the control of the packet transmission controller 13.

Figure 7:
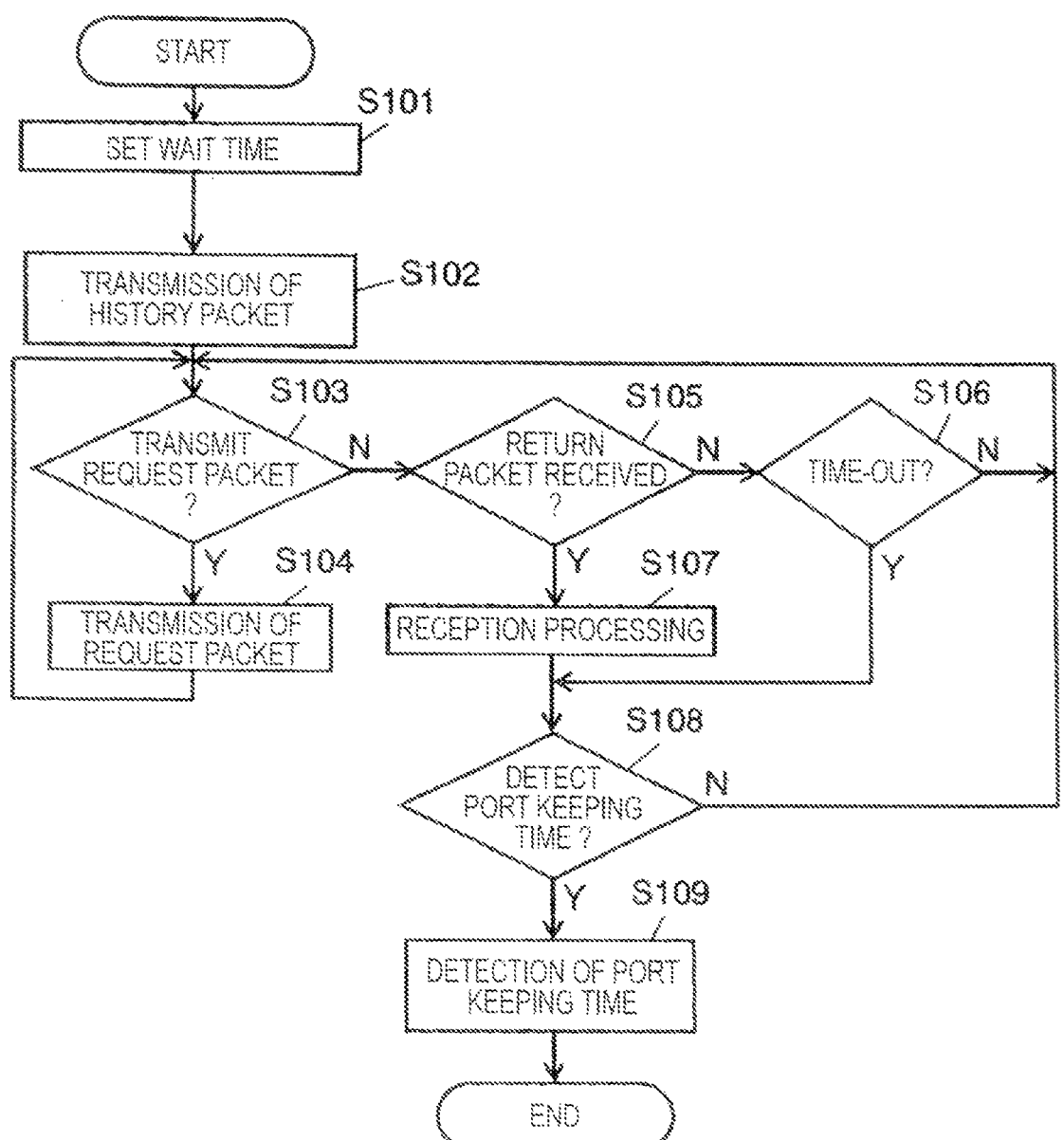
FIG. 7 is a flowchart showing the operation of the information processor according to Embodiment 1.

In case a history packet is transmitted for each history port only once in the flowchart of FIG. 6, the flowchart of FIG. 7 is used. Processing in the flowchart of FIG. 7 is the same as that in the flowchart of FIG. 6 so that the corresponding description is omitted.

Figure 8:
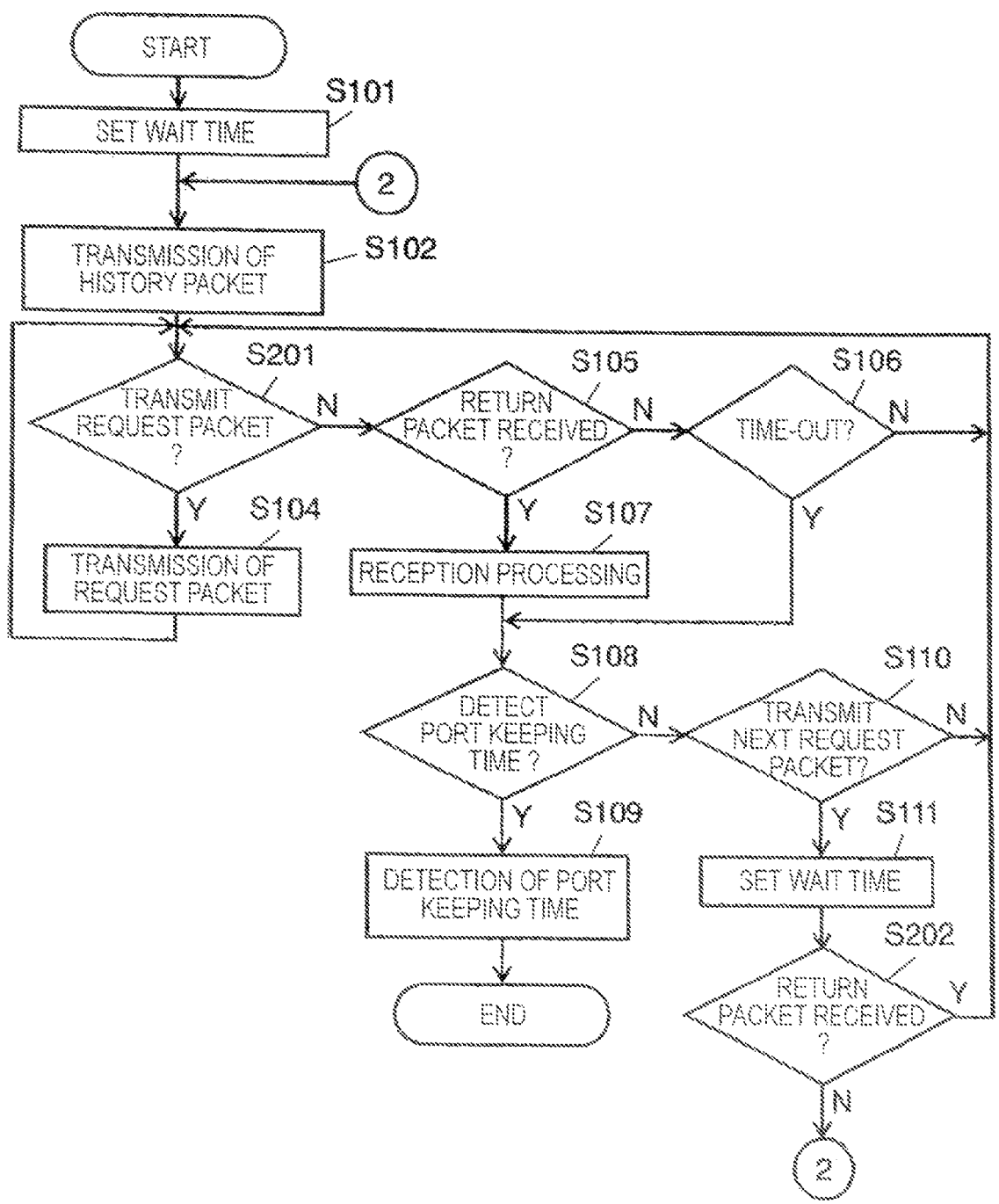
FIG. 8 is a flowchart showing the operation of the information processor according to Embodiment 1.

FIG. 8 is a flowchart showing the operation of the information processor 1 according to this embodiment in Pattern B. Processing other than steps S201 and S202 is the same as that in the flowchart of FIG. 6 so that the corresponding description is omitted. The predetermined reception processing in step S107 may be storing as a wait time into a predetermined memory the period from a point in time a return packet was received to a point in time a next return packet was received in case the beginning of a wait time is reception of a return packet.

(Step S201) The packet transmission controller 13 determines whether timing is met for transmitting a request packet. In case timing is met for transmitting a request packet, execution proceeds to step S104. Otherwise, execution proceeds to step S105. Whether timing is met for transmitting a request packet is determined based on whether a wait time set in step S101 or step S111 has elapsed since a history packet was transmitted in step S102 in case a history packet was transmitted at the beginning of a wait time (step S102), or based on whether a wait time set in step S111 has elapsed since a return packet was received in step S105.

(Step S202) The packet transmission controller 13 determines whether a return packet was received in step S105 or a time-out occurred in step S106. That is, the packet transmission controller 13 determines whether execution proceeded from step S105 to step S108 via step S107 or from step S106 to step S108. In case a return packet was received, execution returns to step S201. Otherwise, execution returns to step S102.

Figure 9:
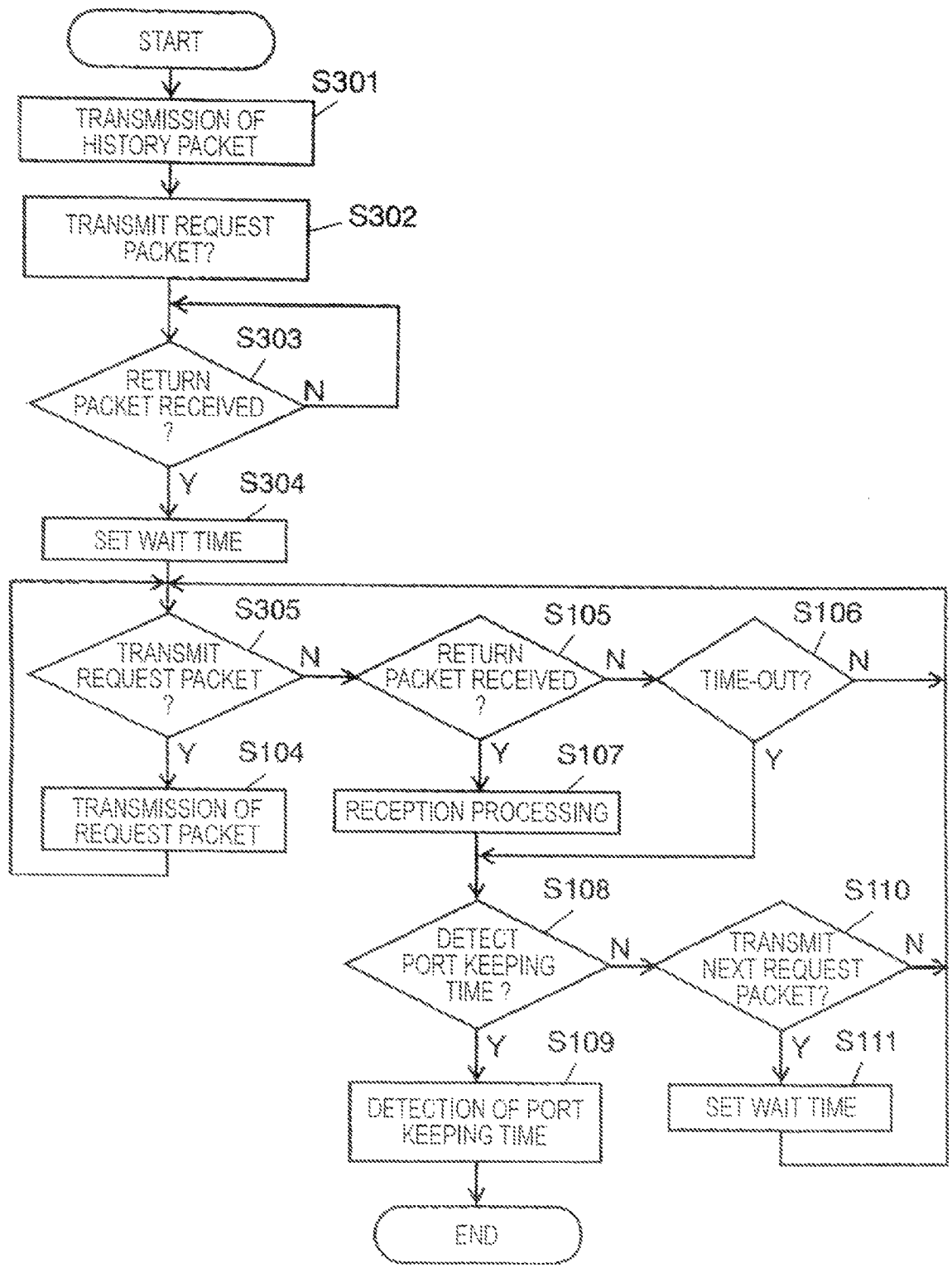
FIG. 9 is a flowchart showing the operation of the information processor according to Embodiment 1.

FIG. 9 is a flowchart showing the operation of the information processor 1 according to this embodiment in Pattern C. Processing other than steps S301 to step S305 is the same as that in the flowchart of FIG. 6 so that the corresponding description is omitted. The predetermined reception processing in step S107 may be storing as a wait time into a predetermined memory the period from a point in time a return packet was received to a point in time a next return packet was received.

(Step S301) The packet transmission controller 13 controls the history packet transmitter 11 to engage the history packet transmitter 11 to transmit a plurality of history packets to the server 3. As a result, a plurality of history packets are transmitted from the history packet transmitter 11 to the server 3.

(Step S302) The packet transmission controller 13 controls the request packet transmitter 12 to engage the request packet transmitter 12 to transmit a plurality of request packets to the server 3. As a result, a plurality of request packets are transmitted from the request packet transmitter 12 to the server 3.

(Step S303) The return packet receiver 14 determines whether it has received a plurality of return packets transmitted from the server 3 in response to a plurality of request packets transmitted in step S302. In case the return packet receiver 14 has received all return packets corresponding to the plurality of request packets, execution proceeds to step S304. Otherwise, processing in step S303 is repeated until all return packets are received. In case it is impossible to receive a return packet because of the server 3 being down or the like, the return packet receiver 14 may determine that a time-out has occurred after a predetermined time such as one minute has elapsed since a request packet was transmitted and terminate a series of processing.

(Step S304) The packet transmission controller 13 sets a plurality of wait times as periods from when a return packet is received to when a request packet is transmitted. The wait times are set for each history port where each history packet transmitted in step S301 has passed. Processing to set wait times is the same as step S101 so that the corresponding description is omitted.

(Step S305) The packet transmission controller 13 determines whether timing is met for transmitting a request packet. In case timing is met for transmitting a request packet, execution proceeds to step S104. Otherwise, execution proceeds to step S105. Whether timing is met for transmitting a request packet is determined based on whether a wait time set in step S304 or step S111 has elapsed since a request packet was received in step S303 or S105.

While a plurality of request packets are transmitted and the plurality of request packets are used to request the server 3 to transmit return packets to a plurality of history ports in the processing of step S302 in the flowchart of FIG. 9, a single request packet may be transmitted and the single request packet may be used to request the server 3 to transmit return packets to a plurality of history ports.

In case it is determined that a time-out has occurred in step S106 in the flowcharts of FIGS. 6 to 9, for example, the port keeping time detector 15 may perform some processing upon time-out.

Operation of the server 3 according to this embodiment will be described using the flowchart of FIG. 10.

(Step S401) The history packet receiver 33 determines whether it has received a history packet transmitted from the information processor 1. In case the history packet receiver 33 has received a history packet, execution proceeds to step S402. Otherwise, execution proceeds to step S403.

(Step S402) The destination information storage 34 reads a source address and a source port number from the header of the history packet received by the history packet receiver 33 and stores the destination information including the source address and the source port number onto a predetermined medium. Execution then returns to step S401.

(Step S403) The request packet receiver 31 determines whether it has received a request packet. In case the request packet receiver 31 has received a request packet, execution proceeds to step S404. Otherwise, execution returns to step S401.

(Step S404) The return packet transmitter 32 reads the destination information stored by the destination information storage 34.

(Step S405) The return packet transmitter 32 transmits a request packet based on the destination information read in step S404. The destination of this return packet is an address and a port number indicated by the readout destination information. For example, the return packet transmitter 32 transmits a return packet generated in the return packet transmitter 32. Execution then returns to step S401.

In the flowchart of FIG. 10, processing is terminated by power off or a processing termination interrupt.

Operation of the information processing system according to this embodiment will be described using specific examples. The examples include: a case where a plurality of history packets are simultaneously transmitted only once in Pattern A (Example 1); a case where a port keeping time is detected by increasing a wait time each time a request packet is transmitted in Pattern A (Example 2); a case where a port keeping time is detected by decreasing a wait time each time a request packet is transmitted in Pattern A (Example 3); a case where transmission of a request packet is controlled so that in Pattern B the time from the first transmission of a history packet to detection of a port keeping time will be the shortest (Example 4); and a case where a port keeping time is detected by increasing a wait time each time a request packet is transmitted in Pattern C (Example 5). The examples will be described below.

In the following examples, the port keeping time of the communication processor 2 is 1 minute 18 seconds unless otherwise specified. In case a return packet is not received after 10 seconds have elapsed from a time point a request packet was transmitted, it is assumed that a time-out has occurred. The information processor 1 performs detection of the port keeping time of the communication processor 2 by using three history ports of the communication processor 2 as shown in FIG. 2. The IP addresses of the information processor 1, communication processor 2 and server 3 are as follows. The IP address of the communication processor 2 is an address on the side of the communication circuit 100.

Information processor 1: 192.168.0.1
Communication processor 2: 202.224.135.10
Server 3: 155.32.10.10

FIGS. 11A to 11C show the structure of a history packet, a request packet and a return packet in the following examples. Each of the history packet, request packet and return packet has a UDP header and includes a packet type identification information in its payload. The packet type identification information is information to identify the packet type. The information processor 1 and the server 3 identifies a packet as a history packet, a request packet or a return packet based on the packet type identification information. The payload of a history packet, request packet or a return packet includes port identification information. The port identification information is information to identify a history port where a history packet passes. Based on the port identification information included in a history packet, the destination information storage 34 of the server 3 stores destination information in association with the port identification information. Based on the port identification information included in a request packet, the return packet transmitter 32 of the server 3 reads the destination information corresponding to the port identification information included in the request packet as well as transmit a return packet to a history port corresponding to the request packet. Based on the port identification information included in a return packet, the packet transmission controller 13 of the information processor 1 or the like knows which history port is related to a return packet just received.

EXAMPLE 1

This example pertains to a case where a plurality of history packets are simultaneously transmitted only once in Pattern A and the packet transmission controller 13 controls transmission of a request packet corresponding to each history port. The port keeping time detector 15 detects a port keeping time in case the return packet receiver 14 has received return packets corresponding to all request packets transmitted or in case the return packet receiver 14 has failed to receive a return packet corresponding to a request packet transmitted. The end of a port keeping time is Pattern D.

The packet transmission controller 13 sets a wait time to "30 seconds", "1 minute" and "1 minute 30 seconds" (step S101). Then, under the control of the packet transmission controller 13, the history packet transmitter 11 simultaneously transmits three history packets having a structure shown in FIG. 11A to the IP address "155.32.10.10" of the server 3 (step S102). The expression "simultaneously transmits" means that the transmission timings of the three history packets are strictly the same or the transmission timings of the three history packets are shifted by the time required for control of packet transmission (generally a negligible small amount of time). The payload of a history packet corresponding to the wait time "30 seconds" includes the port identification "P001". The payload of a history packet corresponding to the wait time "1 minute" includes the port identification "P002". The payload of a history packet corresponding to the wait time "1 minute 30 seconds" includes the port identification "P003". The packet transmission controller 13 retains a table shown in FIG. 12 showing the correspondence between port identification information and a wait time in a memory (not shown). A history packet including the port identification information P001 is transmitted to the server 3 via a port having the port number "12345" of the communication processor 2 (hereinafter referred to as "Port 12345", the same applies to other port numbers). A history packet including the port identification information P002 and a history packet including the port identification information P003 are respectively transmitted to the server 3 via Port 12346 and Port 12347 of the communication processor 2. The packet transmission controller 13 and the port keeping time detector 15 start time counting from a point in time a history packet is transmitted.

The history packet receiver 33 of the server 3 receives three history packets and passes those history packets to the destination information storage 34 (step S401). The destination information storage 34 reads the port identification information "P001", "P002" and "P003" from the payloads of respective history packets. The destination information storage 34 reads the source address "202.224.135.10" and respective source port numbers "12345", 12346" and "12347" from the headers of those history packets. The destination information storage 34 then stores destination information including the source address "202.224.135.10" and the source port number "12345" in association with the port identification information "P001", destination information including the source address "202.224.135.10" and the source port number "12346" in association with the port identification information "P002", and destination information including the source address "202.224.135.10" and the source port number "12347" in association with the port identification information "P003" (step S402). FIG. 13 shows correspondence between device identification information and destination information stored by the destination information storage 34. The first to third records in FIG. 13 show correspondence between three items of port identification information and destination information concerning three history ports of the communication processor 2.

After that, the packet transmission controller 13 determines whether any of the wait times "30 seconds", "1 minute" and "1 minute 30 seconds" shown in FIG. 12 has elapsed since time counting started, and determines that timing is met for transmitting a request packet when the timer value has indicated "30 seconds" (step S103). The packet transmission controller 13 controls the request packet transmitter 12 to engage the request packet transmitter 12 to transmit a request packet including the port identification information "P001". As a result, a request packet having a structure shown in FIG. 11B is transmitted from the request packet transmitter 12 to the server 3 (step S104). The port identification information included in this request packet is "P001". As mentioned earlier, the request packet is transmitted from a part different from the history port of the information processor 1 from which the history packet was transmitted. In this example, it is assumed that a request packet is transmitted via Port 12355 of the communication processor 2. The port keeping time detector 15 acquires a timer value with a timing a request packet is transmitted and retains the then timer value "30 seconds" as a wait time. The port keeping time detector 15 retains the wait time in association with the port identification information "P001". The port identification information has been received from the packet transmission controller 13. It is assumed that time counting by the timer is under way.

The request packet is received by the request packet receiver 31 of the server 3 and is passed to the return packet transmitter 32 (step S403). The return packet transmitter 32 reads the port identification information "P001" included in the payload of the request packet and reads the destination information stored in association with the port identification information, that is, the IP address "202.224.235.10" and the port number "12345" (step S404). The return packet transmitter 32 transmits a return packet having a structure shown in FIG. 11C, that is, a return packet having the port identification information "P001" in its payload to the readout IP address and port number (step S405).

The return packet reaches Port 12345 of the communication processor 2. The port keeping time "1 minute 18 seconds" related to the port has not yet elapsed so that the return packet undergoes address conversion and is transmitted to the information processor 1.

The return packet receiver 14 of the information processor 1 receives the return packet (step S105) and passes a notice to the packet transmission controller 13 and the port keeping time detector 15 that a return packet including the port identification information "P001" has been successfully received. The port keeping time detector 15 retains the notice that a return packet related to the wait time "30 seconds" has been successfully received (step S107). Only one return packet out of the three return packets having been received, the packet transmission controller 13 determines that transmission of a request packet will be continued (step S108).

After that, same as the foregoing description, the packet transmission controller 13 determines that timing is met for transmitting a request packet when the timer value has indicated 1 minute since time counting started (step S103). The packet transmission controller 13 controls the request packet transmitter 12 to engage the request packet transmitter 12 to transmit a request packet including the port identification information "P002". As a result, a request packet including the port identification information "P002" is transmitted from the request packet transmitter 12 to the server 3 (step S104). It is assumed that the request packet is transmitted via Port 12355 of the communication processor 2. The port keeping time detector 15 acquires a timer value with a timing a request packet is transmitted and retains the then timer value "1 minute" in association with the port identification information "P002". It is assumed that time counting by the timer is under way.

Same as the above description, the request packet is received by the request packet receiver 31 of the server 3 (step S403). After that, the IP address "202.224.235.10" and the port number "12346" corresponding to the port identification information "P002" are read (step S404). A return packet including the port identification information "P002" is transmitted to the readout IP address and port number (step S405).

The return packet reaches Port 12346 of the communication processor 2. The port keeping time "1 minute 18 seconds" related to the port has not yet elapsed so that the return packet undergoes address conversion and is transmitted to the information processor 1.

The return packet is received by the return packet receiver 14 (step S105) and a notice that a return packet corresponding to the wait time "1 minute" has been successfully received is retained by the port keeping time detector 15 (step S107). Two return packets out of the three return packets having been received, the packet transmission controller 13 determines that transmission of a request packet will be continued (step S108).

After that, same as the foregoing description, the packet transmission controller 13 determines that timing is met for transmitting a request packet when the timer value has indicated 1 minute and 30 seconds since time counting started (step S103). The packet transmission controller 13 controls the request packet transmitter 12 to engage the request packet transmitter 12 to transmit a request packet including the port identification information "P003". As a result, a request packet including the port identification information "P003" is transmitted from the request packet transmitter 12 to the server 3 (step S104). It is assumed that the request packet is transmitted via Port 12355 of the communication processor 2. The port keeping time detector 15 acquires a timer value with a timing a request packet is transmitted and retains the then 1.5 timer value "1 minute 30 seconds" in association with the port identification information "P003". Return packets corresponding to all wait times shown in FIG. 12 having been received, the port keeping time detector 15 terminates time counting on a timer.

Same as the above description, the request packet transmitted from the information processor 1 is received by the request packet receiver 31 of the server 3 (step S403). After that, a return packet including the port identification information "P003" is transmitted to the IP address "202.224.235.10" and the port number "12347" (steps S404, S405).

The return packet reaches Port 12347 of the communication processor 2. The port keeping time "1 minute 18 seconds" related to the port has elapsed so that the return packet is not transmitted to the information processor 1. The return packet receiver 14 of the information processor 1 determines that a time-out has occurred when 10 seconds have elapsed since a request packet including the port identification information "PO03" was transmitted (step S106) and passes a notice to the port keeping time detector 15 that a return packet including the port identification information "P003" has not been received. The port keeping time detector 15 retains the notice that a return packet related to the wait time "1 minute 30 seconds" has not been received.

After that, a return packet having not been received, the packet transmission controller 13 determines that timing is met for detecting a port keeping time (step S108) and passes an instruction to detect a port keeping time to the port keeping time detector 15. In response to the instruction, the port keeping time detector 15 detects as the port keeping time of the communication processor 2 the longest wait time "1 minute" of the wait times "30 seconds" and "1 minute" during which a return packet has been successfully received (step S109).

After that, the detected port keeping time is used for example in the processing by a predetermined processor (not shown) of the information processor 1. The processing made by the processor may be storing the detected port keeping time onto a predetermined recording medium (not shown), using the detected port keeping time as a periodical packet transmission period to periodically transmit a packet to the server 3 or the like, transmitting the detected port keeping time to a device connected to the local network side of the communication processor 2 in case the device periodically transmits a packet, or any other processing. In this way, the detected port keeping time may be used by the information processor 1 or by another information processor connected to the local network side of the communication processor 2. A packet periodically transmitted using the port keeping time may be destined to the server 3 or another server. A period shorter than the detected port keeping time may be used as the transmission period of a packet to be periodically transmitted.

FIG. 14 explains transmission of a history packet, transmission of a request packet, and reception (or non-reception) of a return packet in this example. While a return packet corresponding to a wait time of 30 seconds or 1 minute was successfully received in this case, a return packet corresponding to a wait time of 1 minute 30 seconds was not received, so that the port keeping time detected was 1 minute. In FIG. 14, each history port identified by the port identification information "P001" or the like is represented by "History Port P001" or the like and transmission of a history packet and reception of a return packet are described for each history port. The same applies to the following examples.

EXAMPLE 2

This example pertains to a case where the beginning of a wait time is Pattern A and a wait time increases each time a request packet is transmitted for each history port. The port keeping time detector 15 detects a port keeping time in case the return packet receiver 14 has failed to receive a return packet corresponding to a request packet. The end of a port keeping time is Pattern E.

FIG. 15 shows the wait time setting information retained by the packet transmission controller 13 of the information processor 1. In the wait time setting information, a wait time and a preset flag are associated with each other. The wait time corresponding to the preset flag "1" is a wait time previously set as timing for transmitting a request packet. The packet transmission controller 13 uses the wait times corresponding to the preset flag "0" in ascending order of length in this wait time setting information. In the wait time setting information in FIG. 15, the upper limit of a wait time is "5 minutes". In case the information processor 1 has successfully received a return packet corresponding to a request packet transmitted at the wait time of "5 minutes", no further request packets are transmitted and a port keeping time is detected.

The packet transmission controller 13 sets wait times to "30 seconds", "1 minute" and "1 minute 30 seconds" (step S101). As shown in FIG. 15, the packet transmission controller 13 sets a preset flag corresponding to the wait times "30 seconds", "1 minute" and "1 minute 30 seconds" to "1". After that, under the control of the packet transmission controller 13, the history packet transmitter 11 simultaneously transmits three history packets to the IP address "155.32.10.10" of the server 3 (step S102). The payloads of history packets corresponding to the wait times "30 seconds", "1 minute" and "1 minute 30 seconds" respectively include the port identification information "UP001", "P002" and "P003", same as Example 1. The packet transmission controller 13 starts time counting at the point in time a history packet is transmitted.

Figures 16A, 16B, 17:
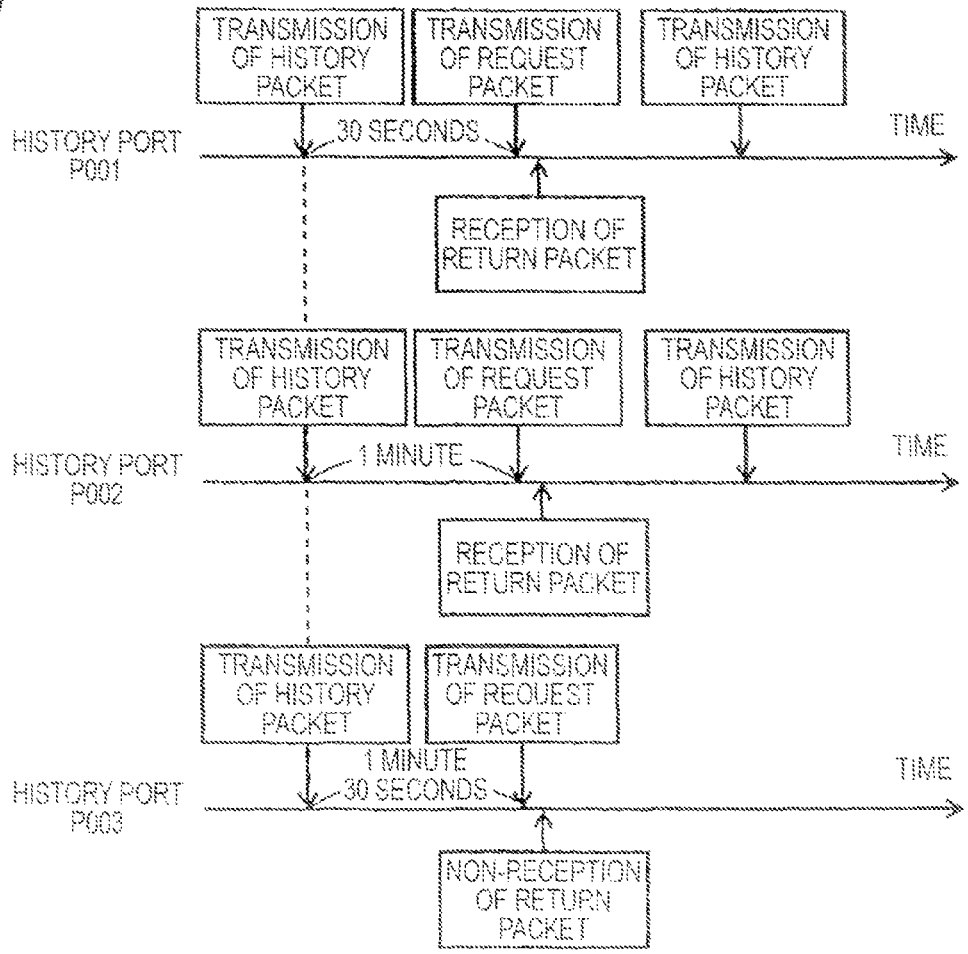
FIG. 16A explains an example of correspondence between port identification information, a wait time and a timer value according to Embodiment 1.
FIG. 16B explains an example of correspondence between port identification information, a wait time and a timer value according to Embodiment 1.
FIG. 17 explains transmission/reception of packets according to Embodiment 1.

The packet transmission controller 13 retains in a memory (not shown) a table shown in FIG. 16A indicating correspondence between port identification information, a wait time and a timer value. The timer value is updated over time. In the table of FIG. 16A, each timer value is updated independently. FIG. 16A shows the table assumed when 15 seconds have elapsed since three history packets were transmitted.

A history packet transmitted from the information processor 1 undergoes address conversion in the communication processor 2 and is transmitted to the server 3. Same as Example 1, the history packet is received by the history packet receiver 33 of the server 3 (step S401) and destination information is stored in the destination information storage 34 (step S402). In this example also, the destination information stored in the destination information storage 34 is shown in FIG. 13.

After that, the packet transmission controller 13 determines, in the table shown in FIG. 16A, whether a timer value corresponding to the port identification information "P001" has exceeded the wait time "30 seconds" corresponding to the port identification information "P001". The packet transmission controller 13 determines that timing is met for transmitting a request packet when the timer value corresponding to the port identification information "P001" has indicated "30 seconds" (step S103). The packet transmission controller 13 controls the request packet transmitter 12 to engage the request packet transmitter 12 to transmit a request packet including the port identification information "P001". As a result, the request packet transmitter 12 transmits a request packet including the port identification information "P001" to the server 3 (step S104).

The request packet is received by the request packet receiver 31 of the server 3 (step S403). Same as Example 1, the return packet transmitter 32 reads the port identification information "P001" included in the payload of the request packet and reads the destination information stored in association with the port identification information (step S404), and transmits a return packet including the port identification information "P001" to the communication processor 2 based on the readout destination information (step S405).

The return packet reaches Port 12345 of the communication processor 2. The port identification information "1 minute 18 seconds" related to the port has not yet elapsed so that the return packet undergoes address conversion and is transmitted to the information processor 1.

The return packet receiver 14 of the information processor 1 receives the return packet (step S105) and passes a notice to the packet transmission controller 13 that a return packet including the port identification information "P001" has been successfully received. The packet transmission controller 13 passes to the port keeping time detector 15 the timer value "31 seconds" corresponding to the then port identification information "P001" as a wait time during which a return packet has been successfully received. The port keeping time detector 15 retains the wait time "31 seconds" as a wait time during which a return packet has been successfully received (step S107). While the period from transmission of a request packet to reception of a return packet is "1 second" in this example, the period changes to 0.5 seconds, 2 seconds or 3 seconds or the like depending on the state of the communication circuit 100 or processing speed of the server 3. In the following examples also, it is assumed that the period from transmission of a request packet to reception of a return packet is "1 second".

A return packet having been received, the packet transmission controller 13 determines that a port keeping time will not be detected (step S108). The wait time setting information shown in FIG. 15 includes a wait time with the preset flag "0" so that the packet transmission controller 13 determines that a next request packet will be transmitted (step S110) and sets the wait time corresponding to the port identification information "P001" on the port that received a return packet to "2 minutes". The packet transmission controller 13 updates the preset flag corresponding to the wait time "2 minutes" to "1" in the wait time setting information (step S111).

After that, same as the foregoing description, a history packet including the port identification information "P001" is transmitted to the server 3. At a point in time the history packet is transmitted, time counting by a timer corresponding to the port identification information "P001" starts anew in the table shown in FIG. 16B (step S102). FIG. 16B shows the table assumed when 5 seconds have elapsed since the history packet was transmitted. In FIG. 16B, the period from reception of a return packet to transmission of a history packet is neglected for ease of explanation.

Destination information is stored into the server 3 based on the history packet transmitted from the information processor 1. In this case, destination information corresponding to the port identification information "P001" is already stored so that the existing destination information is overwritten with the new destination information. The port keeping time related to the history port has not yet elapsed so that the destination information stored by overwriting is the same as the first record in FIG. 13.

In the table shown in FIG. 16B, when the timer value corresponding to the port identification information "P002" indicates the wait time "1 minute" corresponding to the port identification information "P002", a request packet including the port identification information "P002" is transmitted, same as the above description (steps S103, S104). A return packet transmitted in response to the request packet also undergoes address conversion and is transmitted to the information processor 1 because the port keeping time "1 minute 18 seconds" has not yet elapsed at the communication processor 2.

The return packet receiver 14 of the information processor 1 receives the return packet (step S105) and passes a notice to the packet transmission controller 13 that a return packet including the port identification information "P002" has been successfully received. The packet transmission controller 13 passes to the port keeping time detector 15 the timer value "1 minute 1 second" corresponding to the then port identification information "P002" as a wait time during which a return packet has been successfully received. The port keeping time detector 15 retains the wait time "1 minute 1 second" as a wait time during which a return packet has been successfully received (step S107).

A return packet having been received, the packet transmission controller 13 determines that a port keeping time will not be detected (step S108). The wait time setting information shown in FIG. 15 includes a wait time with the preset flag "0" so that the packet transmission controller 13 determines that a next request packet will be transmitted (step S110) and sets the wait time corresponding to the port identification information "P002" on the port that received a return packet to "3 minutes". The packet transmission controller 13 updates the preset flag corresponding to the wait time "3 minutes" to "1" in the wait time setting information (step S111).

After that, same as the foregoing description, a history packet including the port identification information "P002" is transmitted to the server 3. At a point in time the history packet is transmitted, time counting by a timer corresponding to the port identification information "P002" starts anew in the table shown in FIG. 16B (step S102).

In the table shown in FIG. 16B, when the timer value corresponding to the port identification information "P003" indicates the wait time "1 minute 30 seconds" corresponding to the port identification information "P003", a request packet including the port identification information "P003" is transmitted, same as the above description (steps S103, S104). A return packet transmitted in response to the request packet does not undergo address conversion because the port keeping time "1 minute 18 seconds" has elapsed at the communication processor 2, and is not transmitted to the information processor 1. As a result, when 10 seconds have elapsed since a request packet including the port identification information "P003" was transmitted, it is determined that a time-out has occurred (step S106). The return packet receiver 14 passes a notice to the packet transmission controller 13 that the return packet receiver 14 has failed to receive a return packet. The packet transmission controller 13 determines that timing is met for detecting a port keeping time (step S108) and passes an instruction to detect a port keeping time to the port keeping time detector 15. The port keeping time detector 15 detects as the port keeping time of the communication processor 2 the longest wait time "1 minute 1 second" of the wait times "31 seconds" and "1 minute 1 second" during which a return packet has been successfully received (step S109). The subsequent processing using the port keeping time is the same as that in Example 1 so that the corresponding description is omitted.

FIG. 17 explains transmission of a history packet, transmission of a request packet, and reception (or non-reception) of a return packet in this example. While a return packet corresponding to a wait time of 30 seconds or 1 minute was successfully received in this case, a return packet corresponding to a wait time of 1 minute 30 seconds was not received, so that the port keeping time detected was 1 minute. Although a history packet at the beginning of the wait time "2 minutes" or "3 minutes" was transmitted, a return packet was not received after the history packet was transmitted and before the wait time has elapsed. Thus, a port keeping time was detected. In this case, a request packet requesting transmission of a return packet reaching a history port is not transmitted at the end of the wait time "2 minutes" or "3 minutes" and a corresponding return packet is not transmitted from the server 3.

While destination information corresponding to device identification information is stored by way of overwriting in case a history packet is received by the server 3 in this example, storage of destination information y way of overwriting is not necessary in case the destination information is unchanged.

While a wait time increases each time a request packet is transmitted at each history port in this example, a wait time need not increase each time a request packet is transmitted for the entirety of the history ports in this case. For example, in case wait times are set in the order of 1 minute and 5 minutes for a history port and wait times are set in the order of 3 minutes and 4 minutes for another history port, a wait time increases each time a request packet is transmitted at each history port. For the entirety of the history ports, a request packet related to the wait time of 4 minutes is transmitted after a request packet related to the wait time of 5 minutes is transmitted. A wait time may increase each time a request packet is transmitted for the entirety of the history ports.

EXAMPLE 3

This example pertains to a case where the beginning of a wait time is Pattern A and a wait time decreases each time a request packet is transmitted for each history port. The port keeping time detector 15 detects a port keeping time in case the return packet receiver 14 has successfully received a return packet corresponding to a request packet and after judgment of the propriety of reception of a return packet transmitted at the end of a wait time longer than a wait time during which the history packet was successfully received. The end of a port keeping time is Pattern F.

In this example also, setting of a wait time is made using the wait time setting information shown in FIG. 15. In this example, the packet transmission controller 13 uses the wait times corresponding to the preset flag "0" in descending order of length in the wait time setting information shown in FIG. 15.

The packet transmission controller 13 sets wait times to "5 minutes", "4 minutes" and "3 minutes" (step S101). As shown in FIG. 18, the packet transmission controller 13 sets a preset flag corresponding to the wait times "5 minutes", "4 minutes" and "3 minutes" to "1". After that, under the control of the packet transmission controller 13, the history packet transmitter 11 simultaneously transmits three history packets to the IP address "155.32.10.10" of the server 3 (step S102). The payloads of history packets corresponding to the wait times "5 minutes", "4 minutes" and "3 minutes" respectively include the port identification information "P001", "P002" and "PO03", same as Example 1. The packet transmission controller 13 starts time counting at the point in time a history packet is transmitted. The packet transmission controller 13 controls the transmission timing of a request packet by using a table similar to that shown in FIG. 16A.

A history packet transmitted from the information processor 1 undergoes address conversion in the communication processor 2 and is transmitted to the server 3. Same as Example 1, the history packet is received by the history packet receiver 33 of the server 3 (step S401) and destination information is stored in the destination information storage 34 (step S402). In this example also, the destination information stored in the destination information storage 34 is shown in FIG. 13.

After that, the packet transmission controller 13 determines, in the table shown in FIG. 16A, that timing is met for transmitting a request packet at a point in time a timer value corresponding to the port identification information "P003" has indicated the wait time "3 minutes" corresponding to the port identification information "P003" (step S103). The packet transmission controller 13 controls the request packet transmitter 12 to engage the request packet transmitter 12 to transmit a request packet including the port identification information "P003". As a result, the request packet transmitter 12 transmits a request packet including the port identification information "P003" to the server 3 (step S104). The packet transmission controller 13 acquires the then timer value "3 minutes" with the timing a request packet is transmitted and temporarily stores the timer value. Time counting by the timer corresponding to the port identification information "P003" is under way.

A return packet transmitted in response to the request packet does not undergo address conversion because the port keeping time "1 minute 18 seconds" has elapsed at the communication processor 2, and is not transmitted to the information processor 1. As a result, when 10 seconds have elapsed since a request packet including the port identification information "P003" was transmitted, it is determined that a time-out has occurred (step S106). The return packet receiver 14 passes a notice to the packet transmission controller 13 that the return packet receiver 14 has failed to receive a return packet. The packet transmission controller 13 passes to the port keeping time detector 15 the timer value "3 minutes" temporarily retained before transmitting a request packet as a wait time during which a return packet has not been received. The port keeping time detector 15 retains the wait time "3 minutes" as a wait time during which a return packet has not been received.

A return packet having not been received, the packet transmission controller 13 determines that a port keeping time will not be detected (step S108). The wait time setting information shown in FIG. 18 includes a wait time with the preset flag "0" so that the packet transmission controller 13 determines that a next request packet will be transmitted (step S110) and sets the wait time corresponding to the port identification information "P003" on the port that received a return packet to "2 minutes". The packet transmission controller 13 updates the preset flag corresponding to the wait time "2 minutes" to "1" in the wait time setting information (step S111).

After that, same as the foregoing description, a history packet including the port identification information "P003" is transmitted to the server 3. At a point in time the history packet is transmitted, time counting by a timer corresponding to the port identification information "P003" starts anew in the table shown in FIG. 16B (step S102). Destination information is stored into the server 3 based on the history packet. In this case, destination information corresponding to the port identification information "P003" is already stored so that the existing destination information is overwritten with the new destination information.

Figure 19:
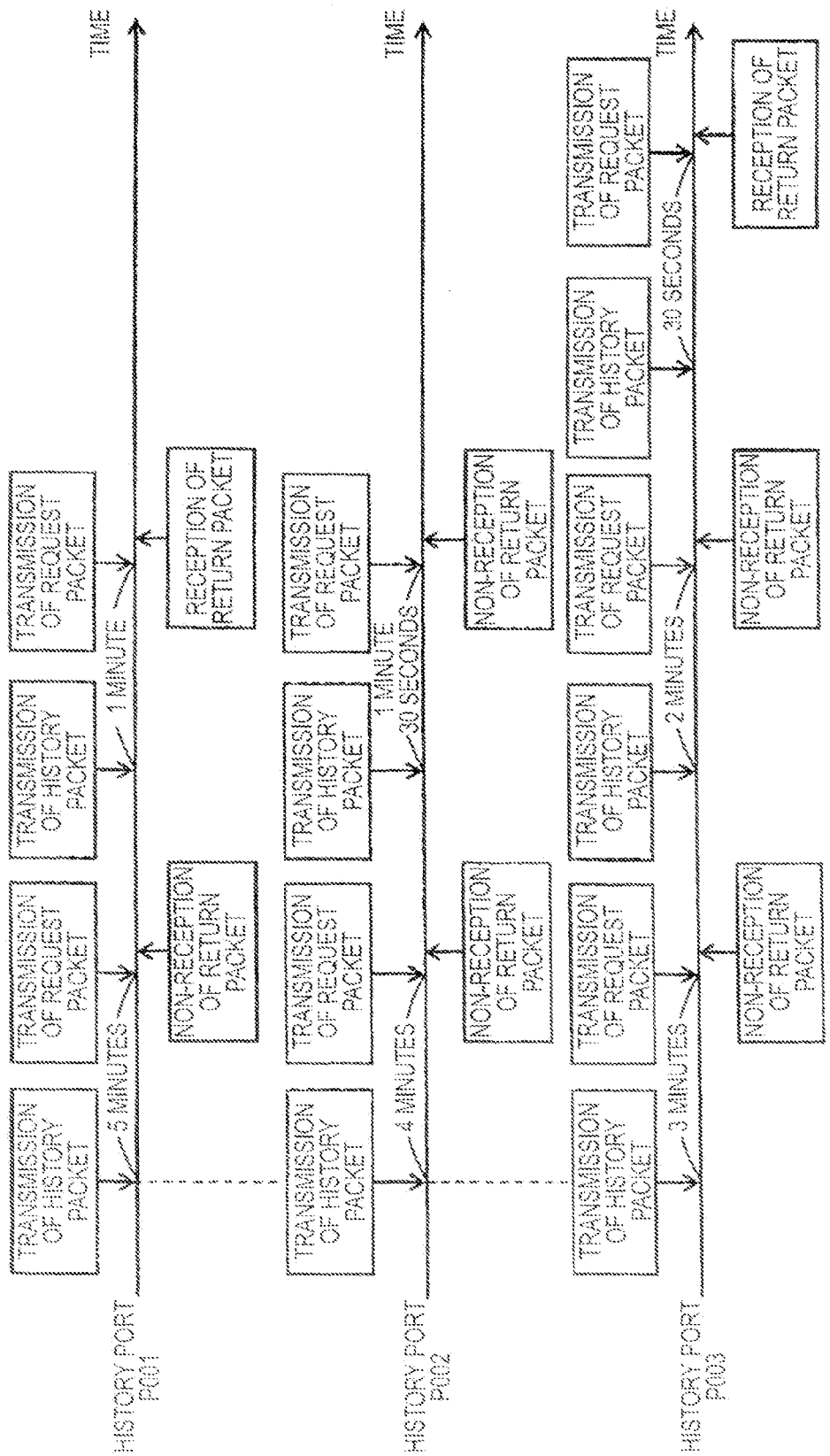
FIG. 19 explains transmission/reception of packets according to Embodiment 1.

FIG. 19 explains transmission of a history packet, transmission of a request packet, and reception (or non-reception) of a return packet in this example. As shown in FIG. 19, for the history port identified by the port identification information "P002" also, a request packet transmitted from the server 3 at the end of the wait time "4 minutes" is not received by the information processor 1. The wait time "1 minute 30 seconds" is set and a new history packet is transmitted. For the history port identified by the port identification information "P001" also, a request packet transmitted from the server 3 at the end of the wait time "5 minutes" is not received by the information processor 1. The wait time "1 minute" is set and a new history packet is transmitted. For the history port identified by the port identification information "PO03" also, a request packet transmitted from the server 3 at the end of the wait time "2 minutes" is not received by the information processor 1. The wait time "30 seconds" is set and a new history packet is transmitted.

For the history port identified by the port identification information "P003", the port keeping time "1 minute 183 seconds" of the communication processor 2 has not yet elapsed so that a return packet transmitted from the server 3 at the end of the wait time "30 seconds" undergoes address conversion and is transmitted to the information processor 1. As a result, a return packet is received by the information processor 1 (step S105) and a notice is passed to the packet transmission controller 13 that a return packet including the port identification information "P003" has been successfully received. The packet transmission controller 13 passes to the port keeping time detector 15 the timer value "31 seconds" corresponding to the port identification information "P003" as a wait time during which a return packet has been successfully received. The port keeping time detector 15 retains the wait time "31 seconds" as a wait time during which a return packet has been successfully received (step S107). The wait time "30 seconds" temporarily retained at transmission of a request packet in the packet transmission controller 13 is discarded.

A return packet has been received but the propriety of reception of a return packet transmitted at the end of the wait time "1 minute" or "1 minute 30 seconds" that is longer than a wait time during which the return packet was successfully received is not yet judged. Thus, the packet transmission controller 13 determines that a port keeping time will not be detected (step S108). The packet transmission controller 13 determines that a next request packet will not be transmitted (step S110) without setting a new wait time because the wait time setting information shown in FIG. 18 does not include a wait time corresponding to the preset flag "0".

After that, for the history port identified by the port identification information "P002", a return packet transmitted from the server 3 at the end of the wait time "1 minute 30 seconds" is not received by the information processor 1. In this case also, the propriety of reception of a return packet transmitted at the end of the wait time "1 minute" is not yet judged. Thus, the packet transmission controller 13 determines that a port keeping time will not be detected (step S108). The packet transmission controller 13 determines that a next request packet will not be transmitted (step S110) without setting a new wait time because the wait time setting information shown in FIG. 18 does not include a wait time corresponding to the preset flag "0".

After that, for the history port identified by the port identification information "P001", the port keeping time "1 minute 18 seconds" of the communication processor 2 has not yet elapsed so that a return packet transmitted from the server 3 at the end of the wait time "1 minute" undergoes address conversion and is transmitted to the information processor 1. As a result, a return packet is received by the information processor 1 (step S105) and a notice is passed to the packet transmission controller 13 that a return packet including the port identification information "P001" has been successfully received. The packet transmission controller 13 passes to the port keeping time detector 15 the timer value "1 minute 1 second" corresponding to the port identification information "P001" as a wait time during which a return packet has been successfully received. The port keeping time detector 15 retains the wait time "1 minute 1 second" as a wait time during which a return packet has been successfully received (step S107).

The propriety of transmission of a return packet transmitted at the end of the wait time "1 minute" or "1 minute 30 seconds" having been judged, the packet transmission controller 13 determines that a port keeping time will be detected (step S108) and passes an instruction to detect a port keeping time to the port keeping time detector 15. In response to the instruction, the port keeping time detector 15 detects as the port keeping time of the communication processor 2 the longest wait time "1 minute 1 second" of the wait times "31 seconds" and "1 minute 1 second" during which a return packet has been successfully received (step S109). The subsequent processing using the port keeping time is the same as that in Example 1 so that the corresponding description is omitted.

EXAMPLE 4

This example pertains to a case where the beginning of a wait time is Pattern B and transmission of a request packet is controlled so that the period from transmission of a history packet to detection of a port keeping time will be minimized. The port keeping time detector 15 detects a port keeping time in case a return packet corresponding to a request packet has not been received and after the propriety of transmission of a return packet transmitted at the end of a wait time that is shorter than a wait time during which the return packet was not received is judged. The end of a port keeping time is Pattern D. In this example, the port keeping time of the communication processor 2 is 2 minutes 30 seconds.

In this example, the following is previously determined: for a history port identified by the port identification information "P001", wait times are set to "1 minute" and "4 minutes" in this order; for a history port identified by the port identification information "P002", wait times are set to "3 minutes" and "2 minutes" in this order; for a history port identified by the port identification information "P003", a wait time is set to "5 minutes". Details of the processing described in the above examples may be omitted.

Figure 20:
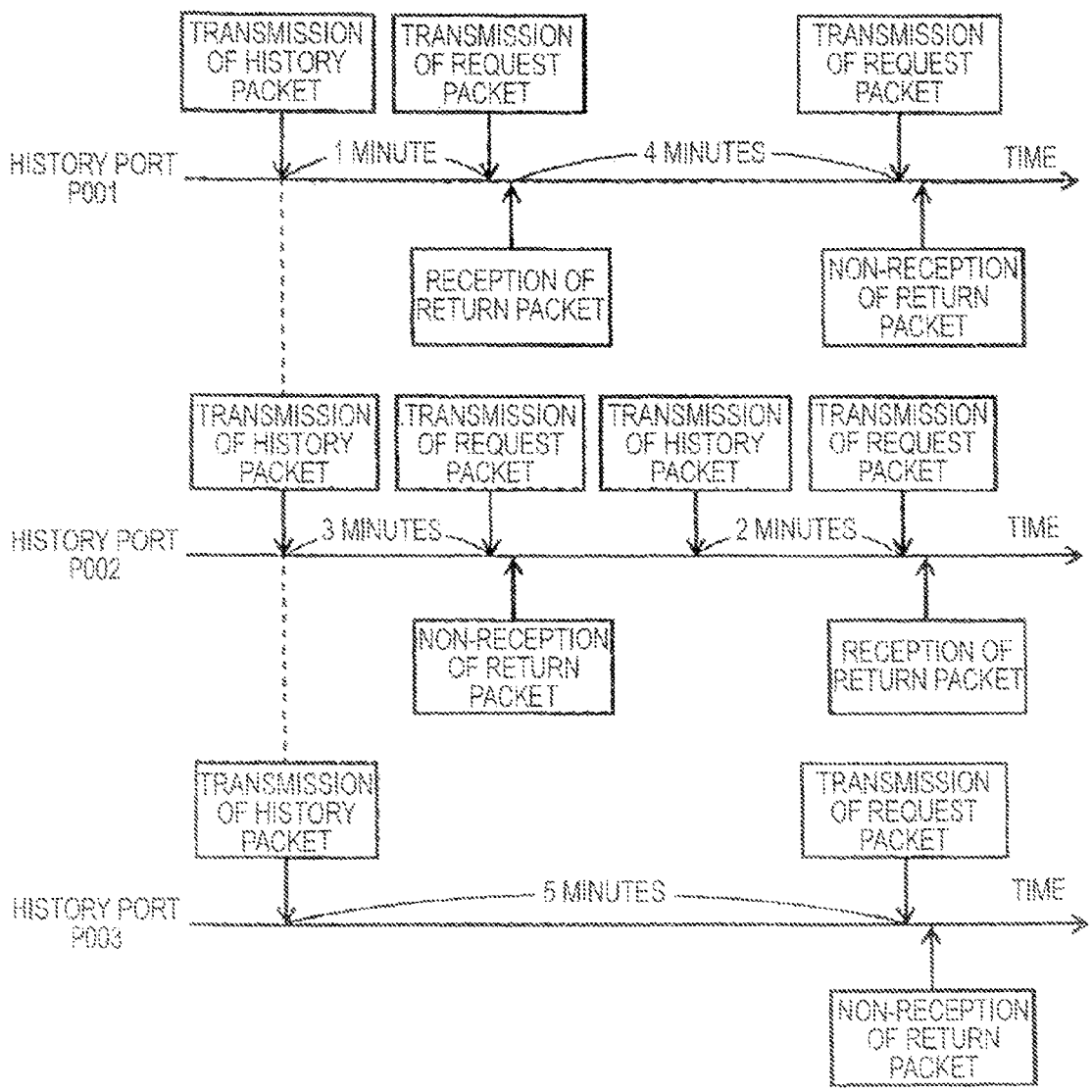
FIG. 20 explains transmission/reception of packets according to Embodiment 1.

The packet transmission controller 13 sets wait times to "1 minute" "3 minutes" and "5 minutes" (step S101). After that, three history packets respectively including the port identification information "P001", "P002" and "P003" are transmitted to the server 3 (step S102). Time counting by a timer starts for each history port at transmission of the history packet. FIG. 20 explains transmission of a history packet, transmission of a request packet, and reception (or non-reception) of a return packet in this example.

When one minute has elapsed since transmission of the history packet, the packet transmission controller 13 determines that timing is met for transmitting a request packet related to a history port identified by the port identification information "P001" (step S201). As a result, a request packet including the port identification information "P001" is transmitted from the request packet transmitter 12 under the control of the packet transmission controller 13 (step S104). The packet transmission controller 13 retains the timer value "1 minute" corresponding to the port identification information "P001" assumed at transmission of the request packet.

The port keeping time "2 minutes 30 seconds" of the communication processor 2 has not yet elapsed so that a return packet transmitted from the server 3 in response to the request packet undergoes address conversion and is transmitted to the information processor 1. The return packet is received by the return packet receiver 14 (step S105) and a notice is passed to the packet transmission controller 13 that a return packet including the port identification information "P001" has been successfully received. The packet transmission controller 13 passes to the port keeping time detector 15 the timer value "1 minute" corresponding to the retained port identification information "P001" as a wait time during which a return packet has been successfully received. The port keeping time detector 15 retains the wait time "1 minute" as a wait time during which a return packet has been successfully received (step S107).

A return packet having been received, the packet transmission controller 13 determines that a port keeping time will not be detected (step S108). For a history port identified by the port identification information "P001", it is previously determined that the wait time "4 minutes" follows the wait time "1 minute". The packet transmission controller 13 determines that a next request packet will be transmitted and sets the wait time "4 minutes" (step S110, S111). A return packet having been transmitted, a new history packet is not transmitted (step S202). The packet transmission controller 13 start time counting anew on a timer corresponding to the port identification information "P001" at a point in time a request packet is received.

When the time value corresponding to the port identification information "P002" has reached 3 minutes, it is determined that timing is met for transmitting a request packet (step S201) and a request packet including the port identification information "P002" is transmitted (step S104). The port keeping time "2 minutes 30 seconds" of the communication processor 2 has elapsed so that a return packet transmitted from the server 3 is not transmitted to the information processor 1. When 10 seconds have elapsed since a request packet was transmitted, it is determined that a time-out has occurred (step S106) and a notice is passed to the packet transmission controller 13 that a return packet including the port identification information "P002" has not been received. As a result, the packet transmission controller 13 passes to the port keeping time detector 15 the timer value "3 minutes" corresponding to the retained port identification information "P002" as a wait time during which a return packet has not been received. The port keeping time detector 15 retains the wait time "3 minutes" as a wait time during which a return packet has not been received (step S107).

A return packet has not been received in response to a request packet but the propriety of reception of a return packet transmitted at the end of the wait time "2 minute" that is shorter than the wait time "3 minutes" during which the return packet was not received is not yet judged. Thus, the packet transmission controller 13 determines that a port keeping time will not be detected (step S108). After that, a wait time corresponding to the port identification information "P002" is set to "2 minutes" (steps S110, S111). A return packet has not been received so that a history packet including the port identification information "P002" is transmitted (steps S202, S102). Then, as shown in FIG. 20, a request packet is transmitted for a history port identified by the port identification information "P003" although the information processor 1 cannot receive a return packet corresponding to the request packet. Similarly, for a history port identified by the port identification information "P001", a request packet is transmitted, but the information processor 1 can not receive a return packet according to the request packet. For a history port identified by the port identification information "P002", a request packet is transmitted and a return packet corresponding to the request packet is received by the information processor 1. As a result, the packet transmission controller 13 the propriety of transmission of a return packet transmitted at the end of the wait time "2 minutes" is judged. The packet transmission controller 13 determines that timing is met for detecting a port keeping time (step S108) and passes an instruction to detect a port keeping time to the port keeping time detector 15. The port keeping time detector 15 detects as the port keeping time of the communication processor 2 the longest wait time "2 minutes" of the wait times "1 minute" and "2 minutes" during which a return packet has been successfully received, in response to the instruction (step S109). The subsequent processing using the port keeping time is the same as that in Example 1 so that the corresponding description is omitted.

Transmission of a request packet is controlled so that the period from the first transmission of a history packet to detection of a port keeping time will be minimized. This allows early detection of a port keeping time. In case it is previously determined that the wait times of a history port identified by the port identification information "P001" are set to "1 minute" and "2 minutes" in this order, the wait times of a history port identified by the port identification information "P002" are set to "3 minutes" and "4 minutes" in this order, and the wait time of a history port identified by the port identification information "P003" is set to "5 minutes", the maximum period from the first transmission of a history packet to detection of a port keeping time is 7 minutes although the period from the first transmission of a history packet to detection of a port keeping time is about 5 minutes through combination of wait times as in Example 4, which allows early detection of a port keeping time.

EXAMPLE 5

This example pertains to a case where the beginning of a wait time is Pattern C and a wait time increases each time a request packet is transmitted for each history port. The port keeping time detector 15 detects a port keeping time in case the return packet receiver 14 has failed to receive a return packet corresponding to a request packet. The end of a port keeping time is Pattern D. The port keeping time of the communication processor 2 is "2 minutes 30 seconds", same as Example 4. In this example also, setting of a wait time is made using the wait time setting information shown in FIG. 15 in ascending order of length.

Figure 21:
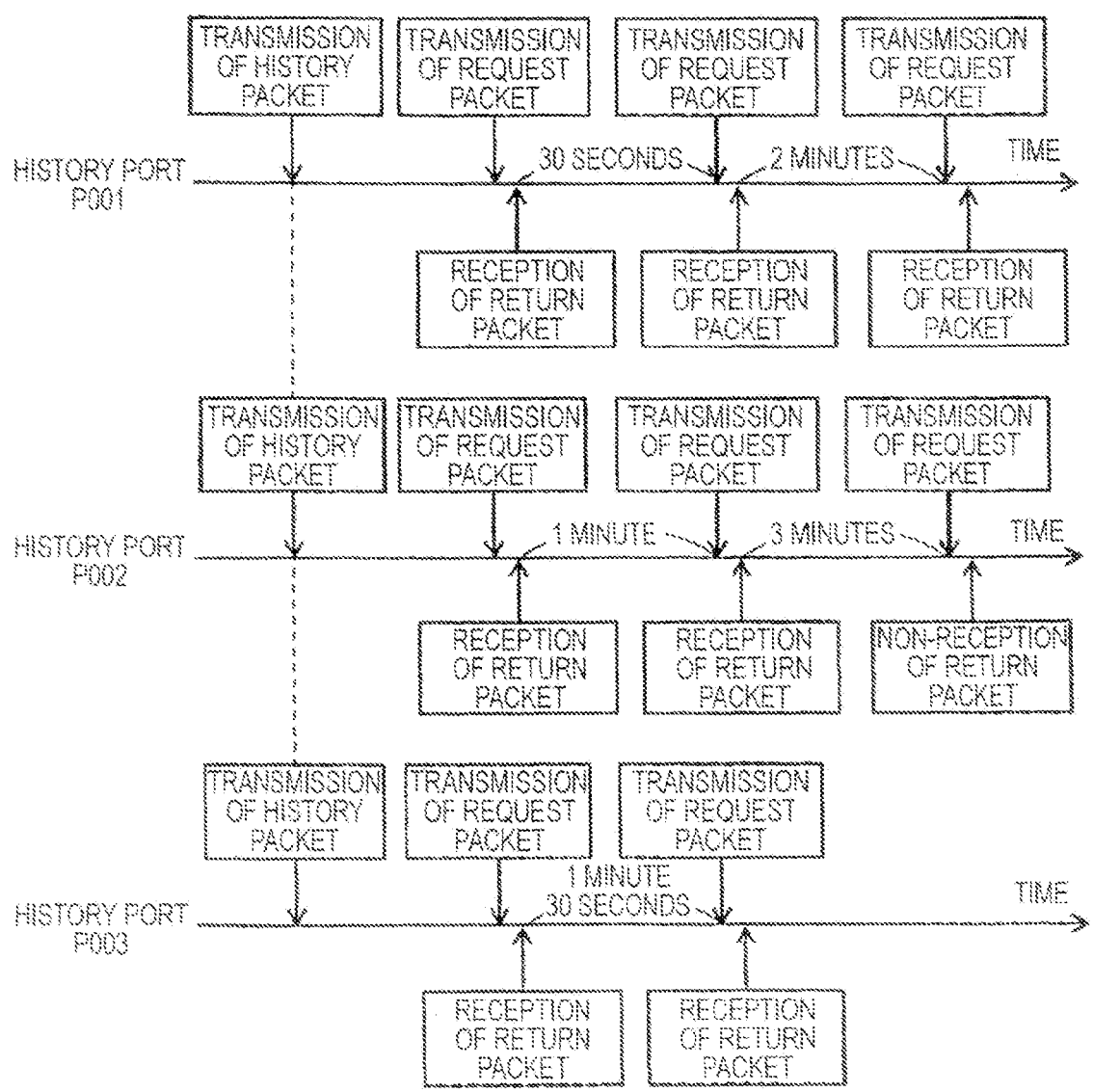
FIG. 21 explains transmission/reception of packets according to Embodiment 1.

FIG. 21 explains transmission of a history packet, transmission of a request packet, and reception (or non-reception) of a return packet in this example. As shown in FIG. 21, the packet transmission controller 13 controls the history packet transmitter 11 to engage the history packet transmitter 11 to transmit three history packets including the port identification information "P001", "P002" and "P003". As a result, three history packets are transmitted from the history packet transmitter 11 to the server 3 (step S301). These history packets are received by the server 3 and the destination information indicated by the first to third records shown in FIG. 13 is stored based on the history packets, same as Example 1 (steps S401, S402). Just after the history packets have been transmitted, the packet transmission controller 13 controls the request packet transmitter 12 to engage three request packets respectively including the port identification information "P001", "P002" and "P003" (step S302). Receiving the three request packets, the server 3 transmits return packets corresponding to the request packets (steps S403 to S405). The return packets reach the history ports of the communication processor 2 and undergo address conversion and are transmitted to the information processor 1. When the return packet receiver 14 has received the three return packets, the packet transmission controller 13 starts time counting on a timer corresponding to each port identification information item using a table similar to that shown in FIG. 16A.

After that, the packet transmission controller 13 sets a wait time corresponding to the port identification information "P001" to "30 seconds", a wait time corresponding to the port identification information "P002" to "1 minute", and a wait time corresponding to the port identification information "P003" to "1 minute 30 seconds" (step S304). The packet transmission controller 13 determines that timing is met for transmitting a request packet when the value of a timer corresponding to the port identification information "P001" has indicated "30 seconds" (step S305). As a result, a request packet including the port identification information "P001" is transmitted from the request packet transmitter 12 to the server 3 (step S104). The packet transmission controller 13 retains the timer value "30 seconds" assumed at transmission of a request packet.

A return packet transmitted from the server 3 in response to the request packet reaches the port keeping time of the communication processor 2. The port keeping time "2 minutes 30 seconds" has not yet elapsed so that the return packet undergoes address conversion and is transmitted to the information processor 1. When the return packet receiver 14 receives the return packet (step S105), the packet transmission controller 13 passes to the port keeping time detector 15 the retained timer value "30 seconds" as a wait time during which a return packet has been successfully received. The port keeping time detector 15 retains the wait time "30 seconds" as a wait time which can receive the return packet (step S107). The packet transmission controller 13 restarts time counting on a timer corresponding to the port identification information "P001" with the timing the return packet receiver 14 has received a return packet.

A return packet having been received, the packet transmission controller 13 determines that a port keeping time will not be detected (step S108). The wait time setting information includes a wait time corresponding to the preset flag "0" so that the packet transmission controller 13 determines that a next request packet will be transmitted (step S110). A wait time corresponding to the port identification information "P001" is set to "2 minutes" (step S111).

Same as the case of the wait time "30 seconds", a return packet corresponding to a request packet transmitted from the information processor 1 is received by the information processor 1 for a history port identified by the port identification information "P002" and the new wait time "3 minutes" is set. A return packet corresponding to a request packet transmitted from the information processor 1 is received by the information processor 1 for a history port identified by the port identification information "P003" and the new wait time "4 minutes" is set. A return packet corresponding to a request packet transmitted from the information processor 1 is received by the information processor 1 for a history port identified by the port identification information "P001" and the new wait time "5 minutes" is set.

After that, a return packet corresponding to a request packet transmitted from the information processor 1 at the end of the wait time "3 minutes" is transmitted from the server 3 for a history port identified by the port identification information "P002". The port keeping time "2 minutes 30 seconds" of the communication processor 2 has elapsed so that the return packet is not transmitted to the information processor 1. As a result, when 10 seconds have elapsed since a since a request packet including the port identification information "P002" was transmitted (step S106). The return packet receiver 14 passes a notice to the packet transmission controller 13 that a return packet has not been received. The packet transmission controller 13 determines that timing is met for detecting a port keeping time (step S108) and passes an instruction to detect a port keeping time to the port keeping time detector 15. In response to the instruction, the port keeping time detector 15 detects as the port keeping time of the communication processor 2 the longest wait time "2 minutes" of the wait times "30 seconds", "1 minute" and "2 minutes" during which a return packet has been successfully received (step S109). The subsequent processing using the port keeping time is the same as that in Example 1 so that the corresponding description is omitted.

While the above examples include a case where each of the packet transmission controller 13 and the port keeping time detector 15 has a timer and a case where only the packet transmission controller 13 has a timer, either configuration may be used. While a case is described where time counting is made on a timer for each of the history ports, time counting may be made on a single timer and a difference in the timer value may be used to determine the timing for transmitting a request packet or perform time counting related to a wait time. In particular, in case the wait time is 1 minute and the timer value assumed when a history packet is transmitted is 35 seconds, a request packet may be transmitted when the timer value has reached 1 minute 35 seconds.

As mentioned above, with the information processing system according to this embodiment, the information processor 1 may determine whether the port keeping time of the communication processor 2 is longer than its wait time and thus detect the port keeping time of the communication processor 2 by setting a wait time in the information processor 1 and requesting the server 3 to transmit a return packet at the end of the wait time. In the processing of detecting the port keeping time, the server 3 has only to store destination information based on a history packet and to transmit a return packet in response to reception of a request packet. This approach reduces the processing load on the server 3 compared with a case where control of the timing for transmitting a return packet based on a wait time is made by the server 3. As a result, it is possible to provide an information processing system that does not burden the server 3 with a heavy load.

By appropriately setting the width of variations in the wait time specified on the information processor 1, it is possible to detect the port keeping time of the communication processor 2 within a necessary and sufficient range. For example, in case it is necessary to detect a port keeping time in units of 10 seconds, it is possible to detect a port keeping time in units of 10 seconds. In case it is necessary to detect a port keeping time in units of 1 second, it is possible to detect a port keeping time in units of 1 second.

A port keeping time is detected by using a plurality of history ports. This allows earlier detection of a port keeping time than in a case where a single history port is used to detect a port keeping time.

The packet transmission controller 13 may determine whether a request packet will be transmitted depending on whether a return packet has been successfully received. This avoids transmission of a unnecessary request packet with respect to detection of a port keeping time. For example, transmission of a request packet including wait time information indicating the wait time of 2 minutes is avoided when a return packet corresponding to the wait time of 1 minute 30 seconds has not yet been received.

While the destination information stored by the destination information storage 34 includes the port number of a history port and the address of the communication processor 2 on the side of the communication circuit 100 in this embodiment, the destination information may include the port number of a history port alone. In this case, the server 3 may acquire the address of the communication processor 2 on the side of the communication circuit 100 from a source address included in the header of a request packet.

While port identification information is included in a return packet in this embodiment, a return packet need not include port identification information. In such a case, it may be determined that a return packet received just after a request packet is transmitted is a return packet corresponding to the request packet. Or, a return packet may be identified by the port number of the information processor 1 that has received a return packet.

(Embodiment 2)

An information processing system according to Embodiment 2 of the invention will be described referring to drawings. In the information processing system according to this embodiment, a request packet transmitted from an information processor to a server includes destination information as information on the destination of a return packet.

Figure 22:
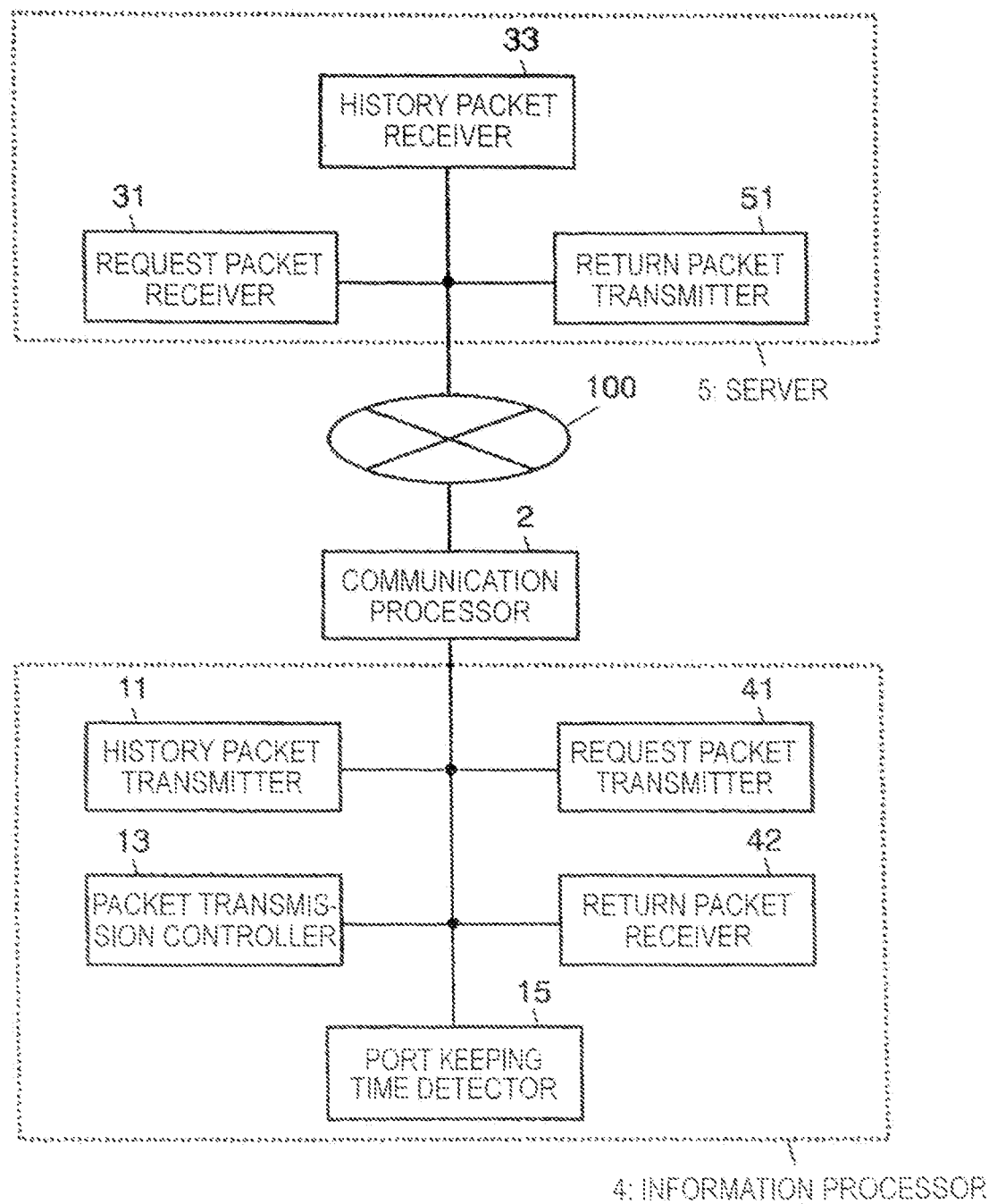
FIG. 22 is a block diagram showing the configuration of an information processing system according to Embodiment 2 of the invention.

FIG. 22 is a block diagram showing the configuration of an information processing system according to this embodiment. In FIG. 22, the information processing system according to this embodiment comprises an information processor 4, a communication processor 2 and a server 5. The information processing system according to this embodiment is the same as the information processing system according to Embodiment 1 except that the information processor 1 is replaced with the information processor 4 and the server 3 is replaced with the server 5.

The information processor 4 includes a history packet transmitter 11, a request packet transmitter 41, a packet transmission controller 13, a return packet receiver 42 and a port keeping time detector 15. The history packet transmitter 11, the packet transmission controller 13 and the port keeping time detector 15 are same as those in Embodiment 1 and the corresponding description is omitted.

The request packet transmitter 41 is similar to the request packet transmitter 12 according to Embodiment 1. Note that a request packet transmitted by the request packet transmitter 41 includes destination information as information on the destination of a return packet. The destination information is composed of information indicating the position of a history port included in a return packet received by the return packet receiver 42 described later and information indicating the address of the communication processor 2 on the side of the communication circuit 100.

The return packet receiver 42 is similar to the return packet receiver 14 according to Embodiment 1. Note that the return packet receiver 42 receives a return packet including information indicating the position of a history port transmitted from the server 5 and information indicating the address of the communication processor 2 on the side of the communication circuit 100.

In case two or more components of the history packet transmitter 11, request packet transmitter 41 and return packet receiver 42 each has a device related to communications, the devices may be the same means or separate means.

The server 5 includes a request packet receiver 31, a history packet receiver 33 and a return packet transmitter 51. The request packet receiver 31 and the history packet receiver 33 are same as those in Embodiment 1 and the corresponding description is omitted.

The return packet transmitter 51 is similar to the return packet transmitter 32 according to Embodiment 1. Note that the return packet transmitter 51 transmits a return packet based on the destination information included in a request packet received by the request packet receiver 31. That is, the return packet transmitter 51 transmits a return packet to the address and the port number indicated by the destination information included in a request packet. In case the history packet receiver 33 has received a history packet, the return packet transmitter 51 transmits to the information processor 4 a return packet including information indicating the position of a history port as a port of the communication processor 2 where the history packet has passed and the information indicating the address of the communication processor 2 on the side of the communication circuit 100. The return packet transmitter 51 may use the source address and the source port number included in the header of a history packet respectively as the information indicating the position of a history port and the information indicating the address of the communication processor 2 on the side of the communication circuit 100. A return packet transmitted in case a request packet is received is called the "return packet corresponding to a request packet" and a return packet transmitted in case a history packet is received is called the "return packet corresponding to a history packet".

In case two or more components of the request packet receiver 31, the history packet receiver 33, and the return packet transmitter 51 each has a device related to communications, the devices may be the same means or separate means.

Figure 23:
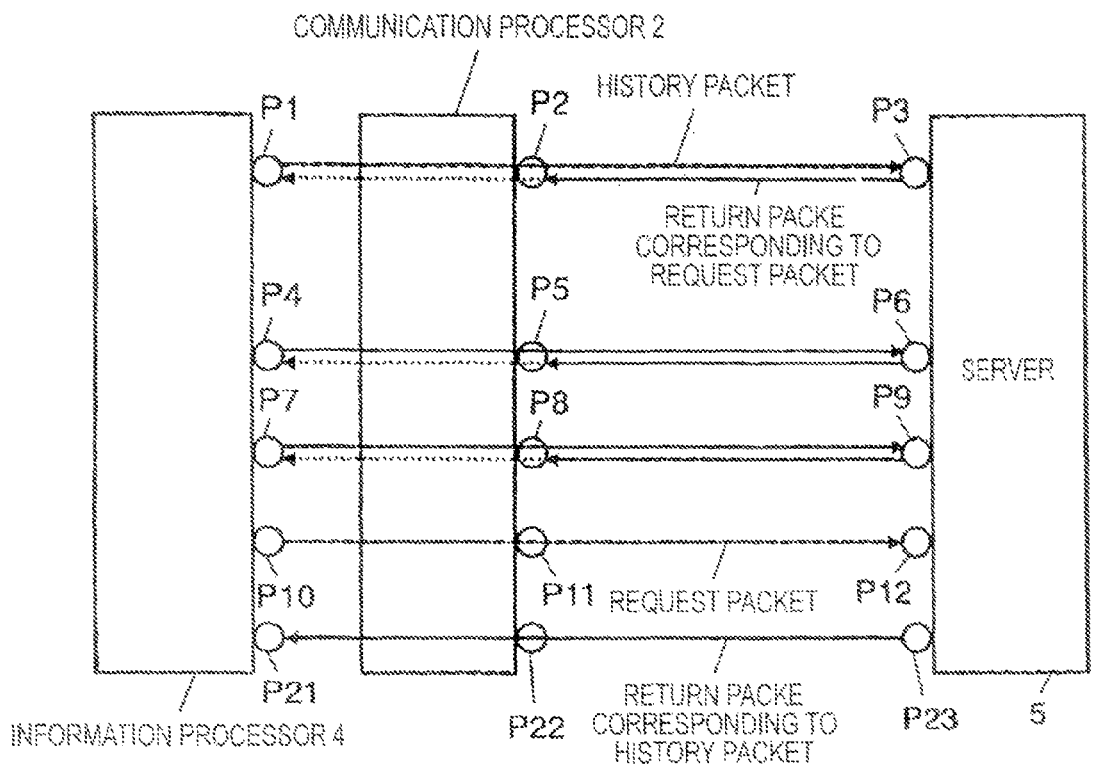
FIG. 23 explains transmission/reception of packets according to Embodiment 2.

The ports where a history packet, a request packet and a return packet pass will be described in detail. In this embodiment, there are two patterns: a case where a return packet corresponding to a history packet passes through a history port and otherwise. A case where a return packet corresponding to a history packet passes through a history port is called Pattern X and a case where a return packet corresponding to a history packet does not pass through a history port is called Pattern Y For Pattern X, ports where a history packet, a request packet and a return packet pass are same as those shown in FIG. 2 of Embodiment 1. For Pattern Y, as shown in FIG. 23, a return packet corresponding to a history packet is transmitted to the information processor 4 via Port P22. Ports P2, P5 and P8 are different from Port P22. While Embodiment 1 explains the cases where all types of return packets are transmitted to history ports, a return packet corresponding to a history packet among all return packets may be transmitted or not transmitted to a history port in this embodiment. For the information processor 4 to receive a return packet corresponding to a history packet, a return packet transmitted from the server 5 to Port P22 must undergo address conversion in the communication processor 2. Thus, for example, the information processor 4 may transmit a predetermined packet to the server 5 via Port P22 to be ready for receiving a return packet corresponding to a history packet. The information processor 4 may use a feature such as the UPnP (Universal Plug and Play) feature to set port mapping on the communication processor 2 so that a packet transmitted to Port P22 will be routed to Port P21 of the information processor 4 or may use another method. While a return packet corresponding to a history packet is transmitted to the information processor 4 via the communication processor 2 in FIG. 23, a return packet corresponding to a history packet may be transmitted to the information processor 4 not via the communication processor 2. For example, in case the information processor 4 and the server 5 are capable of communicating via a communication circuit other than the communication circuit 100, a return packet corresponding to a history packet may be transmitted to the information processor 4 via a communication circuit separate from the communication circuit 100 instead of via the communication processor 2.

Next, detection of a port keeping time will be described focusing on a single history port. Definition of a port keeping time is the same as that in Embodiment 1. For Pattern X, a return packet is transmitted from the server 5 just after a history packet is transmitted from the information processor 4 so that the wait time is exclusively as shown in Pattern 2 in FIG. 3B. A return packet that passes through the communication processor 2 at the beginning of the wait time in Pattern 2 is not a return packet corresponding to a request packet but a return packet corresponding to a history packet. For pattern Y, a return packet corresponding to a history packet does not pass through a history port so that the wait time belongs to Pattern 1 shown in FIG. 3A or Pattern 2 shown in FIG. 3B.

Next, the beginning of a wait time will be described. same as the description in Embodiment 1, description is made focusing on a single history port. For Pattern Y shown in FIG. 23, a return packet corresponding to a history packet does not pass through a history port so that Patterns A to C described in Embodiment 1 may be used as a pattern of the beginning of a wait time. For Pattern X shown in FIG. 2, a return packet corresponding to a history packet also passes through a history port so that the pattern of the beginning of a wait time is different from Pattern A or B. There are three patterns. In the first pattern, a packet that passes through a history port at the beginning of a wait time is always a return packet corresponding to a history packet ("Pattern G"). In the second, when the information processor 4 has successfully received a return packet corresponding to a request packet, the return packet is assumed as a packet that passes through a history port at the beginning of a wait time, and when the information processor 4 has failed to receive a return packet corresponding to a request packet, a new history packet is transmitted and a return packet corresponding to the history packet is assumed as a packet that passes through a history port at the beginning of a wait time ("Pattern H"). The third pattern is Pattern C in Embodiment 1. For pattern C, a packet that passes through a history port at the beginning of a wait time is a return packet corresponding to a request packet so that the operation is the same as in this embodiment as in Embodiment 1. Note that any other pattern may be used and the invention is not limited to these patterns.

[Pattern G]

Figure 24A:
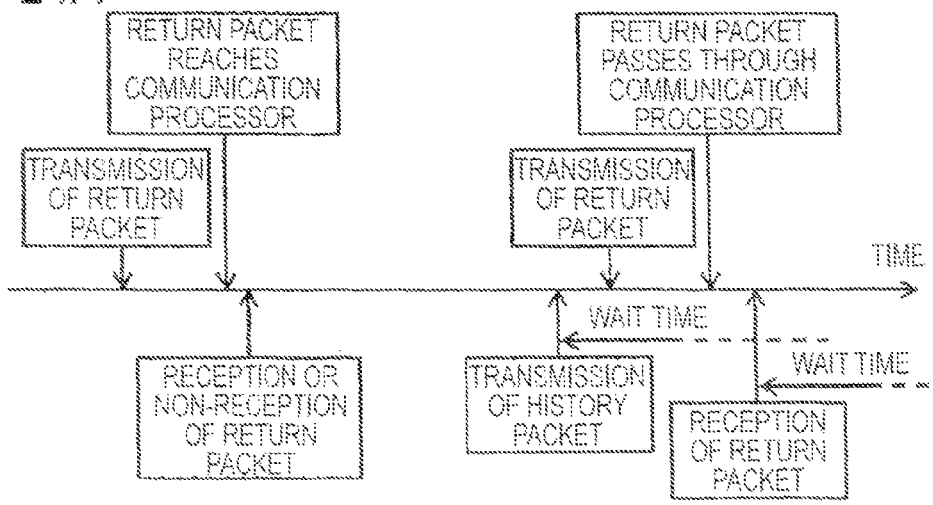
FIG. 24(A) explains the beginning of a wait time according to Embodiment 2.

FIG. 24A explains Pattern G. In Pattern G, same as in FIG. 4A, the information processor 4 transmits a history packet at the beginning of a wait time irrespective of whether the information processor 4 has successfully received a return packet. In Pattern G, a packet that passes through a history port at the beginning of a wait time is return packet corresponding to the transmitted history packet. The packet transmission controller 13 controls transmission of a request packet as well as transmission of a history packet by the history packet transmitter 11 at the beginning of a wait time. In other words, the packet transmission controller 13 controls the history packet transmitter 11 so that a history packet will be transmitted at the beginning of a wait time.

Strictly speaking, as shown in FIG. 3B, the beginning of a wait time is a point in time a return packet corresponding to a history packet passes through the communication processor 2 although it is difficult for the information processor 4 to know the point in time a return packet passes through the communication processor 2. Thus, as shown in FIG. 24A, the port keeping time detector 15 may assume that a point in time a return packet corresponding to a history packet passes through the communication processor 2 as the beginning of a wait time is a point in time the history packet is transmitted or a point in time a return packet corresponding to the history packet is received. While two or more request packets are transmitted in FIG. 24A, a single request packet may be transmitted by the information processor 4.

[Pattern H]

Figure 24B:
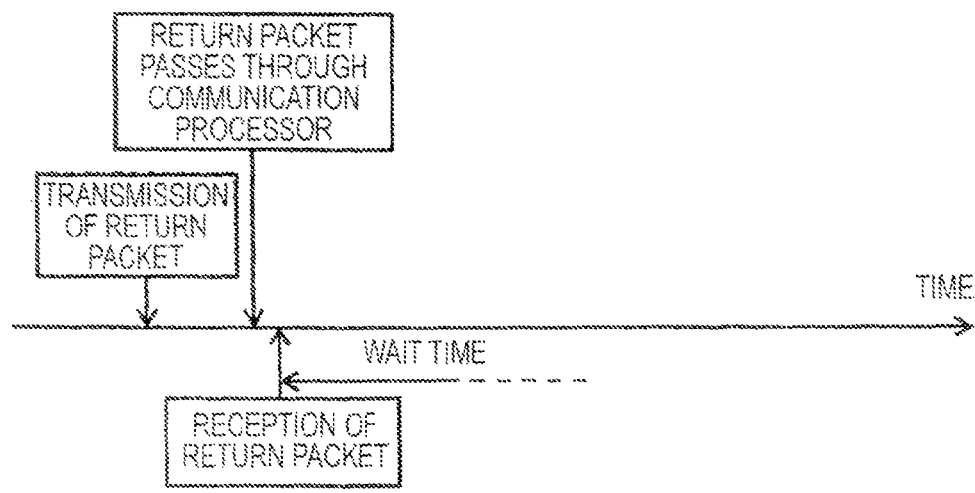
FIG. 24(B) explains the beginning of a wait time according to Embodiment 2.
Figure 24C:
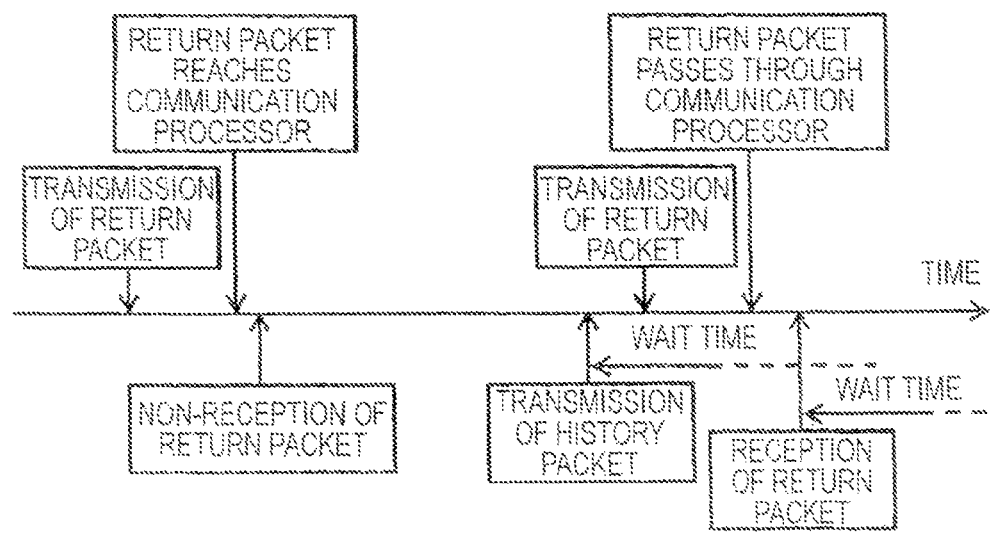
FIG. 24(C) explains the beginning of a wait time according to Embodiment 2.

FIGS. 24B and 24C explain Pattern H. In Pattern H, a packet that passes through a history port at the beginning of a wait time is a return packet corresponding to a history packet or a return packet corresponding to a request packet. In case the information processor 4 has successfully received a return packet corresponding to a request packet, the information processor 4 does not transmit a history packet at the beginning of a wait time as shown in FIG. 24B and the return packet is a packet that passes through a history port at the beginning of a wait time. In case the information processor 4 has failed to receive a return packet corresponding to a request packet, the information processor 4 transmits a history packet at the beginning of a wait time as shown in FIG. 24C and a return packet corresponding to the history packet is a packet that passes through a history port at the beginning of a wait time. The packet transmission controller 13 controls transmission of a request packet as well as controls the history packet transmitter 11 to engage the history packet transmitter 11 to transmit a history packet at the beginning of a next wait time in case the return packet receiver 14 has failed to receive a return packet corresponding to a request packet.

Strictly speaking, as shown in FIG. 3B, the beginning of a wait time is a point in time a return packet passes through the communication processor 2 although it is difficult for the information processor 4 to know the point in time a return packet passes through the communication processor 2. Thus, as shown in FIGS. 24B and 24C, in the port keeping time detector 15, in case a packet passing through a history port at the beginning of a wait time is a return packet corresponding to a history packet, a point in time a packet passes through a history port as the beginning of a wait time may be a point in time a history packet is transmitted or a point in time a return packet corresponding to a history packet is received, and in case a packet passing through a history port at the beginning of a wait time is a return packet corresponding to a request packet, a point in time a packet passes through a history port as the beginning of a wait time may be a point in time a return packet corresponding to a request packet is received.

For the end of a wait time, same as Embodiment 1, Patterns D to F may be used. These patters have been described in Embodiment 1 so that the corresponding description is omitted. Note that any other pattern may be used and the invention is not limited to these three patterns. For example, control of transmission of by the packet transmission controller 13 is the same as that in Embodiment 1 and the corresponding description is omitted.

Next, operation of the information processor 4 according to this embodiment will be described using a flowchart. In this embodiment, same as Embodiment 1, the flowchart used depends on the pattern of the beginning of a wait time. Thus, respective flowcharts for Patterns A to C, G and H will be described.

Figure 25:
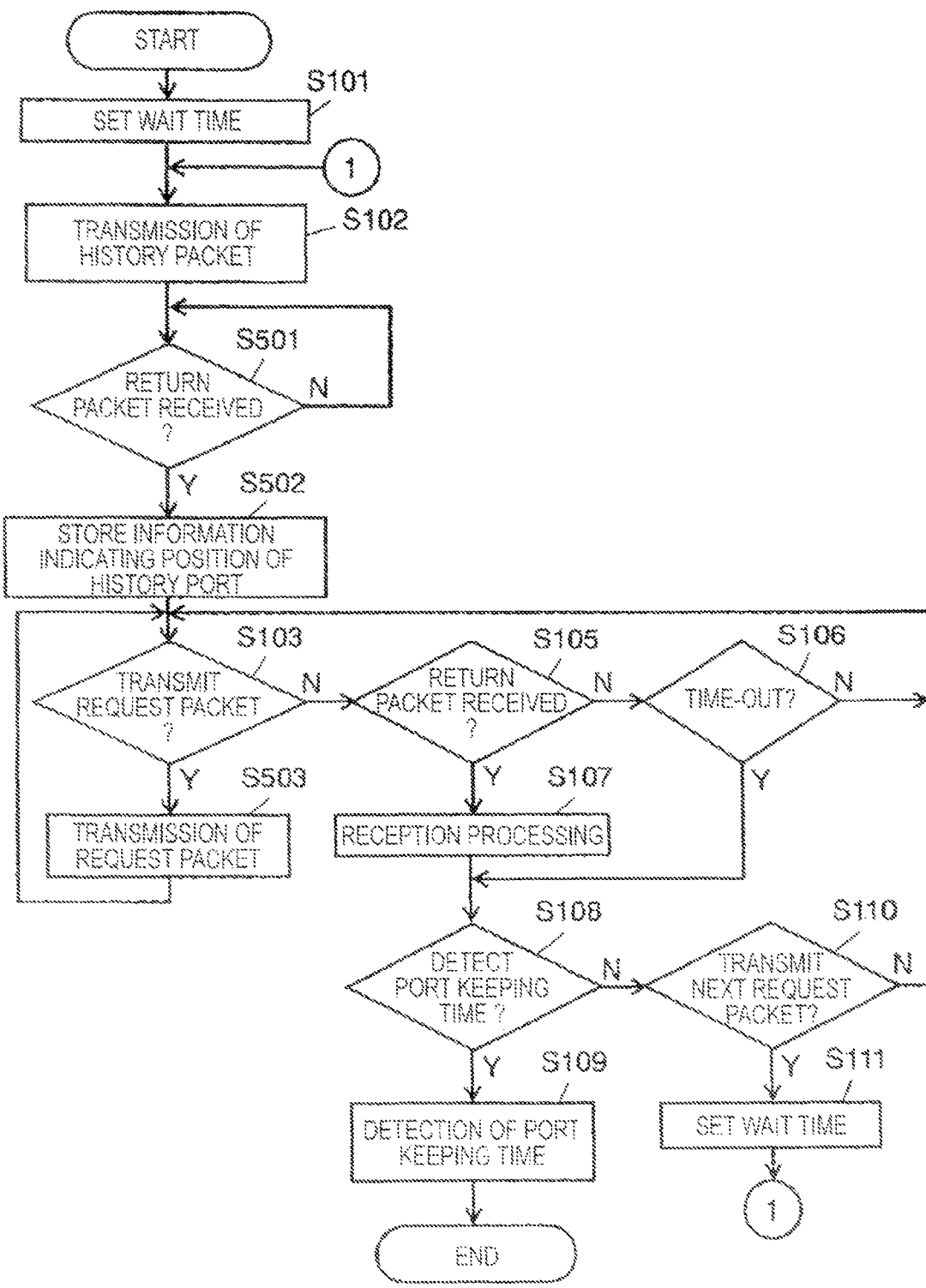
FIG. 25 is a flowchart showing the operation of an information processor according to Embodiment 2.

FIG. 25 shows the operation of the information processor 4 according to this embodiment in Pattern A or G. Processing except steps S501 to S503 is the same as that in the flowchart of FIG. 6 according to Embodiment 1 so that the corresponding description is omitted. For Pattern G, the beginning of a wait time may be a point in time a history packet is transmitted or a point in time a return packet corresponding to a history packet is received in the determination of timing for transmitting a request packet in step S103 or the processing of measuring the wait time by the port keeping time detector 15.

(Step S501)

The return packet receiver 42 determines whether a return packet corresponding to a history packet has been successfully received. In case a single history packet is transmitted in step S102, it is determined whether a single return packet corresponding to the history packet has been successfully received. In case a plurality of packets are transmitted in step S102, it is determined whether a plurality of return packets corresponding to the history packet have been successfully received. In case a plurality of return packets have been received, execution proceeds to S502. Otherwise, processing in step S501 is repeated until a return packet is received. In case a return packet is not received because the server 5 is down or for other reasons, the return packet receiver 42 may determine that a time-out has occurred when a predetermined time such as 1 minute has elapsed since a history packet was transmitted and terminate a series of processing.

(Step S502) The request packet transmitter 41 temporarily stores the information indicating the position of a history port and information indicating the address of the communication processor 2 on the side of the communication circuit 100 included in a return packet received by the return packet receiver 42. In case the return packet receiver 42 has received a return packet corresponding to a history packet anew, the request packet transmitter 41 temporarily stores the information indicating the position of a history port and information indicating the address of the communication processor 2 on the side of the communication circuit 100 in a way such information items are easily identified. For example, the request packet transmitter 41 may store such information by way of overwriting.

(Step S503) The packet transmission controller 13 controls the request packet transmitter 41 to engage the request packet transmitter 41 to transmit a request packet to the server 5. As a result, a request packet is transmitted from the request packet transmitter 41 to the server 5. The request packet includes destination information such as information indicating the position of a history port temporarily stored by the request packet transmitter 41 and information indicating the address of the communication processor 2 on the side of the communication circuit 100.

While the information indicating the position of a history port and the information indicating the address of the communication processor 2 on the side of the communication circuit 100 are temporarily stored in the request packet transmitter 41 in this flowchart, this is an example and such information may be stored elsewhere than the request packet transmitter 41. Note that the request packet transmitter 41 must have an access to such information before transmitting a request packet.

Figure 26:
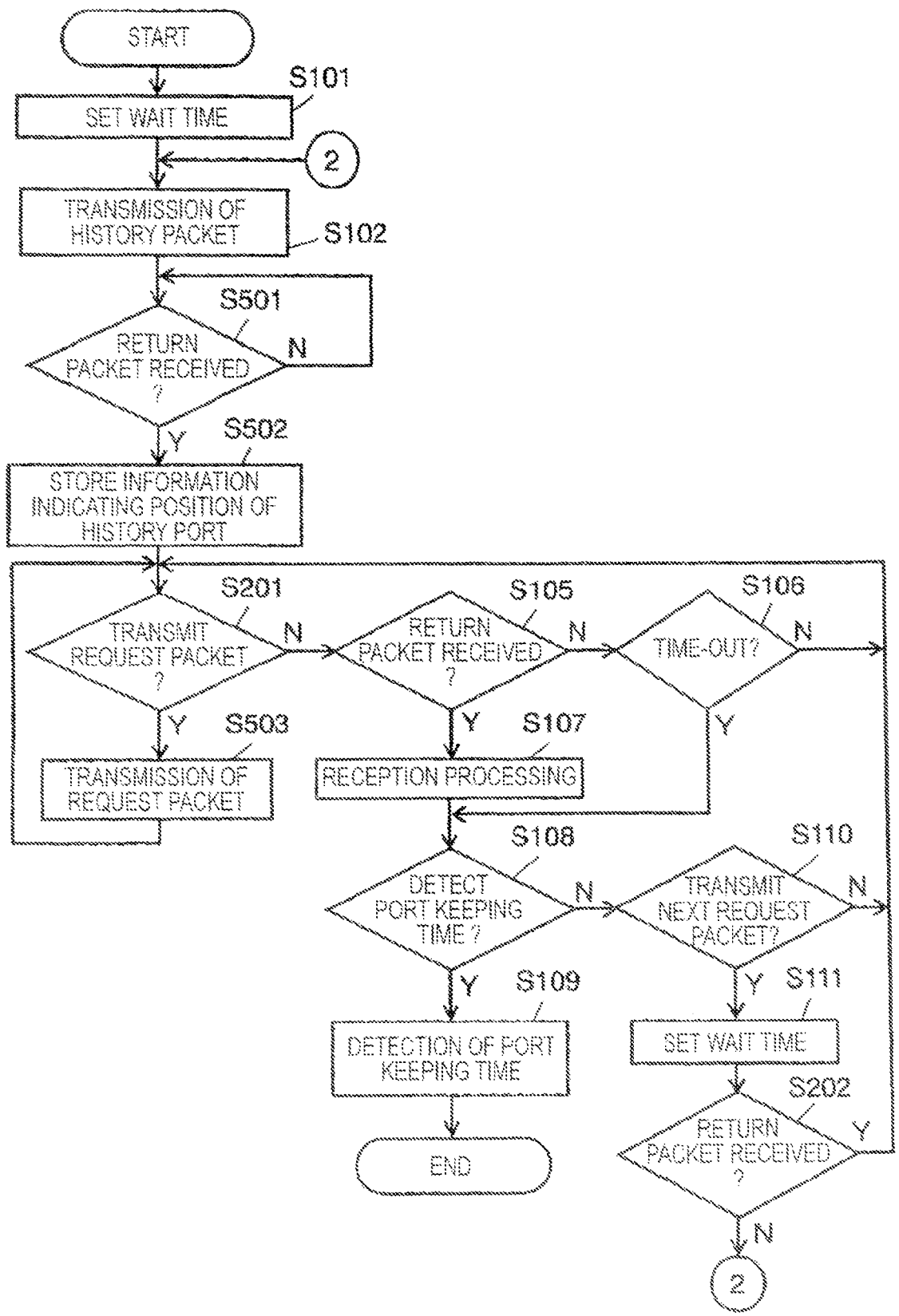
FIG. 26 is a flowchart showing the operation of the information processor according to Embodiment 2.

FIG. 26 shows the operation of the information processor 4 according to this embodiment in Pattern B or H. Processing except steps S501 to S503 is the same as that in the flowchart of FIG. 8 according to Embodiment 1 so that the corresponding description is omitted. Also, the processing of steps S501 to S503 is the same as that in the flowchart of FIG. 25 so that the corresponding description is omitted. For Pattern H, the beginning of a wait time may be a point in time a history packet is transmitted or a point in time a return packet corresponding to a history packet is received in the determination of timing for transmitting a request packet after step S201 where a history packet was transmitted at the beginning of a wait time or the processing of measuring the wait time by the port keeping time detector 15.

Figure 27:
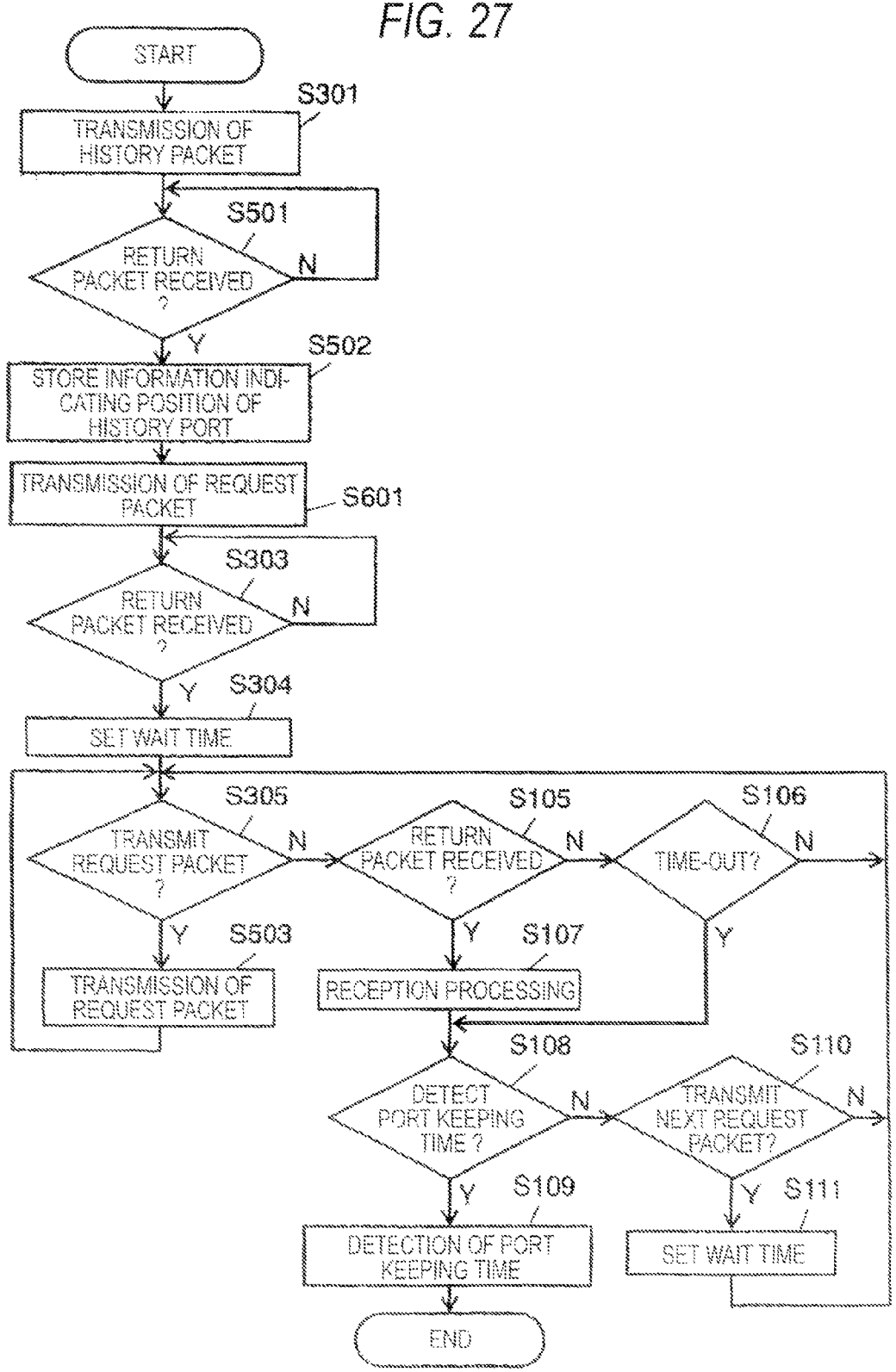
FIG. 27 is a flowchart showing the operation of the information processor according to Embodiment 2.

FIG. 27 shows the operation of the information processor 4 according to this embodiment in Pattern C. Processing except steps S501 to S503 and S601 is the same as that in the flowchart of FIG. 9 according to Embodiment 1 so that the corresponding description is omitted. The processing in steps S501 to S503 is same as that in the flowchart of FIG. 25 so that the corresponding description is omitted.

(Step S601) The packet transmission controller 13 controls the request packet transmitter 41 to engage the request packet transmitter 41 to transmit a request packet to the server 5. As a result, a request packet is transmitted from the request packet transmitter 41 to the server 5. The request packet includes destination information such as information indicating the position of a history port temporarily stored by the request packet transmitter 41 and information indicating the address of the communication processor 2 on the side of the communication circuit 100.

While in the flowchart of FIG. 27, after reception of a return packet corresponding to a history packet (step S501), transmission of a request packet (step S601) and reception of a return packet corresponding to a request packet (step S303) are made again, the processing of transmission of a request packet (step S601) and reception of a return packet corresponding to a request packet (step S303) may be skipped.

Operation of the server 5 according to this embodiment will be described using the flowchart of FIG. 28. Processing in steps S401 and S403 is the same as that in the flowchart of FIG. 10 according to Embodiment 1 so that the corresponding description is omitted.

(Step S701) The return packet transmitter 51 reads a source address and a source address port number included in the history packet received by the history packet receiver 33 and transmits a return packet including the source address and the source address port number to the information processor 4. Execution then returns to step S401. The return packet transmitter 51 transmits the return packet to a history port, that is, to the source port of the history packet for Pattern X and to the information processor 4 while bypassing a history port for Pattern Y.

(Step S702) The return packet transmitter 51 reads destination information from the payload of a request packet received by the request packet receiver 31.

(Step S703) The return packet transmitter 51 transmits a return packet to the address and the port number indicated by the readout destination information. Execution then returns to step S401.

Figure 28:
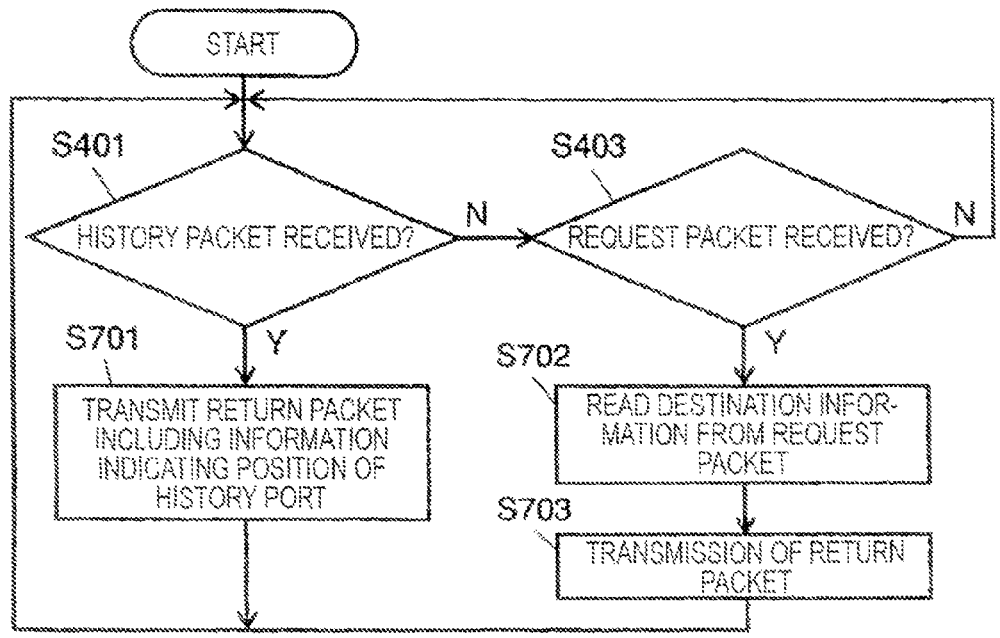
FIG. 28 is a flowchart showing the operation of a server according to Embodiment 2.

In the flowchart of FIG. 28, processing is terminated by power off or a processing termination interrupt.

Operation of the information processing system according to this embodiment will be described using a specific example. In this example, a case is described where a wait time increases each time a request packet is transmitted in Pattern G. The beginning of a wait time is a point in time a return packet corresponding to a history packet is received. The end of a wait time is Pattern D.

In the example, same as the example according to Embodiment 1, the port keeping time of the communication processor 2 is 1 minute 18 seconds. The IP address of each of the information processor 4, communication processor 2 and server 5 is the same as that in the example in Embodiment 1 except that the information processor 1 is replaced with the information processor 4 and the server 3 is replaced with the server 5. The port keeping time detector 15 detects a port keeping time in case a return packet corresponding to a request packet has not been received.

FIGS. 29A to 29D show the structure of a history packet, a return packet corresponding to a history packet, a request packet, and a return packet corresponding to a request packet, respectively. Each of the history packet, request packet and return packet has a UDP header and includes packet type identification information. The payload of a return packet corresponding to a history packet includes information indicating the position of a history port and the address of the communication processor 2 on the side of the communication circuit 100. As understood from the comparison between the structure of a packet in FIGS. 29A to 29D and that in FIG. 15 of Embodiment 1, this embodiment uses destination information including an address and a port number related to a history port to identify a history port instead of port identification information used in Embodiment 1.

Figure 29A:
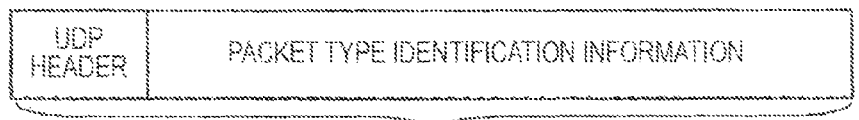
FIG. 29A shows an example of packet structure according to Embodiment 2.
Figure 29B:
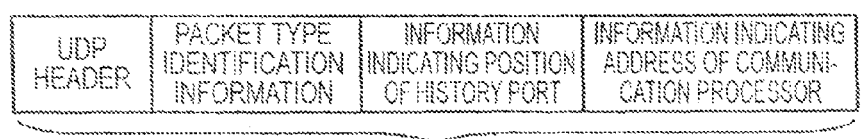
FIG. 29B shows an example of packet structure according to Embodiment 2.
Figure 29C:
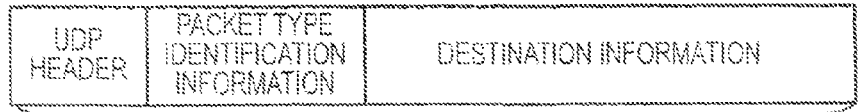
FIG. 29C shows an example of packet structure according to Embodiment 2.
Figure 29D:
FIG. 29D shows an example of packet structure according to Embodiment 2.

In this example also, the wait time setting information in FIG. 15 is used to set a wait time. The packet transmission controller 13 uses the wait time setting information shown in FIG. 15 to the wait times to set wait times to "30 seconds", "1 minute" and "1 minute 30 seconds" (step S101). As shown in FIG. 15, the packet transmission controller 13 sets a preset flag corresponding to the wait times "30 seconds", "1 minute" and "1 minute 30 seconds" to "1". After that, under the control of the packet transmission controller 13, three history packets having the structure shown in FIG. 29A are transmitted from the information processor 4 to the server 5 (step S102). The three history packets are transmitted to the server 3 via three separate ports of the communication processor 2 on the side of the communication circuit 100. Unlike Embodiment 1, the three history packets do not include port identification information.

The history packets are received by the history packet receiver 33 of the server 5 and passed to the return packet transmitter 51 (step S401). The return packet transmitter 51 reads the reads the source address "202.224.135.10" and respective source port numbers "12345", 12346" and "12347" from the headers of those history packets. The return packet transmitter 51 then assembles a return packet including the source address "202.224.135.10" and the source port number "12345" in its payload, a return packet including the source address "202.224.135.10" and the source port number "12346" in its payload, and a return packet including the source address "202.224.135.10" and the source port number "12347" in its payload, and transmits the return packets to the source address and the source address ports (step S701).

The three return packets corresponding to the history packet reach the three history ports of the communication processor 2 and undergo address conversion, and are then transmitted to the information processor 4. The return packet receiver 42 of the information processor 4 receives the three return packets and passes the return packets to the request packet transmitter 41 (step S501). The packet transmission controller 13 starts time counting on a timer when return packets corresponding to the history packets are received. The request packet transmitter 41 reads the address of the communication processor 2 on the side of the communication circuit 100 and the port number of a history port from the payload of a return packet received from the return packet receiver 42, and stores a table shown in FIG. 30 including the information into a memory (not shown) (step S502). In the table shown in FIG. 30, a preset wait time, a timer value and destination information are associated with each other. The destination information includes the IP address and port number of a history port. FIG. 30 shows the table assumed when 5 seconds have elapsed since three return packets corresponding to three history packets were transmitted.

After that, in the table shown in FIG. 30, the packet transmission controller 13 determines whether a timer value corresponding to History Port 12345 has exceeded the wait time "30 seconds" corresponding to the history port 12345. When the timer value corresponding to History Port 12345 has indicated "30 seconds", the packet transmission controller 13 determines that timing is met for transmitting a request packet (step S103). The packet transmission controller 13 controls the request packet transmitter 41 to engage the request packet transmitter 41 to transmit a request packet. As a result, a request packet including destination information is transmitted from the request packet transmitter 41 to the server 5 (step S503). The destination information includes the destination information of the first record in the table shown in FIG. 30, that is, the address "202.224.135.10" of the communication processor 2 on the side of the communication circuit 100 and the port number "12345" of the history port. The packet transmission controller 13 retains the then timer value "30 seconds" corresponding to History Port 12345 with the timing a request packet is transmitted.

The request packet is received by the request packet receiver 31 of the server 5 and is passed to the return packet transmitter 51 (step S403). The return packet transmitter 51 reads destination information from the payload of the request packet (step S702) and transmits a return packet including the destination information included in the received request packet to the address "202.224.135.10" and the port number "12345" indicated by the destination information (step S703). The return packet reaches Port 12345 of the communication processor 2 and undergoes address conversion and is then transmitted to the information processor 4 because the port keeping time "1 minute 18 seconds" related to the port have not yet elapsed.

The return packet receiver 42 of the information processor 4 receives the return packet (step S105) and passes a notice to the port keeping time detector 15 that a return packet including the address "202.224.135.10" and the port number "12345" has been successfully received. The packet transmission controller 13 passes to the port keeping time detector 15 the timer value "30 seconds" retained in association with History Port 12345 as a wait time during which a return packet has been successfully received. The port keeping time detector 15 retains the wait time "30 seconds" as a wait time during which a return packet has been successfully received (step S107).

A return packet having been received, the packet transmission controller 13 determines that transmission of a request packet will not be continued (step S108). The wait time setting information shown in FIG. 15 includes a wait time with the preset flag "0" so that the packet transmission controller 13 determines that a next request packet will be transmitted (step S10) and sets the wait time corresponding to History Port 12345 that received a return packet to "2 minutes". The packet transmission controller 13 updates the preset flag corresponding to the wait time "2 minutes" to "1" in the wait time setting information (step S111).

After that, same as the above description, processing such as transmission of a history packet, reception of a return packet corresponding to a history packet and storage of the port number of a history port takes place (steps S102, S501, S502). In this case, the same address and same port number as those assumed when a history packet is transmitted for the first time are included in a return packet transmitted from the server 5 and the request packet transmitter 41 stores the address and port number by way of overwriting. Transmission of a request packet is then repeated.

FIG. 31 explains transmission of a history packet, transmission of a request packet, and reception (or non-reception) of a return packet in this example. Concerning History Port 12346, a return packet transmitted at the end of the wait time "1 minute" is successfully received by the information processor 4 and a new wait time "3 minutes" is set, followed by transmission of a history packet and reception of a return packet. On the other hand, concerning History Port 12347, a return packet transmitted at the end of the wait time "1 minute 30 seconds" does not undergo address conversion in the communication processor 2 and is not received by the information processor 4 because the port keeping time of the communication processor 2 has elapsed. As a result, the packet transmission controller 13 determines that timing is met for detecting a port keeping time (step S108) and passes an instruction to detect a port keeping time to the port keeping time detector 15. The port keeping time detector 15 detects as the port keeping time of the communication processor 2 the longer wait time "1 minute" of the wait times "30 seconds" and "1 minute" during which a return packet has been successfully received, in response to the instruction (step S109). Same as the example in Embodiment 1, the detected port keeping time is stored on a predetermined storage medium (not shown) and is used as the transmission period of a packet to be periodically transmitted to the server 5.

While only an example corresponding to Example 2 in Embodiment 1 is described, examples in this embodiment corresponding to Example 1 and Examples 3 to 5 in Embodiment 1 are the same as the examples in Embodiment 1 except that destination information is included in a request packet and that the beginning of a wait time may be a point in time a return packet corresponding to a history packet is received. The corresponding description is thus omitted.

While a history packet, a request packet or a return packet does not include port identification information in this example, these packets may include port identification information that may be used to identify a history port, similar to Embodiment 1.

As described above, the information processing system according to this embodiment is capable of detecting the port keeping time of the communication processor 2, same as Embodiment 1, without storing destination information in the server 5.

While in this embodiment a return packet corresponding to a history packet includes information indicating the position of a history port and the address of the communication processor 2 on the side of the communication circuit 100, a return packet corresponding to a history packet may include information indicating the position of a history port alone. In such a case, the destination information included in a request packet may include or not include information indicating the address of the communication processor 2 on the side of the communication circuit 100. In the former case, the server 5 knows the address of the communication processor 2 on the side of the communication circuit 100 by acquiring a source address from the header of a request packet. In the latter case, the information processor 4 acquires the address of the communication processor 2 on the side of the communication circuit 100 by way of a method other than transmitting a return packet corresponding to a history packet. For example, the information processor 4 may acquire the address by using the UPnP feature. The information processor 4 may assemble a packet including in its payload the source address of a packet received and transmit the packet to a predetermined server that transmits the packet to the source address of the packet received, if any, and receive the packet transmitted from the server in order to acquire the address of the communication processor 2 on the side of the communication circuit 100. The predetermined server may be the server 5 or any other server.

While a wait time is set using the wait time setting information shown in FIG. 15 or the like in the examples of the above embodiments, a wait time may be set without using wait time setting information. For example, In case the packet transmission controller 13 has an algorithm for setting a wait time, it is possible to set a wait time by determining a wait time in accordance with the algorithm and recording the determined wait time onto a predetermined recording medium, or by any other method. The algorithm may be an algorithm whereby a wait time increases by 30 seconds each time a request packet is transmitted or an algorithm whereby a wait time doubles each time a request packet is transmitted or ant other algorithm.

While it is difficult for an information processor to know the ideal beginning or end of a wait time in the above embodiments so that the beginning or end of a wait time is measured by way of approximation, the approximation method is not limited to the above description. For example, a configuration is possible where a return packet transmitted from a server includes information indicating the transmission time of the return packet and an information processor uses the transmission time as a point in time the return packet has reached the history port of the communication processor 2.

In the above embodiments, the packet transmission controller 13 may control transmission of a request packet while considering the period from when a request packet is transmitted to when a return packet reaches the communication processor 2. Assuming the period from when a request packet is transmitted to when a return packet reaches the communication processor 2 as "T seconds" and the wait time is 30 seconds, the packet transmission controller 13 may make control to transmit a request packet when "30-T seconds" have elapsed since a history packet was transmitted.

A return packet transmitted at the end of a wait time is assumed as a packet that passes through a history port at the beginning of a next wait time in the description of Pattern C, an information processor may transmit a request packet to a server before the beginning of a wait time and a point in time a return packet transmitted from the server in response to the request packet passes through a history port may be assumed as the beginning of the wait time. In this case, transmission of a request packet need not be controlled so that a wait time will increase.

While in the above embodiments, a request packet includes destination information concerning the destination of a return packet in case destination information is stored into a server based on a history port, a server may acquire information concerning the destination of a return packet by another method. For example, the user may manually set to a server the information indicating the position of a history port and the information indicating the address of the communication processor 2 on the side of the communication circuit 100. In this case, a history packet need not reach a server. Thus, adjustment of the lifetime of a history packet, for example TTL (Time to Live) may keep a history packet from reaching a server. Note that a history packet reaches at least the communication circuit 100 because it is necessary to leave a transmission history on a history port based on transmission of a history packet. In case a history packet does not reach a server, a server need not include a history packet receiver. Or, a server may transmit return packets to a plurality of ports of the communication processor 2 without specifying the destination of a return packet so that any one of the return packets will reach a history port.

A history packet, a request packet or a return packet transmitted/received in the communications according to the above embodiments may have any data capacity or structure.

While the pattern of the beginning or end of a wait time is the same between a plurality of history ports in the above embodiments, the pattern of the beginning or end may be difference between history ports. For example, pattern A may be used for the beginning of a wait time concerning one history port and Pattern B may be used for the beginning of a wait time concerning the other history ports.

While port identification information or destination information is included in a history packet or a request packet in order to identify the destination of a return packet in the above embodiments, other approaches are possible. For example, history packet identification information as information to identify a history packet may be used instead of port identification information. Or, Example 1 in Embodiment 1 may be configured so that a request packet or the like does not include port identification information and the server 3 transmits return packets in ascending order of port number in the destination information each time it transmits a request packet.

While a history packet is transmitted by using the three ports P2, P5 and P8 of the communication processor 2 as shown in FIG. 2 or FIG. 23 in the above embodiments, two ports or four ports of the communication processor 2 may be used to transmit a history packet. Transmission of a plurality of history packets via a plurality of ports of the communication processor 2 means that two or more ports of the communication processor 2 are used at the same time. To be more precise, as described in the above embodiments, three history packets may be transmitted simultaneously or transmitted at predetermined intervals when a history packet is transmitted for the first time. Even in the latter case, a period from when a history packet was transmitted to when a return packet reaches a history port where the history packet has passed includes a portion where at least two periods overlap one on the other. While three ports of the communication processor 2 are repeatedly used in the examples of the above embodiments, history ports may be changed each time a history packet is transmitted.

While an information processor sets a wait time and controls the transmission timing of a request packet or the like in the above embodiments, it is possible to control the transmission timing of a request packet or the like without setting a wait time. A case where the transmission timing of a request packet or the like is controlled without setting a wait time will be briefly explained using the flowchart of FIG. 32. FIG. 32 is a flowchart that shows the operation of the information processor 1 according to Embodiment 1. The flowchart of FIG. 32 corresponds to Pattern A. Processing other than steps S801 and S802 is the same as that in the flowchart of FIG. 6 in Embodiment 1 so that the corresponding description is omitted.

(Step S801) The packet transmission controller 13 determines whether timing is met for transmitting a history packet. In case timing is met for transmitting a history packet, execution proceeds to step S802. Otherwise, execution proceeds to step S103.

(Step S802) The packet transmission controller 13 controls the history packet transmitter 11 to engage the history packet transmitter 11 to transmit a single or a plurality of history packets to the server 3. As a result, a single or a plurality of history packets are transmitted from the history packet transmitter 11 to the server 3 via the communication processor 2.

Figure 34:
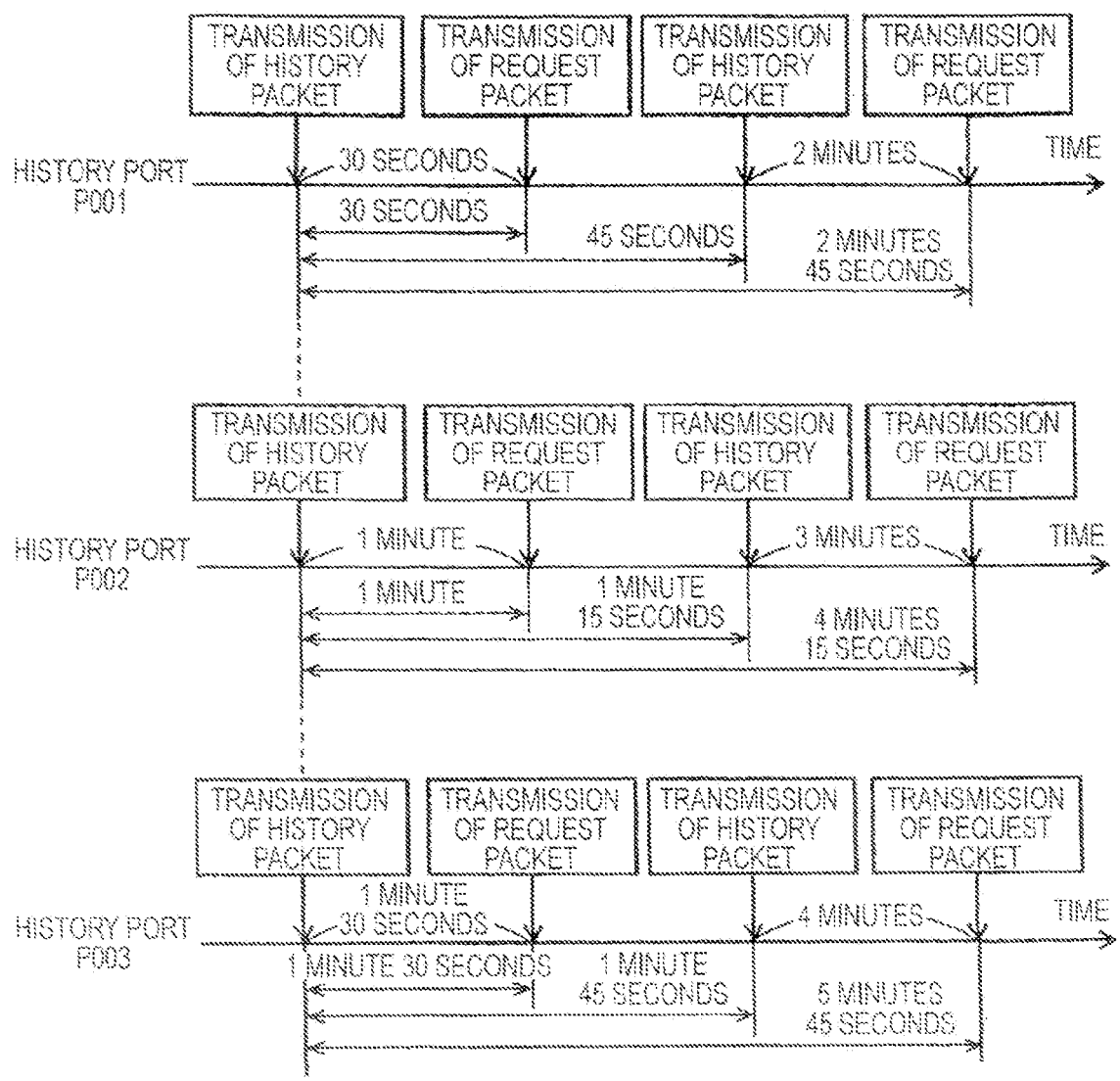
FIG. 34 explains transmission of packets according to Embodiment 2.

It is assumed that the packet transmission controller 13 has a timing table showing the transmission timing of a history packet and transmission timing of a request packet shown in FIG. 33. When a series of processing shown in FIG. 32 starts, time counting on a timer starts and the packet transmission controller 13 determines that timing is met for transmitting a history packet when the timer value has matched the transmission timing of a history packet shown in FIG. 33 and that timing is met for transmitting a request packet when the timer value has matched the transmission timing of a request packet shown in FIG. 33. As a result, as shown in FIG. 34, a history packet and a request packet are transmitted. In FIG. 34, description on the transmission timing of a return packet is omitted. For example, in case the information processor 1 has failed to receive a return packet corresponding to a request packet transmitted when the timer value has indicated "2 minutes 45 seconds", it may be determined that timing is met for detecting a port keeping time and a port keeping time may be detected (steps S108, S109). Detailed processing on transmission of a history packet or transmission of a request packet is the same as the description in Embodiment 1. The information processor 4 according to Embodiment 2 also may detect a port keeping time without setting a wait time, same as the description. A method for detecting a port keeping time without setting a wait time is not limited to the above description but may use another method.

While history packets, request packets and return packets are UDP packets in the above embodiments, these packets may be TCP packets or any other packets as long as it is possible to detect a port keeping time.

While the transmission timing of a request packet is counted on a timer in the above embodiments, a clock or a clock signal may be used instead of a timer and any other time counting means may be used.

While an information processor is connected to the communication circuit 100 via a single communication processor 2 in the above embodiments, an information processor may be connected to the communication circuit 100 via a plurality of communication processors (communication processors subjected to multistage connection may be configured). In this case, the shortest port keeping time is detected of all port keeping times of communication processors connected in multiple stages.

While the communication processor 2 has the NAT feature (that is, performs address conversion) in the above embodiments, the communication processor 2 may have the Firewall feature of packet filtering instead of or on top of the NAT feature. Packet filtering may refer to selection of a received packet that is based on the receiving filter rule mentioned earlier. It is possible to detect the port keeping time of the communication processor 2 having such a Firewall feature by using a method according to each of the above embodiments. The port keeping time assumed in case the communication processor 2 has the Firewall feature refers to a predetermined time in a case a packet transmitted from the WAN to the port has not been transmitted to the LAN side of the communication processor 2 after the predetermined time has elapsed since the last packet passes through a port of the communication processor 2.

While a server may transmit a return packet when a predetermined time has elapsed since a request packet was transmitted in the above embodiments. For example, a server may transmit a return packet when 5 seconds have elapsed since a request packet was received. In this case, an information processor may set a wait time while considering the period from when the request packet is received by the server to when a return packet is transmitted. In this way, the return packet transmitter of a server may transmit a return packet after a predetermined time has elapsed since a request packet receiver received a request packet, or just after the request packet receiver has received a request packet as described in the above embodiments.

In the above embodiments, some of the UDP history packets, request packets and return packets that have been transmitted may not reach the destination because UDP is based on connectionless communications. For example, in case it is determined that a time-out has occurred after the information processor received a request packet, a request packet may be transmitted once again to check for the time-out. For example, two or more packets may be transmitted almost simultaneously considering that a UDP history packet, request packet or return packet transmitted does not reach the destination.

While a server is identified by an IP address in the above embodiments, a server may be identified by a domain name (such as server.pana.net). In this case, the server is identified because the domain name is converted to an IP address using a DNS server.

In the above embodiments, each process (each feature) may be provided through concentrated processing on a single device (system) or may be provided through distributed processing on multiple devices.

In the above embodiments, each component may be implemented by dedicated hardware. A component that may be implemented by software may be implemented by execution of a program. For example, each component may be implemented when a software program recorded in a recording medium such as a hard disk or a semiconductor memory may be read and executed by a program execution part such as a CPU. Software that implements an information processor in the above embodiments is the following program: A program for engaging a computer to perform processing in an information processing system comprising: an information processor; a server; and a communication processor for performing processing related to communications between the information processor and the server; the program including: a history packet transmitting step of transmitting via a plurality of ports of the communication processor history packets as packets for leaving a transmission history in the communication processor; a request packet transmitting step of transmitting to the server, via a port different from a plurality of history ports as the ports of a communication processor where the history packets have passed, request packets as packets for requesting transmission of a return packet as a packet to be transmitted from the server; a return packet receiving step of receiving a return packet transmitted from the server via the history port; and a port keeping time detecting step of detecting the port keeping time of the communication processor based on reception of a return packet in the return packet receiving step.

Software that implements a server in the above embodiments is the following program: A program for engaging a computer to perform processing in an information processing system comprising: an information processor; a server; and a communication processor for performing processing related to communications between the information processor and the server; the program including: a request packet receiving step of receiving a request packet as a packet to be transmitted from the server; and a return packet transmitting step of transmitting the return packet to a history port corresponding to the request packet received in the request packet receiving step among the plurality of history ports as ports where history packets transmitted from the information processor have passed to leave a transmission history in the communication processor upon reception of request packets in the request packet step.

In the above program, the transmitting step of transmitting information or receiving step of receiving information does not include processing performed by hardware such as processing performed in a modem or an interface card in the transmitting step (processing performed exclusively by hardware).

The program may be executed by downloading the same from a server or reading the program recorded on a predetermined recording medium including an optical disk such as a CD-ROM, a magnetic disk or a semiconductor memory.

A computer that executes this program may be a single or a plurality of computers. That is, concentrated processing or distributed processing may be performed.

The invention may be changed in a variety of ways and is not limited to the above embodiments.

<Industrial Applicability>

As understood from the above, the information processing system or the like according to the invention is capable of detecting the port keeping time of a communication processor is useful as an information processor or the like comprising an information processor for transmitting a packet to a server or the like via the communication processor.

The invention claimed is:

1. An information processing system comprising: an information processor; a server; and a communication processor for performing processing on communications between said information processor and said server; said information processor including:
   a history packet transmitter for transmitting via a plurality of ports of said communication processor a plurality of history packets as packets for determining a reference time of measuring a port keeping time of the communication processor;

a request packet transmitter for transmitting to said server, via a port different from a plurality of history ports as the ports of the communication processor where said history packets have passed, a plurality of request packets as packets for requesting transmission of a return packet as a packet to be transmitted from said server, the plurality of request packets transmitted after a predetermined time has elapsed since transmitting the history packets;

a packet transmission controller for controlling transmission of request packets by said request packet transmitter;

a return packet receiver for receiving a return packet transmitted from said server via said history port; and a port keeping time detector for detecting the port keeping time of said communication processor based on reception of a return packet by said return packet receiver; said server including: a request packet receiver for receiving said request packet; and a return packet transmitter for transmitting said return packet to a history port corresponding to the request packet received by said request packet receiver among the plurality of history ports upon reception of request packets by said request packet receiver, wherein said port keeping time detector detects said port keeping time based on a wait time during which said return packet receiver has successfully received a return packet that reached the history port of said communication processor at the end of a wait time among the wait times, wherein wait time is an amount of time from a point in time a return packet reached the history port of said communication processor to a point in time a packet passed through the history port just before, wherein a packet that passes through said history port at the beginning of said wait time is said history packet and said packet transmission controller controls transmission of said request packet as well as controls transmission of a history packet by said history packet transmitter at the beginning of said wait time, wherein said port keeping time detector detects the port keeping time of said communication processor also based on transmission of a history packet by said history packet transmitter, and wherein in said port keeping time detector, a point in time a packet passed through said history port as the beginning of said wait time is a point in time said history packet was transmitted.

2. The information processing system according to claim 1, said server further including:

a history packet receiver for receiving said history packet; and a destination information storage for storing destination information as information concerning the destination of said return packet; wherein said return packet transmitter transmits said return packet based on the destination information stored by said destination information storage.

3. The information processing system according to claim 1, wherein said request packet includes destination information as information concerning the destination of said return packet and said return packet transmitter transmits said return packet based on the destination information included in a request packet received by said request packet receiver.

4. The information processing system according to claim 1, wherein said port keeping time detector detects said port keeping time based on a wait time during which said return packet receiver has successfully received a return packet that reached the history port of said communication processor at the end of the wait time and which is the longest wait time of said wait times.

5. The information processing system according to claim 1, wherein a packet that passes through said history port at the beginning of said wait time is said history packet or said return packet, wherein said zpacket transmission controller controls transmission of said request packet as well as controls said history packet transmitter to engage the history packet transmitter to transmit a history packet at the beginning of a next wait time in case said return packet receiver has failed to receive a return packet corresponding to a request packet, wherein said port keeping time detector detects the port keeping time of said communication processor also based on transmission of a history packet by said history packet transmitter, and wherein in said port keeping time detector, in case a packet that passes through said history port at the beginning of said wait time is said history packet, a point in time a packet passed through said history port as the beginning of said wait time is a point in time said history packet was transmitted, and in case a packet that passes through said history port at the beginning of said wait time is said return packet, a point in time a packet passed through said history port as the beginning of said wait time is a point in time said return packet was received.

6. The information processing system according to claim 1, wherein a packet that passes through said history port at the beginning of said wait time is said return packet and said packet transmission controller controls transmission of said request packet for each history port so that said wait time will increase each time a request packet is transmitted, and wherein in said port keeping time detector, a point in time a packet passed through said history port as the beginning of said wait time is a point in time said return packet was received.

7. The information processing system according to claim 3, said server further including a history packet receiver for receiving said history packet, wherein in case said packet receiver has received a history packet, said return packet transmitter transmits a return packet including at least information indicating the position of said history port, and wherein said destination information includes information indicating the position of said history port.

8. The information processing system according to claim 7, wherein said port keeping time detector detects said port keeping time based on a wait time during which said return packet receiver has successfully received a return packet that reached the history port of said communication processor at the end of a wait time among the wait times as times from a point in time a return packet reached the history port of said communication processor to a point in time a packet passed through the history port just before.

9. The information processing system according to claim 8, wherein said port keeping time detector detects said port keeping time based on a wait time during which said return packet receiver has successfully received a return packet that reached the history port of said communication processor at the end of the wait time and which is the longest wait time of said wait times.

10. The information processing system according to claim 8, wherein a return packet corresponding to said history packet is transmitted while bypassing said history port, wherein
- a packet that passes through said history port at the beginning of said wait time is said history packet and said packet transmission controller controls transmission of said request packet as well as controls transmission of a history packet by said history packet transmitter at the beginning of said wait time, wherein
- said port keeping time detector detects the port keeping time of said communication processor also based on transmission of a history packet by said history packet transmitter, and wherein
- in said port keeping time detector, a point in time a packet passed through said history port as the beginning of said wait time is a point in time said history packet was transmitted.

11. The information processing system according to claim 8, wherein a return packet corresponding to said history packet is transmitted while bypassing said history port and a packet that passes through said history port at the beginning of said wait time is said history packet or a return packet corresponding to said request packet, wherein
- said packet transmission controller controls transmission of said request packet as well as controls said history packet transmitter to engage the history packet transmitter to transmit a history packet at the beginning of a next wait time in case said return packet receiver has failed to receive a return packet corresponding to a request packet, wherein
- said port keeping time detector detects the port keeping time of said communication processor also based on transmission of a history packet by said history packet transmitter, and wherein
- in said port keeping time detector, in case a packet that passes through said history port at the beginning of said wait time is said history packet, a point in time a packet passed through said history port as the beginning of said wait time is a point in time said history packet was transmitted, and in case a packet that passes through said history port at the beginning of said wait time is said return packet, a point in time a packet passed through said history port as the beginning of said wait time is a point in time said return packet was received.

12. The information processing system according to claim 8, wherein a packet that passes through said history port at the beginning of said wait time is said return packet and said packet transmission controller controls transmission of said request packet for each history port so that said wait time will increase each time a request packet is transmitted, and wherein
- in said port keeping time detector, a point in time a packet passed through said history port as the beginning of said wait time is a point in time said return packet was received.

13. The information processing system according to claim 8, wherein a return packet corresponding to said history packet is transmitted while bypassing said history port, wherein
- a packet that passes through said history port at the beginning of said wait time is a return packet corresponding to said history packet, wherein
- said packet transmission controller controls transmission of said request packet as well as controls transmission of a history packet by said history packet transmitter at the beginning of said wait time, wherein
- in said port keeping time detector, a point in time a packet passed through said history port as the beginning of said wait time is a point in time said history packet was transmitted or a point in time a return packet corresponding to said history packet was received.

14. The information processing system according to claim 8, wherein
- a packet that passes through said history port at the beginning of said wait time is said history packet or said return packet, wherein a return packet corresponding to said history packet is transmitted via history port and a packet that passes through said history port at the beginning of said wait time is a return packet corresponding to said history packet or a return packet corresponding to said request packet, wherein
- said packet transmission controller controls transmission of said request packet as well as controls said history packet transmitter to engage the history packet transmitter to transmit a history packet at the beginning of a next wait time in case said return packet receiver has failed to receive a return packet corresponding to a request packet, wherein
- in said port keeping time detector, in case a packet that passes through said history port at the beginning of said wait time is a return packet corresponding to said history packet, a point in time a packet passed through said history port as the beginning of said wait time is a point in time said history packet was transmitted or a point in time a return packet corresponding to said history packet was received, and in case a packet that passes through said history port at the beginning of said wait time is a return packet corresponding to said request packet, a point in time a packet passed through said history port as the beginning of said wait time is a point in time a return packet corresponding to said request packet was received.

15. The information processing system according to claim 1, wherein said packet transmission controller controls transmission of said request packet for each history port so that said wait time will increase each time a request packet is transmitted.

16. The information processing system according to claim 15, wherein said port keeping time detector detects said port keeping time in case said packet receiver has failed to receive a return packet corresponding to the transmitted request packet.

17. The information processing system according to claim 1, wherein said packet transmission controller controls transmission of said request packet for each history port so that said wait time will decrease each time a request packet is transmitted.

18. The information processing system according to claim 1, wherein
- in said port keeping time detector, a point in time a return packet reached the history port of said communication processor as the end of said wait time is a point in time a request packet requesting transmission of said return packet was transmitted.

19. The information processing system according to claim 1, wherein
- in said port keeping time detector, a point in time a return packet reached the history port of said communication processor as the end of said wait time is a point in time said return packet was received.

20. The information processing system according to claim 1, wherein in said port keeping time detector, a point in time a return packet reached the history port of said communication processor as the end of said wait time is a point in time said return packet was received in case said return packet was successfully received, and a point in time a request packet requesting transmission of the return packet was transmitted in case said return packet was not received.

21. The information processing system according to claim 1, wherein
in said packet transmission controller, a point in time a return packet reached the history port of said communication processor as the end of said wait time is a point in time a request packet requesting transmission of said return packet was transmitted.

22. The information processing system according to claim 1, wherein said packet transmission controller controls transmission of a request packet so that the time from transmission of a first history packet to detection of a port keeping time will be minimized.

23. The information processing system according to claim 1, wherein said history port is assigned anew at said communication processor each time a first history packet passes through the port.

24. An information processor composing the information processing system according to claim 1.

25. A server composing the information processing system according to claim 1.

26. An information processing method used in said information processor composing an information processing system comprising: an information processor; a server; and a communication processor for performing processing related to communications between said information processor and said server; said method including:
a history packet transmitting step of transmitting via a plurality of ports of said communication processor history packets as packets for determining a reference time of measuring a port keeping time of the communication processor;
a request packet transmitting step of transmitting to said server, via a port different from a plurality of history ports as the ports of the communication processor where said history packets have passed, request packets as packets for requesting transmission of a return packet as a packet to be transmitted from said server, the request packets transmitted after a predetermined time has elapsed since transmitting the history packets;
a return packet receiving step of receiving a return packet transmitted from said server via said history port; and
a port keeping time detecting step of detecting the port keeping time of said communication processor based on reception of a return packet in said return packet receiving step;
wherein said port keeping time detecting step comprises detecting said port keeping time based on a wait time during which said return packet receiving step has successfully received a return packet that reached the history port of said communication processor at the end of a wait time among the wait times, wherein wait time is an amount of time from a point in time a return packet reached the history port of said communication processor to a point in time a packet passed through the history port just before,
wherein a packet that passes through said history port at the beginning of said wait time is said history packet,
wherein transmission of said request packet as well as transmission of a history packet by a history packet transmitter is controlled at the beginning of said wait time,
wherein said port keeping detecting step comprises detecting the port keeping time of said communication processor also based on transmission of a history packet by said history packet transmitter, and
wherein a point in time a packet passed through said history port as the beginning of said wait time is a point in time said history packet was transmitted.

27. An information processing method used in said server composing an information processing system comprising: an information processor; a server; and a communication processor for performing processing related to communications between said information processor and said server; said method including:
a request packet receiving step of receiving a request packet as a packet to be transmitted from said server; and
a return packet transmitting step of transmitting said return packet to a history port corresponding to the request packet received in said request packet receiving step among the plurality of history ports as ports where history packets transmitted from said information processor have passed to determine a reference time of measuring a port keeping time of said communication processor upon reception of request packets in said request packet step,
wherein said port keeping time is detected based on a wait time during which a return packet receiver has successfully received a return packet that reached the history port of said communication processor at the end of a wait time among the wait times, wherein wait time is an amount of time from a point in time a return packet reached the history port of said communication processor to a point in time a packet passed through the history port just before,
wherein a packet that passes through said history port at the beginning of said wait time is said history packet and a packet transmission controller controls transmission of said request packet as well as controls transmission of a history packet by a history packet transmitter at the beginning of said wait time, wherein the request packet is transmitted after a predetermined time has elapsed since the history packet is transmitted,
wherein the port keeping time of said communication processor is also detected based on transmission of a history packet by said history packet transmitter, and
wherein a point in time a packet passed through said history port as the beginning of said wait time is a point in time said history packet was transmitted.

28. A computer program product embodied on a non-transitory computer readable medium which, when executed by a computer, cause the computer to perform data processing in an information processing system comprising an information processor, a server, and a communication processor for performing processing related to communications between said information processor and said server; the data processing including:
a history packet transmitting step of transmitting via a plurality of ports of said communication processor history packets as packets for determining a reference time of measuring a port keeping time of the communication processor;
a request packet transmitting step of transmitting to said server, via a port different from a plurality of history ports as the ports of the communication processor where said history packets have passed, request packets as packets for requesting transmission of a return packet as a packet to be transmitted from said server, the request packets transmitted after a predetermined time has elapsed since transmitting the history packets;

a return packet receiving step of receiving a return packet transmitted from said server via said history port; and a port keeping time detecting step of detecting the port keeping time of said communication processor based on reception of a return packet in said return packet receiving step, wherein said port keeping time detecting step comprises detecting said port keeping time based on a wait time during which said return packet receiving step has successfully received a return packet that reached the history port of said communication processor at the end of a wait time among the wait times, wherein wait time is an amount of time from a point in time a return packet reached the history port of said communication processor to a point in time a packet passed through the history port just before, wherein a packet that passes through said history port at the beginning of said wait time is said history packet, wherein transmission of said request packet as well as transmission of a history packet by a history packet transmitter is controlled at the beginning of said wait time, wherein said port keeping detecting step comprises detecting the port keeping time of said communication processor also based on transmission of a history packet by said history packet transmitter, and wherein a point in time a packet passed through said history port as the beginning of said wait time is a point in time said history packet was transmitted.

29. A computer program product embodied on a non-transitory computer readable medium which, when executed by a computer, cause the computer to perform data processing in an information processing system comprising an information processor, a server, and a communication processor for performing processing related to communications between said information processor and said server; the data processing including:

a request packet receiving step of receiving a request packet as a packet to be transmitted from said server; and a return packet transmitting step of transmitting said return packet to a history port corresponding to the request packet received in said request packet receiving step among the plurality of history ports as ports where history packets transmitted from said information processor have passed to determine a reference time of measuring a port keeping time of said communication processor upon reception of request packets in said request packet step, wherein said port keeping time is detected based on a wait time during which a return packet receiver has successfully received a return packet that reached the history port of said communication processor at the end of a wait time among the wait times, wherein wait time is an amount of time from a point in time a return packet reached the history port of said communication processor to a point in time a packet passed through the history port just before, wherein a packet that passes through said history port at the beginning of said wait time is said history packet and a packet transmission controller controls transmission of said request packet as well as controls transmission of a history packet by a history packet transmitter at the beginning of said wait time, wherein the request packet is transmitted after a predetermined time has elapsed since the history packet is transmitted, wherein the port keeping time of said communication processor is also detected based on transmission of a history packet by said history packet transmitter, and wherein a point in time a packet passed through said history port as the beginning of said wait time is a point in time said history packet was transmitted.

* * * * *